(12) United States Patent
Mendell et al.

(10) Patent No.: US 10,344,204 B2
(45) Date of Patent: Jul. 9, 2019

(54) GAS DIVERTER FOR WELL AND RESERVOIR STIMULATION

(71) Applicants: HIGHLANDS NATURAL RESOURCES, PLC, Beckenham, Kent (GB); DIVERSION TECHNOLOGIES, LLC, Castle Rock, CO (US)

(72) Inventors: Paul E. Mendell, Castle Rock, CO (US); Stephen Miller, Arvada, CO (US)

(73) Assignees: DIVERSION TECHNOLOGIES, LLC, Castle Rock, CO (US); HIGHLANDS NATURAL RESOURCES, PLC, Beckenham, Kent (GB)

( * ) Notice: Subject to any disclaimer, the term of this patent is extended or adjusted under 35 U.S.C. 154(b) by 0 days.

(21) Appl. No.: 15/627,160

(22) Filed: Jun. 19, 2017

(65) Prior Publication Data

US 2017/0283689 A1 Oct. 5, 2017

Related U.S. Application Data

(60) Division of application No. 15/197,384, filed on Jun. 29, 2016, now Pat. No. 9,683,165, which is a (Continued)

(51) Int. Cl.
*E21B 43/26* (2006.01)
*C09K 8/594* (2006.01)

(52) U.S. Cl.
CPC .............. *C09K 8/594* (2013.01); *E21B 43/26* (2013.01)

(58) Field of Classification Search
None
See application file for complete search history.

(56) References Cited

U.S. PATENT DOCUMENTS 2,813,583 A 11/1957 Marx et al.
2,818,118 A 12/1957 Dixon
(Continued)

FOREIGN PATENT DOCUMENTS

CA 540544 5/1957
CA 568839 1/1959
(Continued)

OTHER PUBLICATIONS

US 6,817,413 B2, 11/2004, Stephenson et al. (withdrawn)
(Continued)

*Primary Examiner* — Angela M DiTrani Leff
(74) *Attorney, Agent, or Firm* — Sheridan Ross P.C.

(57) ABSTRACT

The fracturing methods described in the present disclosure provide advantage over the current fracturing methods. The disclosed fracturing methods can change the fracture gradient of the downhole subterranean formation. For example, one or more of the fracture gradients of the low and high stress zones of the downhole subterranean formation can be changed. Furthermore, the methods of present disclosure, in relation to current practices, can decrease the extent and/or degree of fracturing within low stress downhole formations and increase the degree of fracturing within high stress formations.

9 Claims, 13 Drawing Sheets

Related U.S. Application Data continuation-in-part of application No. 14/957,182, filed on Dec. 2, 2015, now Pat. No. 10,012,064, which is a continuation-in-part of application No. 14/728,719, filed on Jun. 2, 2015, now Pat. No. 9,759,053, which is a continuation-in-part of application No. 14/690,208, filed on Apr. 17, 2015, now Pat. No. 9,828,843, application No. 15/627,160, which is a continuation-in-part of application No. 14/957,182, which is a continuation-in-part of application No. 14/728,719, which is a continuation-in-part of application No. 14/690,208, application No. 15/627,160, which is a continuation-in-part of application No. 14/728,719, which is a continuation-in-part of application No. 14/690,208, application No. 15/267,160, which is a continuation-in-part of application No. 14/690,208.

(60) Provisional application No. 62/473,888, filed on Mar. 20, 2017, provisional application No. 62/449,957, filed on Jan. 24, 2017, provisional application No. 62/340,738, filed on May 24, 2016, provisional application No. 62/328,405, filed on Apr. 27, 2016, provisional application No. 62/260,090, filed on Nov. 25, 2015, provisional application No. 62/250,365, filed on Nov. 3, 2015, provisional application No. 62/250,361, filed on Nov. 3, 2015, provisional application No. 62/248,907, filed on Oct. 30, 2015, provisional application No. 62/248,890, filed on Oct. 30, 2015, provisional application No. 62/209,201, filed on Aug. 24, 2015, provisional application No. 62/196,485, filed on Jul. 24, 2015, provisional application No. 62/145,439, filed on Apr. 9, 2015.

(56) References Cited

U.S. PATENT DOCUMENTS

| | | |
|---|---|---|
| 2,824,834 A | 2/1958 | Cardwell et al. |
| 2,847,202 A | 8/1958 | Pullen et al. |
| 2,880,587 A | 4/1959 | Hendrix et al. |
| 2,889,884 A | 6/1959 | Henderson et al. |
| 2,896,719 A | 7/1959 | Hill |
| 2,919,909 A | 1/1960 | Rule |
| 2,944,803 A | 7/1960 | Hanson |
| 2,946,382 A | 7/1960 | Tek et al. |
| 2,952,449 A | 9/1960 | Bays |
| 2,962,095 A | 11/1960 | Morse |
| 2,970,645 A | 2/1961 | Glass |
| 2,970,826 A | 2/1961 | Woodruff |
| 2,978,025 A | 4/1961 | Clark |
| 2,979,317 A | 4/1961 | Bays |
| 3,018,095 A | 1/1962 | Redlinger |
| 3,058,730 A | 10/1962 | Bays |
| 3,077,930 A | 2/1963 | Beckett |
| 3,086,760 A | 4/1963 | Bays |
| 3,097,690 A | 7/1963 | Terwilliger |
| 3,100,528 A | 8/1963 | Plummer et al. |
| 3,103,975 A | 9/1963 | Hanson |
| 3,105,545 A | 10/1963 | Prats et al. |
| 3,108,636 A | 10/1963 | Peterson |
| 3,111,988 A | 11/1963 | Davis et al. |
| 3,126,962 A | 3/1964 | Blood |
| 3,129,758 A | 4/1964 | Closmann |
| 3,129,761 A | 4/1964 | Staadt |
| 3,134,438 A | 5/1964 | Huitt et al. |
| 3,138,205 A | 6/1964 | Kerver et al. |
| 3,139,930 A | 7/1964 | Hudgins et al. |
| 3,145,772 A | 8/1964 | Huitt |
| 3,159,216 A | 12/1964 | Reed et al. |
| 3,172,470 A | 3/1965 | Huitt et al. |
| 3,189,092 A | 6/1965 | Bodine |
| 3,205,942 A | 9/1965 | Sandberg |
| 3,221,813 A | 12/1965 | Closmann et al. |
| 3,227,211 A | 1/1966 | Gilchrist |
| 3,228,470 A | 1/1966 | Papaila |
| 3,245,470 A * | 4/1966 | Henry ............... E21B 43/267 166/280.1 |
| 3,246,693 A | 4/1966 | Crider |
| 3,270,813 A | 9/1966 | Gilchrist |
| 3,270,816 A | 9/1966 | Staadt |
| 3,280,909 A | 10/1966 | Closmann et al. |
| 3,280,910 A | 10/1966 | Crider |
| 3,303,883 A | 2/1967 | Slusser et al. |
| 3,322,194 A | 5/1967 | Strubhar |
| 3,329,207 A | 7/1967 | Shock et al. |
| 3,331,206 A | 7/1967 | Osborne |
| 3,342,258 A | 9/1967 | Prats |
| 3,342,261 A | 9/1967 | Bond et al. |
| 3,346,044 A | 10/1967 | Slusser |
| 3,349,845 A | 10/1967 | Holbert et al. |
| 3,353,602 A | 11/1967 | Geertsma |
| 3,358,756 A | 12/1967 | Vogel |
| 3,361,201 A | 1/1968 | Howard |
| 3,362,471 A | 1/1968 | Slusser et al. |
| 3,366,176 A | 1/1968 | Parrish |
| 3,369,605 A | 2/1968 | Donaldson et al. |
| 3,379,250 A | 4/1968 | Matthews et al. |
| 3,385,359 A | 5/1968 | Offeringa |
| 3,386,513 A | 6/1968 | Holmes |
| 3,396,791 A | 8/1968 | Meurs et al. |
| 3,399,721 A | 9/1968 | Strange |
| 3,407,003 A | 10/1968 | Dude |
| 3,410,345 A | 11/1968 | Melvin |
| 3,417,817 A | 12/1968 | Moore |
| 3,427,652 A | 2/1969 | Seay |
| 3,436,919 A | 4/1969 | Shock et al. |
| 3,439,742 A | 4/1969 | Durie |
| 3,455,383 A | 7/1969 | Prats |
| 3,468,376 A | 9/1969 | Bramhall |
| 3,474,862 A | 10/1969 | Hubert |
| 3,481,398 A | 12/1969 | Prats |
| 3,500,911 A | 3/1970 | Farley et al. |
| 3,500,913 A | 3/1970 | Closmann et al. |
| 3,501,201 A | 3/1970 | Closmann et al. |
| 3,510,167 A | 5/1970 | Carmody |
| 3,513,100 A | 5/1970 | Stogner |
| 3,525,398 A | 8/1970 | Fisher |
| 3,528,501 A | 9/1970 | Parker |
| 3,537,528 A | 11/1970 | O'Brien et al. |
| 3,537,529 A | 11/1970 | Timmerman |
| 3,542,131 A | 11/1970 | Walton et al. |
| 3,547,198 A | 12/1970 | Slusser |
| 3,565,173 A | 2/1971 | Anderson |
| 3,572,838 A | 3/1971 | Templeton |
| 3,574,402 A | 4/1971 | Davis et al. |
| 3,575,240 A | 4/1971 | Rhoades |
| 3,578,080 A | 5/1971 | Closmann |
| 3,598,183 A | 8/1971 | Scott |
| 3,599,714 A | 8/1971 | Becker et al. |
| 3,602,311 A | 8/1971 | Whitsitt |
| 3,606,465 A | 9/1971 | Hanson |
| 3,612,179 A | 10/1971 | Anderson et al. |
| 3,612,608 A | 10/1971 | Manker et al. |
| 3,613,789 A | 10/1971 | Son, Jr. |
| 3,630,278 A | 12/1971 | Parker |
| 3,670,816 A | 6/1972 | Chenevert |
| 3,674,089 A | 7/1972 | Moore |
| 3,682,246 A | 8/1972 | Closmann |
| 3,688,843 A | 9/1972 | Nordyke |
| 3,698,478 A | 10/1972 | Parker |
| 3,709,295 A | 1/1973 | Braunlich et al. |
| 3,710,114 A | 1/1973 | Vann |
| 3,711,405 A | 1/1973 | Pye et al. |
| 3,727,690 A | 4/1973 | Munson |
| 3,734,180 A | 5/1973 | Rhoades |
| 3,739,851 A | 6/1973 | Beard |
| 3,747,681 A | 7/1973 | Davis et al. |
| 3,752,233 A | 8/1973 | Knight et al. |
| 3,753,594 A | 8/1973 | Beard |
| 3,759,574 A | 9/1973 | Beard |

(56) References Cited

U.S. PATENT DOCUMENTS

| | | |
|---|---|---|
| 3,775,073 A | 11/1973 | Rhoades |
| 3,779,601 A | 12/1973 | Beard |
| 3,810,510 A | 5/1974 | Fitch et al. |
| 3,814,185 A | 6/1974 | Boardman |
| 3,828,854 A | 8/1974 | Templeton et al. |
| 3,835,928 A | 9/1974 | Strubhar et al. |
| 3,838,738 A | 10/1974 | Redford et al. |
| 3,841,402 A | 10/1974 | Knight et al. |
| 3,845,632 A | 11/1974 | Slobod et al. |
| 3,854,531 A | 12/1974 | Carlin |
| 3,854,533 A | 12/1974 | Gurley et al. |
| 3,858,658 A | 1/1975 | Strubhar |
| 3,863,709 A | 2/1975 | Fitch |
| 3,872,924 A | 3/1975 | Clampitt |
| 3,881,551 A | 5/1975 | Terry |
| 3,890,007 A | 6/1975 | Heinen et al. |
| 3,908,762 A | 9/1975 | Redford |
| 3,912,330 A | 10/1975 | Carnahan |
| 3,913,672 A | 10/1975 | Columbus et al. |
| 3,933,205 A | 1/1976 | Kiel |
| 3,948,325 A | 4/1976 | Winston et al. |
| 3,953,340 A | 4/1976 | Templeton et al. |
| 3,968,840 A | 7/1976 | Tate |
| 3,987,850 A | 10/1976 | Fitch |
| 4,003,432 A | 1/1977 | Weston et al. |
| 4,007,786 A | 2/1977 | Schlinger |
| 4,015,663 A | 4/1977 | Strubhar |
| 4,019,577 A | 4/1977 | Fitch et al. |
| 4,019,578 A | 4/1977 | Stoddard et al. |
| 4,022,280 A | 5/1977 | Stoddard et al. |
| 4,026,358 A | 5/1977 | Allen |
| 4,040,483 A | 8/1977 | Offeringa |
| 4,042,029 A | 8/1977 | Offeringa |
| 4,044,831 A | 8/1977 | Allen |
| 4,068,716 A | 1/1978 | Allen |
| 4,071,458 A | 1/1978 | Allen |
| 4,078,609 A | 3/1978 | Pavlich |
| 4,083,404 A | 4/1978 | Allen |
| 4,098,336 A | 7/1978 | Allen |
| 4,110,224 A | 8/1978 | Allen |
| 4,113,015 A | 9/1978 | Meijs |
| 4,121,661 A | 10/1978 | Redford |
| 4,127,170 A | 11/1978 | Redford |
| 4,127,172 A | 11/1978 | Redford et al. |
| 4,129,182 A | 12/1978 | Dabbous |
| 4,151,877 A | 5/1979 | French |
| 4,168,257 A | 9/1979 | Meijs |
| 4,185,693 A | 1/1980 | Crumb et al. |
| 4,186,802 A | 2/1980 | Perlman |
| 4,200,152 A | 4/1980 | Foster et al. |
| 4,216,098 A | 8/1980 | Hunter |
| 4,217,230 A | 8/1980 | Hunter |
| 4,223,729 A | 9/1980 | Foster |
| 4,226,730 A | 10/1980 | Hunter |
| 4,226,731 A | 10/1980 | Hunter |
| 4,228,016 A | 10/1980 | Hunter |
| 4,228,018 A | 10/1980 | Hunter |
| 4,265,310 A | 5/1981 | Britton et al. |
| 4,271,905 A | 6/1981 | Redford et al. |
| 4,279,301 A | 7/1981 | Williams |
| 4,288,334 A | 9/1981 | McCoy et al. |
| 4,297,226 A | 10/1981 | Hunter |
| 4,297,469 A | 10/1981 | Hunter |
| 4,298,479 A | 11/1981 | Hunter |
| 4,303,126 A | 12/1981 | Blevins |
| 4,303,127 A | 12/1981 | Freel et al. |
| 4,323,463 A | 4/1982 | Morduchowitz |
| 4,324,291 A | 4/1982 | Wong et al. |
| 4,325,432 A | 4/1982 | Henry |
| 4,331,796 A | 5/1982 | Hunter |
| 4,338,203 A | 7/1982 | Hunter |
| 4,341,647 A | 7/1982 | Hunter |
| 4,343,363 A | 8/1982 | Norton et al. |
| 4,357,802 A | 11/1982 | Wahl et al. |
| 4,364,431 A | 12/1982 | Saidi et al. |
| 4,368,781 A | 1/1983 | Anderson |
| 4,371,444 A | 2/1983 | McCoy et al. |
| 4,374,545 A | 2/1983 | Bullen et al. |
| 4,378,845 A | 4/1983 | Medlin et al. |
| 4,398,602 A | 8/1983 | Anderson |
| 4,398,769 A | 8/1983 | Jacoby |
| 4,415,035 A | 11/1983 | Medlin et al. |
| 4,430,481 A | 2/1984 | Hunter |
| 4,430,482 A | 2/1984 | Hunter |
| 4,431,055 A | 2/1984 | Parrish |
| 4,431,778 A | 2/1984 | Hunter |
| 4,438,976 A | 3/1984 | Baughman et al. |
| 4,440,652 A | 4/1984 | Hunter |
| 4,444,258 A | 4/1984 | Kalmar |
| 4,448,697 A | 5/1984 | McCoy et al. |
| 4,450,913 A | 5/1984 | Allen |
| 4,471,840 A | 9/1984 | Lasseter |
| 4,480,696 A | 11/1984 | Almond et al. |
| 4,495,995 A | 1/1985 | Chen et al. |
| 4,501,326 A | 2/1985 | Edmunds |
| 4,523,642 A | 6/1985 | Venkatesan |
| 4,548,268 A | 10/1985 | Stipanovic |
| 4,554,082 A | 11/1985 | Holtmyer et al. |
| 4,561,696 A | 12/1985 | Graves |
| 4,567,945 A | 2/1986 | Segalman |
| 4,605,066 A | 8/1986 | Djabbarah |
| 4,607,699 A | 8/1986 | Stephens |
| 4,612,989 A | 9/1986 | Rakach et al. |
| 4,620,594 A | 11/1986 | Hall |
| 4,623,021 A | 11/1986 | Stowe |
| 4,630,678 A | 12/1986 | Mumallah et al. |
| 4,633,948 A | 1/1987 | Closmann |
| 4,635,720 A | 1/1987 | Chew |
| 4,637,461 A | 1/1987 | Hight |
| 4,665,990 A | 5/1987 | Perlman |
| 4,673,484 A | 6/1987 | Babcock |
| 4,679,625 A | 7/1987 | Gibbons |
| 4,683,950 A | 8/1987 | Lessi |
| 4,687,057 A | 8/1987 | Moore et al. |
| 4,687,059 A | 8/1987 | Pathak et al. |
| 4,693,310 A | 9/1987 | Gibbons |
| 4,694,904 A | 9/1987 | Sengul et al. |
| 4,696,345 A | 9/1987 | Hsueh |
| 4,706,749 A | 11/1987 | Hayes et al. |
| 4,714,114 A | 12/1987 | Jones |
| 4,718,489 A | 1/1988 | Hallam et al. |
| 4,724,905 A | 2/1988 | Uhri |
| 4,754,808 A | 7/1988 | Harmon et al. |
| 4,756,369 A | 7/1988 | Jennings et al. |
| 4,802,144 A | 1/1989 | Holzhausen et al. |
| 4,815,790 A | 3/1989 | Rosar et al. |
| 4,828,028 A | 5/1989 | Soliman |
| 4,834,181 A | 5/1989 | Uhri et al. |
| 4,852,650 A | 8/1989 | Jennings et al. |
| 4,867,241 A | 9/1989 | Strubhar |
| 4,889,186 A | 12/1989 | Hanson et al. |
| 4,907,204 A | 3/1990 | Medlin |
| 4,926,940 A | 5/1990 | Stromswold |
| 4,938,286 A | 7/1990 | Jennings, Jr. |
| 4,957,167 A | 9/1990 | Schultz |
| 4,974,675 A | 12/1990 | Austin et al. |
| 4,977,116 A | 12/1990 | Rumpf et al. |
| 5,005,645 A | 4/1991 | Jennings et al. |
| 5,025,859 A | 6/1991 | Hanson et al. |
| 5,030,603 A | 7/1991 | Rumpf et al. |
| 5,031,163 A | 7/1991 | Holzhausen et al. |
| 5,036,917 A | 8/1991 | Jennings et al. |
| 5,036,918 A | 8/1991 | Jennings et al. |
| 5,042,580 A | 8/1991 | Alvin et al. |
| 5,042,581 A | 8/1991 | Jennings et al. |
| 5,069,281 A | 12/1991 | Tackett |
| 5,072,990 A | 12/1991 | Vogt et al. |
| 5,095,982 A | 3/1992 | Chungshiang et al. |
| 5,111,881 A | 5/1992 | Soliman et al. |
| 5,129,457 A | 7/1992 | Sydansk |
| 5,133,407 A | 7/1992 | Deines et al. |
| 5,206,836 A | 4/1993 | Holzhausen et al. |
| 5,220,504 A | 6/1993 | Holzhausen et al. |
| 5,228,510 A | 7/1993 | Jennings et al. |

(56) References Cited

U.S. PATENT DOCUMENTS

| | | |
|---|---|---|
| 5,238,067 A | 8/1993 | Jennings, Jr. |
| 5,261,489 A | 11/1993 | Jennings et al. |
| 5,271,465 A | 12/1993 | Schmidt et al. |
| 5,295,539 A | 3/1994 | Alfred et al. |
| 5,295,763 A | 3/1994 | Stenborg |
| 5,305,829 A | 4/1994 | Kumar |
| 5,309,988 A | 5/1994 | Shy et al. |
| 5,356,565 A | 10/1994 | Southwell |
| 5,370,187 A | 12/1994 | Ferguson et al. |
| 5,411,086 A | 5/1995 | Burcham et al. |
| 5,411,094 A | 5/1995 | Northrop |
| 5,425,421 A | 6/1995 | Coleman et al. |
| 5,431,225 A | 7/1995 | Abass et al. |
| 5,476,145 A | 12/1995 | Sengul et al. |
| 5,503,226 A | 4/1996 | Wadleigh |
| 5,529,122 A | 6/1996 | Thach |
| 5,734,988 A | 3/1998 | Alexander et al. |
| 5,803,171 A | 9/1998 | McCaffrey et al. |
| 5,860,475 A | 1/1999 | Godwin et al. |
| 5,874,385 A | 2/1999 | Mzik et al. |
| 5,961,438 A | 10/1999 | Thomas et al. |
| 5,963,508 A | 10/1999 | Withers |
| 5,969,006 A | 10/1999 | Onan et al. |
| 6,012,524 A | 1/2000 | Chatterji et al. |
| 6,016,868 A | 1/2000 | Gregoli et al. |
| 6,186,236 B1 | 2/2001 | Cox |
| 6,220,087 B1 | 4/2001 | Hache et al. |
| 6,257,334 B1 | 7/2001 | Cyr et al. |
| 6,328,104 B1 | 12/2001 | Graue |
| 6,367,548 B1 * | 4/2002 | Purvis ............... E21B 43/14 166/250.01 |
| 6,527,050 B1 | 3/2003 | Sask |
| 6,729,394 B1 | 5/2004 | Hassan et al. |
| 6,758,271 B1 | 7/2004 | Smith |
| 6,854,874 B2 | 2/2005 | Graham |
| 6,873,947 B1 | 3/2005 | Huang et al. |
| 6,913,080 B2 | 7/2005 | Lehman et al. |
| 6,935,426 B1 | 8/2005 | Rainbolt et al. |
| 6,959,762 B2 | 11/2005 | Sask |
| 7,090,020 B2 | 8/2006 | Hill et al. |
| 7,117,943 B2 | 10/2006 | Harris et al. |
| 7,125,162 B2 | 10/2006 | Graham, Sr. |
| 7,127,353 B2 | 10/2006 | Geiser |
| 7,233,150 B2 | 6/2007 | Chen et al. |
| 7,243,718 B2 | 7/2007 | Chen et al. |
| 7,249,633 B2 | 7/2007 | Ravensbergen et al. |
| 7,264,049 B2 | 9/2007 | Maguire |
| 7,322,417 B2 | 1/2008 | Rytlewski et al. |
| 7,424,905 B2 | 9/2008 | Lai |
| 7,441,603 B2 | 10/2008 | Kaminsky et al. |
| 7,516,784 B2 | 4/2009 | Maguire |
| 7,740,065 B2 | 6/2010 | Choi |
| 7,766,083 B2 | 8/2010 | Willett et al. |
| 7,857,056 B2 | 12/2010 | Kaminsky et al. |
| 7,946,342 B1 | 5/2011 | Robertson |
| 8,021,461 B2 | 9/2011 | Seal |
| 8,141,633 B2 | 3/2012 | Hampton et al. |
| 8,154,419 B2 | 4/2012 | Daussin et al. |
| 8,168,570 B2 | 5/2012 | Barron et al. |
| 8,235,117 B1 | 8/2012 | Hill et al. |
| 8,302,687 B2 | 11/2012 | Chen et al. |
| 8,387,699 B2 | 3/2013 | Leshchyshyn et al. |
| 8,505,632 B2 | 8/2013 | Guerrero et al. |
| 8,506,907 B2 | 8/2013 | Angelescu |
| 8,532,969 B2 | 9/2013 | Li et al. |
| 8,752,651 B2 | 6/2014 | Randall et al. |
| 8,899,327 B2 | 12/2014 | Kuhlman et al. |
| 8,905,133 B2 | 12/2014 | Potapenko et al. |
| 8,905,136 B2 | 12/2014 | Todd et al. |
| 8,905,139 B2 | 12/2014 | Arizmendi, Jr. et al. |
| 8,991,499 B2 | 3/2015 | Nevison |
| 9,051,511 B2 | 6/2015 | Parse et al. |
| 9,057,261 B2 | 6/2015 | Walters et al. |
| 9,181,789 B2 | 11/2015 | Nevison |
| 9,260,921 B2 | 2/2016 | Graham et al. |
| 9,354,336 B2 | 5/2016 | Riley et al. |
| 9,389,326 B2 | 7/2016 | Vermilye et al. |
| 9,394,774 B2 | 7/2016 | Soliman et al. |
| 9,410,406 B2 | 8/2016 | Yuan |
| 9,441,470 B2 | 9/2016 | Guerrero et al. |
| 9,500,069 B2 | 11/2016 | Ersoz et al. |
| 9,528,351 B2 | 12/2016 | Vidma et al. |
| 9,557,433 B2 | 1/2017 | Geiser et al. |
| 9,569,521 B2 | 2/2017 | Crafton |
| 9,598,931 B2 | 3/2017 | Murphree et al. |
| 9,605,531 B2 | 3/2017 | Xin et al. |
| 9,611,721 B2 | 4/2017 | Snider et al. |
| 9,617,839 B2 | 4/2017 | Modavi et al. |
| 9,619,592 B2 | 4/2017 | Gurpinar et al. |
| 9,638,017 B2 | 5/2017 | Detournay et al. |
| 9,683,165 B2 * | 6/2017 | Mendell ............... C09K 8/594 |
| 9,702,222 B2 | 7/2017 | Hardesty et al. |
| 9,725,640 B2 | 8/2017 | Tang et al. |
| 9,772,414 B2 | 9/2017 | Diller |
| 9,796,910 B2 | 10/2017 | Nevison |
| 9,796,911 B2 | 10/2017 | Salla |
| 9,803,135 B2 | 10/2017 | Barron et al. |
| 9,828,840 B2 | 11/2017 | Dawson |
| 2002/0007949 A1 | 1/2002 | Tolman et al. |
| 2002/0148608 A1 | 10/2002 | Shaw |
| 2003/0037926 A1 | 2/2003 | Sask |
| 2003/0095871 A1 | 5/2003 | Hebert |
| 2003/0116314 A1 | 6/2003 | Dallas |
| 2003/0195733 A1 | 10/2003 | Huang et al. |
| 2004/0143427 A1 | 7/2004 | Huang et al. |
| 2004/0188093 A1 | 9/2004 | Funchess |
| 2004/0206495 A1 | 10/2004 | Lehman et al. |
| 2005/0020454 A1 * | 1/2005 | Francini ............... C09K 8/72 507/203 |
| 2005/0067351 A1 | 3/2005 | Graham |
| 2005/0077043 A1 | 4/2005 | Dallas |
| 2005/0121193 A1 | 6/2005 | Buchanan et al. |
| 2005/0121196 A1 | 6/2005 | East et al. |
| 2005/0124500 A1 | 6/2005 | Chen et al. |
| 2005/0145385 A1 | 7/2005 | Nguyen |
| 2005/0176590 A1 | 8/2005 | Lehman et al. |
| 2005/0187114 A1 | 8/2005 | Lehman et al. |
| 2005/0252656 A1 | 11/2005 | Maguire |
| 2005/0279161 A1 | 12/2005 | Chen et al. |
| 2005/0279497 A1 | 12/2005 | Chen et al. |
| 2006/0065400 A1 | 3/2006 | Smith |
| 2006/0124309 A1 | 6/2006 | Nguyen et al. |
| 2006/0162924 A1 | 7/2006 | Blevins et al. |
| 2006/0198704 A1 | 9/2006 | Kerfoot |
| 2007/0000666 A1 | 1/2007 | Vozniak et al. |
| 2007/0023186 A1 | 2/2007 | Kaminsky et al. |
| 2007/0156479 A1 | 7/2007 | Long |
| 2007/0235194 A1 | 10/2007 | Maier |
| 2007/0272413 A1 | 11/2007 | Rytlewski et al. |
| 2007/0295499 A1 | 12/2007 | Arthur et al. |
| 2007/0295503 A1 | 12/2007 | Maguire |
| 2008/0093073 A1 | 4/2008 | Bustos et al. |
| 2008/0128131 A1 | 6/2008 | Nguyen et al. |
| 2008/0133186 A1 | 6/2008 | Li et al. |
| 2008/0164030 A1 | 7/2008 | Young |
| 2009/0139715 A1 | 6/2009 | Choi |
| 2009/0166024 A1 | 7/2009 | Chen et al. |
| 2009/0256575 A1 | 10/2009 | Pisklak et al. |
| 2009/0260880 A1 | 10/2009 | Thambynayagam et al. |
| 2009/0277630 A1 | 11/2009 | McDaniel et al. |
| 2010/0044048 A1 | 2/2010 | Leshchyshyn et al. |
| 2010/0071366 A1 | 3/2010 | Klemencic |
| 2010/0076738 A1 | 3/2010 | Dean et al. |
| 2010/0096129 A1 | 4/2010 | Hinkel et al. |
| 2010/0122809 A1 | 5/2010 | Robichaux |
| 2010/0132959 A1 | 6/2010 | Tinker |
| 2010/0138202 A1 | 6/2010 | Mallison et al. |
| 2010/0155142 A1 | 6/2010 | Thambynayagam et al. |
| 2010/0200235 A1 | 8/2010 | Luo et al. |
| 2010/0212906 A1 | 8/2010 | Fulton et al. |
| 2010/0250216 A1 | 9/2010 | Narr et al. |
| 2011/0005761 A1 | 1/2011 | Luo et al. |
| 2011/0048708 A1 | 3/2011 | Glasbergen et al. |
| 2011/0186295 A1 | 8/2011 | Kaminsky et al. |

(56) References Cited

U.S. PATENT DOCUMENTS

| | | |
|---|---|---|
| 2011/0220359 A1 | 9/2011 | Soliman et al. |
| 2011/0277996 A1 | 11/2011 | Cullick et al. |
| 2012/0037360 A1 | 2/2012 | Arizmendi, Jr. et al. |
| 2012/0067571 A1 | 3/2012 | Boerrigter et al. |
| 2012/0145390 A1 | 6/2012 | Parse et al. |
| 2012/0318533 A1 | 12/2012 | Keller et al. |
| 2012/0325467 A1 | 12/2012 | Lebel et al. |
| 2012/0325555 A1 | 12/2012 | Jette et al. |
| 2013/0032336 A1 | 2/2013 | Abbate et al. |
| 2013/0037265 A1 | 2/2013 | Chabert et al. |
| 2013/0056171 A1 | 3/2013 | Klemencic |
| 2013/0100770 A1 | 4/2013 | Diller |
| 2013/0146293 A1 | 6/2013 | Zazovsky et al. |
| 2013/0180712 A1 | 7/2013 | Nasr et al. |
| 2013/0194892 A1 | 8/2013 | Golparian et al. |
| 2013/0199779 A1 | 8/2013 | Scott |
| 2013/0215712 A1 | 8/2013 | Geiser et al. |
| 2013/0220604 A1 | 8/2013 | El-Rabaa et al. |
| 2013/0269423 A1 | 10/2013 | Angelescu |
| 2013/0277050 A1 | 10/2013 | Cherian et al. |
| 2013/0312976 A1 | 11/2013 | Shirley |
| 2013/0341025 A1 | 12/2013 | Gupta |
| 2013/0346035 A1 | 12/2013 | Madasu et al. |
| 2014/0019057 A1 | 1/2014 | Diller |
| 2014/0034309 A1 | 2/2014 | Saini et al. |
| 2014/0076570 A1 | 3/2014 | Nguyen |
| 2014/0083687 A1 | 3/2014 | Poe et al. |
| 2014/0096950 A1 | 4/2014 | Pyecroft et al. |
| 2014/0116682 A1 | 5/2014 | Bracho Dominguez et al. |
| 2014/0166280 A1 | 6/2014 | Stone et al. |
| 2014/0174739 A1 | 6/2014 | Bourcier et al. |
| 2014/0208841 A1 | 7/2014 | Hausot et al. |
| 2014/0212986 A1 | 7/2014 | Angelescu et al. |
| 2014/0216730 A1 | 8/2014 | Ersoz |
| 2014/0246194 A1 | 9/2014 | Artus et al. |
| 2014/0251472 A1 | 9/2014 | Woods |
| 2014/0251626 A1 | 9/2014 | Gomaa et al. |
| 2014/0252260 A1 | 9/2014 | Woods |
| 2014/0262265 A1 | 9/2014 | Hutchins et al. |
| 2014/0299326 A1 | 10/2014 | Crews |
| 2014/0318793 A1 | 10/2014 | van Petergem et al. |
| 2014/0352966 A1 | 12/2014 | Yuan |
| 2014/0371114 A1 | 12/2014 | Todd et al. |
| 2014/0374094 A1 | 12/2014 | Kelly et al. |
| 2014/0374108 A1 | 12/2014 | Vandeponseele et al. |
| 2014/0378354 A1 | 12/2014 | Kelly et al. |
| 2015/0000935 A1 | 1/2015 | Pabon et al. |
| 2015/0047832 A1* | 2/2015 | Yuan .............. E21B 43/17 166/245 |
| 2015/0075784 A1 | 3/2015 | Fonseca Ocampos et al. |
| 2015/0107830 A1 | 4/2015 | Ersoz et al. |
| 2015/0129211 A1 | 5/2015 | Dusseault et al. |
| 2015/0129212 A1 | 5/2015 | Noe et al. |
| 2015/0152719 A1 | 6/2015 | Bahorich |
| 2015/0167441 A1 | 6/2015 | Howell et al. |
| 2015/0175878 A1 | 6/2015 | Kelly et al. |
| 2015/0176394 A1 | 6/2015 | Roussel et al. |
| 2015/0192002 A1 | 7/2015 | Rogers et al. |
| 2015/0211347 A1 | 7/2015 | Snider et al. |
| 2015/0232742 A1 | 8/2015 | Parse et al. |
| 2015/0240148 A1 | 8/2015 | Luharuka et al. |
| 2015/0247385 A1 | 9/2015 | Chen et al. |
| 2015/0258352 A1 | 9/2015 | Lin et al. |
| 2015/0260025 A1 | 9/2015 | Hughes et al. |
| 2015/0275627 A1 | 10/2015 | Xu et al. |
| 2015/0345272 A1 | 12/2015 | Kajaria et al. |
| 2015/0353816 A1 | 12/2015 | Thrash et al. |
| 2015/0354337 A1 | 12/2015 | Ersoz et al. |
| 2015/0369023 A1 | 12/2015 | MacPhail et al. |
| 2016/0003020 A1 | 1/2016 | Sharma |
| 2016/0061026 A1 | 3/2016 | Cherian et al. |
| 2016/0083639 A1 | 3/2016 | Xu et al. |
| 2016/0115772 A1 | 4/2016 | Graham et al. |
| 2016/0123119 A1 | 5/2016 | Tueckmantel et al. |
| 2016/0146963 A1 | 5/2016 | Hall et al. |
| 2016/0160114 A1 | 6/2016 | Chittattukara et al. |
| 2016/0160642 A1 | 6/2016 | Hall et al. |
| 2016/0168968 A1 | 6/2016 | Lecerf et al. |
| 2016/0194945 A1 | 7/2016 | Chen et al. |
| 2016/0222284 A1 | 8/2016 | He et al. |
| 2016/0237797 A1 | 8/2016 | Arizmendi et al. |
| 2016/0237799 A1 | 8/2016 | Dawson |
| 2016/0264849 A1 | 9/2016 | Oliveira et al. |
| 2016/0272875 A1 | 9/2016 | Ghumare et al. |
| 2016/0298025 A1 | 10/2016 | Thrash |
| 2016/0298425 A1 | 10/2016 | Thrash |
| 2016/0298435 A1 | 10/2016 | Mendell |
| 2016/0298436 A1 | 10/2016 | Mendell |
| 2016/0298437 A1 | 10/2016 | Mendell et al. |
| 2016/0312110 A1 | 10/2016 | Vo et al. |
| 2016/0312594 A1 | 10/2016 | Kuchuk et al. |
| 2016/0313469 A1 | 10/2016 | Von Gonten et al. |
| 2016/0319189 A1 | 11/2016 | Dusterhoft et al. |
| 2016/0326427 A1 | 11/2016 | Ogle et al. |
| 2016/0333249 A1 | 11/2016 | Patil et al. |
| 2016/0333261 A1 | 11/2016 | Sparks et al. |
| 2016/0333680 A1 | 11/2016 | Richter et al. |
| 2016/0355728 A1 | 12/2016 | Vendetti et al. |
| 2016/0356118 A1 | 12/2016 | Schmidt et al. |
| 2016/0356138 A1 | 12/2016 | Hughes et al. |
| 2016/0356140 A1 | 12/2016 | Hughes et al. |
| 2016/0356157 A1 | 12/2016 | Hughes et al. |
| 2016/0376495 A1 | 12/2016 | Nguyen et al. |
| 2016/0376882 A1 | 12/2016 | Mendell et al. |
| 2017/0002652 A1 | 1/2017 | Kampfer et al. |
| 2017/0009129 A1 | 1/2017 | Bryant et al. |
| 2017/0017011 A1 | 1/2017 | Howard et al. |
| 2017/0058634 A1 | 3/2017 | Roessler et al. |
| 2017/0058637 A1 | 3/2017 | Roessler et al. |
| 2017/0058639 A1 | 3/2017 | Hardesty et al. |
| 2017/0058640 A1 | 3/2017 | Roessler et al. |
| 2017/0068638 A1 | 3/2017 | Hardesty et al. |
| 2017/0074998 A1 | 3/2017 | McColpin et al. |
| 2017/0074999 A1 | 3/2017 | Walters et al. |
| 2017/0075000 A1 | 3/2017 | Dusterhoft et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0075006 A1 | 3/2017 | Dusterhoft et al. |
| 2017/0075007 A1 | 3/2017 | Walters et al. |
| 2017/0096881 A1 | 4/2017 | Dusterhoft et al. |
| 2017/0096886 A1 | 4/2017 | Chuprakov et al. |
| 2017/0108605 A1 | 4/2017 | Walters et al. |
| 2017/0121589 A1 | 5/2017 | Reddy et al. |
| 2017/0123089 A1 | 5/2017 | Walters et al. |
| 2017/0130121 A1 | 5/2017 | Xu et al. |
| 2017/0137696 A1 | 5/2017 | Mohanty |
| 2017/0138169 A1 | 5/2017 | Bogdan et al. |
| 2017/0145295 A1 | 5/2017 | Nguyen et al. |
| 2017/0152728 A1 | 6/2017 | Abou-Sayed et al. |
| 2017/0210965 A1 | 7/2017 | Cortez et al. |
| 2017/0210974 A1 | 7/2017 | Nguyen et al. |
| 2017/0210977 A1 | 7/2017 | He et al. |
| 2017/0212029 A1 | 7/2017 | Scharmach |
| 2017/0226834 A1 | 8/2017 | Ayasse |
| 2017/0234443 A1 | 8/2017 | Gardiner |
| 2017/0241595 A1 | 8/2017 | Herndon |
| 2017/0267916 A1 | 9/2017 | Singh et al. |
| 2017/0275527 A1 | 9/2017 | LaBlanc et al. |
| 2017/0284179 A1 | 10/2017 | Butula et al. |
| 2017/0292375 A1 | 10/2017 | Feng et al. |
| 2017/0298710 A1 | 10/2017 | Xu et al. |
| 2017/0341981 A1 | 11/2017 | Pinkerton et al. |
| 2017/0349813 A1 | 12/2017 | Rahal et al. |
| 2017/0349821 A1 | 12/2017 | Wei et al. |

FOREIGN PATENT DOCUMENTS

| | | |
|---|---|---|
| CA | 635605 | 1/1962 |
| CA | 640397 | 4/1962 |
| CA | 643314 | 6/1962 |
| CA | 647015 | 8/1962 |

(56) References Cited

FOREIGN PATENT DOCUMENTS

| | | |
|---|---|---|
| CA | 650458 | 10/1962 |
| CA | 654739 | 12/1962 |
| CA | 658803 | 3/1963 |
| CA | 660884 | 4/1963 |
| CA | 661285 | 4/1963 |
| CA | 681288 | 3/1964 |
| CA | 684438 | 4/1964 |
| CA | 684710 | 4/1964 |
| CA | 689817 | 6/1964 |
| CA | 709671 | 5/1965 |
| CA | 715357 | 8/1965 |
| CA | 716377 | 8/1965 |
| CA | 730498 | 3/1966 |
| CA | 740257 | 8/1966 |
| CA | 745455 | 11/1966 |
| CA | 772945 | 12/1967 |
| CA | 778616 | 2/1968 |
| CA | 779091 | 2/1968 |
| CA | 782367 | 4/1968 |
| CA | 785584 | 5/1968 |
| CA | 785585 | 5/1968 |
| CA | 805963 | 2/1969 |
| CA | 805965 | 2/1969 |
| CA | 821504 | 8/1969 |
| CA | 838477 | 4/1970 |
| CA | 840209 | 4/1970 |
| CA | 840789 | 5/1970 |
| CA | 850443 | 9/1970 |
| CA | 852006 | 9/1970 |
| CA | 889692 | 1/1972 |
| CA | 900842 | 5/1972 |
| CA | 913890 | 11/1972 |
| CA | 933343 | 9/1973 |
| CA | 938548 | 12/1973 |
| CA | 989524 | 5/1976 |
| CA | 995130 | 8/1976 |
| CA | 1015656 | 8/1977 |
| CA | 1030062 | 4/1978 |
| CA | 1032076 | 5/1978 |
| CA | 1063015 | 9/1979 |
| CA | 1077833 | 5/1980 |
| CA | 1085718 | 9/1980 |
| CA | 1095226 | 2/1981 |
| CA | 1102234 | 6/1981 |
| CA | 1110163 | 10/1981 |
| CA | 1156550 | 11/1983 |
| CA | 1196268 | 11/1985 |
| CA | 1209031 | 8/1986 |
| CA | 1210322 | 8/1986 |
| CA | 1210687 | 9/1986 |
| CA | 1214988 | 12/1986 |
| CA | 1221026 | 4/1987 |
| CA | 1235652 | 4/1988 |
| CA | 1251390 | 3/1989 |
| CA | 1253794 | 5/1989 |
| CA | 1286217 | 7/1991 |
| CA | 1287565 | 8/1991 |
| CA | 1289057 | 9/1991 |
| CA | 1297401 | 3/1992 |
| CA | 1298780 | 4/1992 |
| CA | 1301444 | 5/1992 |
| CA | 2039919 | 10/1992 |
| CA | 1323561 | 10/1993 |
| CA | 2180267 | 3/1997 |
| CA | 2108194 | 5/1997 |
| CA | 2119682 | 5/1997 |
| CA | 2226988 | 7/1998 |
| CA | 2287944 | 11/1998 |
| CA | 2452364 | 1/2003 |
| CA | 2412911 | 5/2003 |
| CA | 2444043 | 4/2005 |
| CA | 2528696 | 6/2006 |
| CA | 2628778 | 6/2006 |
| CA | 2615972 | 1/2007 |
| CA | 2335737 | 9/2007 |
| CA | 2363909 | 9/2007 |
| CA | 2044473 | 9/2009 |
| CA | 2707209 | 1/2011 |
| CA | 2713325 | 2/2011 |
| CA | 2729430 | 7/2011 |
| CA | 2732675 | 8/2011 |
| CA | 2757125 | 2/2013 |
| CA | 2813878 | 10/2013 |
| CA | 2900549 | 10/2014 |
| CA | 2900550 | 10/2014 |
| CA | 2900552 | 10/2014 |
| CA | 2900554 | 10/2014 |
| CA | 2901058 | 10/2014 |
| CA | 2901061 | 10/2014 |
| CA | 2817612 | 11/2014 |
| CA | 2915797 | 2/2015 |
| CA | 2917580 | 2/2015 |
| CA | 2862556 | 3/2015 |
| CA | 2863764 | 3/2015 |
| CA | 2832626 | 5/2015 |
| CA | 2937225 | 6/2015 |
| CA | 2930183 | 7/2015 |
| CA | 2931183 | 7/2015 |
| CA | 2933425 | 7/2015 |
| CA | 2847759 | 9/2015 |
| CA | 2933487 | 9/2015 |
| CA | 2946277 | 11/2015 |
| CA | 2894383 | 12/2015 |
| CA | 2945469 | 12/2015 |
| CA | 2945472 | 12/2015 |
| CA | 2945740 | 12/2015 |
| CA | 2945742 | 12/2015 |
| CA | 2946179 | 12/2015 |
| CA | 2946183 | 12/2015 |
| CA | 2946184 | 12/2015 |
| CA | 2947101 | 12/2015 |
| CA | 2947576 | 12/2015 |
| CA | 2947581 | 12/2015 |
| CA | 2947674 | 12/2015 |
| CA | 2947675 | 12/2015 |
| CA | 2947842 | 12/2015 |
| CA | 2951621 | 2/2016 |
| CA | 2934651 | 4/2016 |
| CA | 2869778 | 6/2016 |
| CA | 2823598 | 8/2016 |
| CA | 2893909 | 10/2016 |
| CA | 2831928 | 11/2016 |
| CA | 2937865 | 1/2017 |
| CA | 2944980 | 2/2017 |
| EP | 353740 | 2/1990 |
| EP | 898049 | 2/1999 |
| EP | 2128653 | 12/2009 |
| EP | 2431567 | 3/2012 |
| EP | 2436748 | 4/2012 |
| EP | 2924233 | 9/2015 |
| EP | 2231824 | 4/2016 |
| EP | 2649148 | 5/2016 |
| EP | 2649147 | 6/2016 |
| EP | 3135858 | 3/2017 |
| EP | 3168595 | 5/2017 |
| EP | 2607313 | 12/2017 |
| GB | 844229 | 8/1960 |
| GB | 905936 | 9/1962 |
| GB | 960112 | 6/1964 |
| GB | 1045578 | 10/1966 |
| GB | 1309281 | 3/1973 |
| GB | 1327937 | 8/1973 |
| GB | 1401712 | 7/1975 |
| GB | 1458799 | 12/1976 |
| GB | 1460647 | 1/1977 |
| GB | 1463444 | 2/1977 |
| GB | 1470855 | 4/1977 |
| GB | 1493890 | 11/1977 |
| GB | 1504192 | 3/1978 |
| GB | 1542810 | 3/1979 |
| GB | 2033258 | 5/1980 |
| GB | 2033259 | 5/1980 |
| GB | 2062063 | 4/1983 |
| GB | 2050467 | 8/1983 |

(56) References Cited

FOREIGN PATENT DOCUMENTS

| | | |
|---|---|---|
| GB | 2354781 | 8/2001 |
| GB | 2360304 | 9/2001 |
| GB | 2394735 | 5/2004 |
| GB | 2435657 | 6/2009 |
| GB | 2520719 | 1/2014 |
| GB | 2514075 | 11/2014 |
| MX | PA05010022 | 3/2006 |
| MX | 2011001947 | 4/2011 |
| MX | 2012004100 | 7/2012 |
| MX | 2012009133 | 9/2012 |
| MX | 2012011101 | 11/2012 |
| MX | 2013001121 | 5/2013 |
| MX | 2013007512 | 8/2013 |
| MX | 2013001364 | 9/2013 |
| MX | 2013008324 | 11/2014 |
| MX | 2014005083 | 2/2015 |
| MX | 2015009419 | 1/2016 |
| MX | 2015008297 | 2/2016 |
| MX | 2015008405 | 2/2016 |
| MX | 2015015739 | 3/2016 |
| MX | 2015015943 | 4/2016 |
| MX | 2015016569 | 4/2016 |
| MX | 2015017806 | 4/2016 |
| MX | 2015017813 | 4/2016 |
| MX | 2015015125 | 6/2016 |
| MX | 2015014256 | 7/2016 |
| MX | 2016004356 | 7/2016 |
| MX | 2016004925 | 7/2016 |
| MX | 341255 | 8/2016 |
| MX | 2015016764 | 8/2016 |
| MX | 2015017867 | 11/2016 |
| MX | 2016012330 | 1/2017 |
| MX | 2016013294 | 1/2017 |
| MX | 2016013936 | 1/2017 |
| MX | 345470 | 2/2017 |
| MX | 2016014601 | 2/2017 |
| MX | 2016016240 | 3/2017 |
| MX | 2016016331 | 3/2017 |
| MX | 2016015837 | 4/2017 |
| MX | 2015014405 | 7/2017 |
| MX | 2017003124 | 8/2017 |
| WO | WO 87/02410 | 4/1987 |
| WO | WO 96/03566 | 2/1996 |
| WO | WO 97/12119 | 4/1997 |
| WO | WO 97/38208 | 10/1997 |
| WO | WO 98/50679 | 11/1998 |
| WO | WO 99/04292 | 1/1999 |
| WO | WO 99/67505 | 12/1999 |
| WO | WO 03002152 | 1/2003 |
| WO | WO 03038278 | 5/2003 |
| WO | WO 03060281 | 7/2003 |
| WO | WO 2005/045192 | 5/2005 |
| WO | WO 2005/124395 | 12/2005 |
| WO | WO 2008/041990 | 4/2008 |
| WO | WO 2009/113895 | 9/2009 |
| WO | WO 2009/137565 | 11/2009 |
| WO | WO 2009/146563 | 12/2009 |
| WO | WO 2010/011402 | 1/2010 |
| WO | WO 2010/033710 | 3/2010 |
| WO | WO 2010/039448 | 4/2010 |
| WO | WO 2010/065769 | 6/2010 |
| WO | WO 2010/111398 | 9/2010 |
| WO | WO 2010/123587 | 10/2010 |
| WO | WO 2011/079742 | 7/2011 |
| WO | WO 2011/100509 | 8/2011 |
| WO | WO 2011/109143 | 9/2011 |
| WO | WO 2011/115723 | 9/2011 |
| WO | WO 2011/119409 | 9/2011 |
| WO | WO 2011/146866 | 11/2011 |
| WO | WO 2012/080296 | 6/2012 |
| WO | WO 2012/097426 | 7/2012 |
| WO | WO 2013/006794 | 1/2013 |
| WO | WO 2013/074237 | 5/2013 |
| WO | WO 2013/109638 | 7/2013 |
| WO | WO 2013/154537 | 10/2013 |
| WO | WO 2014/031607 | 2/2014 |
| WO | WO 2014/036245 | 3/2014 |
| WO | WO 2014/048119 | 4/2014 |
| WO | WO 2014/053043 | 4/2014 |
| WO | WO 2014/065973 | 5/2014 |
| WO | WO 2014/121270 | 8/2014 |
| WO | WO 2014/124533 | 8/2014 |
| WO | WO 2014/163816 | 10/2014 |
| WO | WO 2014/163817 | 10/2014 |
| WO | WO 2014/163818 | 10/2014 |
| WO | WO 2014/163820 | 10/2014 |
| WO | WO 2014/163821 | 10/2014 |
| WO | WO 2014/163822 | 10/2014 |
| WO | WO 2014/167056 | 10/2014 |
| WO | WO 2014/193409 | 12/2014 |
| WO | WO 2015/026319 | 2/2015 |
| WO | WO 2015/026331 | 2/2015 |
| WO | WO 2015/066804 | 5/2015 |
| WO | WO 2015/072882 | 5/2015 |
| WO | WO 2015/074243 | 5/2015 |
| WO | WO 2015/088682 | 6/2015 |
| WO | WO 2015/095557 | 6/2015 |
| WO | WO 2015/102580 | 7/2015 |
| WO | WO 2015/105491 | 7/2015 |
| WO | WO 2015/105513 | 7/2015 |
| WO | WO 2015/112130 | 7/2015 |
| WO | WO 2015/112132 | 7/2015 |
| WO | WO 2015/122896 | 8/2015 |
| WO | WO 2015/122899 | 8/2015 |
| WO | WO 2015/126418 | 8/2015 |
| WO | WO 2015/134022 | 9/2015 |
| WO | WO 2015/137955 | 9/2015 |
| WO | WO 2015/175477 | 11/2015 |
| WO | WO 2015/178909 | 11/2015 |
| WO | WO 2014/204709 | 12/2015 |
| WO | WO 2015/184437 | 12/2015 |
| WO | WO 2015/187136 | 12/2015 |
| WO | WO 2015/187137 | 12/2015 |
| WO | WO 2015/187139 | 12/2015 |
| WO | WO 2015/187140 | 12/2015 |
| WO | WO 2015/187141 | 12/2015 |
| WO | WO 2015/187142 | 12/2015 |
| WO | WO 2015/187145 | 12/2015 |
| WO | WO 2015/187147 | 12/2015 |
| WO | WO 2015/187149 | 12/2015 |
| WO | WO 2015/187150 | 12/2015 |
| WO | WO 2015/187151 | 12/2015 |
| WO | WO 2015/187153 | 12/2015 |
| WO | WO 2015/188115 | 12/2015 |
| WO | WO 2015/191038 | 12/2015 |
| WO | WO 2015/195451 | 12/2015 |
| WO | WO 2015/199660 | 12/2015 |
| WO | WO 2015187152 | 12/2015 |
| WO | WO 2016/004137 | 1/2016 |
| WO | WO 2016/004215 | 1/2016 |
| WO | WO 2016/015654 | 2/2016 |
| WO | WO 2016/018429 | 2/2016 |
| WO | WO 2016/018431 | 2/2016 |
| WO | WO 2016/028256 | 2/2016 |
| WO | WO 2016/028284 | 2/2016 |
| WO | WO 2016/032458 | 3/2016 |
| WO | WO 2016/032459 | 3/2016 |
| WO | WO 2016/032513 | 3/2016 |
| WO | WO 2016/041189 | 3/2016 |
| WO | WO 2016/048349 | 3/2016 |
| WO | WO 2016/076862 | 5/2016 |
| WO | WO 2016/076877 | 5/2016 |
| WO | WO 2016/082188 | 6/2016 |
| WO | WO 2016/089387 | 6/2016 |
| WO | WO 2016/089388 | 6/2016 |
| WO | WO 2016/091972 | 6/2016 |
| WO | WO 2016/093835 | 6/2016 |
| WO | WO 2016/105338 | 6/2016 |
| WO | WO 2016/118167 | 7/2016 |
| WO | WO 2016/126266 | 8/2016 |
| WO | WO 2016/127108 | 8/2016 |
| WO | WO 2016/137448 | 9/2016 |
| WO | WO 2016/144767 | 9/2016 |
| WO | WO 2016/175784 | 11/2016 |

(56) References Cited

FOREIGN PATENT DOCUMENTS

| | | |
|---|---|---|
| WO | WO 2016/182581 | 11/2016 |
| WO | WO 2016/200367 | 12/2016 |
| WO | WO 2017/003813 | 1/2017 |
| WO | WO 2017/011658 | 1/2017 |
| WO | WO 2017/018996 | 2/2017 |
| WO | WO 2017/018998 | 2/2017 |
| WO | WO 2017/025821 | 2/2017 |
| WO | WO 2017/027433 | 2/2017 |
| WO | WO 2017/039600 | 3/2017 |
| WO | WO 2017/052524 | 3/2017 |
| WO | WO 2017/052525 | 3/2017 |
| WO | WO 2017/052527 | 3/2017 |
| WO | WO 2017/052529 | 3/2017 |
| WO | WO 2017/062627 | 3/2017 |
| WO | WO 2017/058245 | 4/2017 |
| WO | WO 2017/058267 | 4/2017 |
| WO | WO 2017/063073 | 4/2017 |
| WO | WO 2017/074393 | 5/2017 |
| WO | WO 2017/074400 | 5/2017 |
| WO | WO 2017/074462 | 5/2017 |
| WO | WO 2017/078685 | 5/2017 |
| WO | WO 2017/078703 | 5/2017 |
| WO | WO 2017/091586 | 6/2017 |
| WO | WO 2017/099717 | 6/2017 |
| WO | WO 2017/106724 | 6/2017 |
| WO | WO 2017/150962 | 9/2017 |
| WO | WO 2017/161011 | 9/2017 |
| WO | WO 2017/171731 | 10/2017 |
| WO | WO 2017/173329 | 10/2017 |
| WO | WO 2017/189199 | 11/2017 |
| WO | WO 2017/205250 | 11/2017 |
| WO | WO 2017/209740 | 12/2017 |
| WO | WO 2017/209768 | 12/2017 |

OTHER PUBLICATIONS

U.S. Appl. No. 15/870,677, filed Jan. 12, 2018, Mendell et al.
U.S. Appl. No. 15/870,713, filed Jan. 12, 2018, Mendell et al.
Notice of Allowance for U.S. Appl. No. 14/957,182, dated Jan. 31, 2018, 9 pages.
Official Action for U.S. Appl. No. 15/870,713, dated Apr. 6, 2018, 17 pages.
Official Action for U.S. Appl. No. 15/870,713, dated Mar. 2, 2018, 27 pages.
"Is using nitrogen for water-free fracking the way forward?," Shale Gas International, 2014, 5 pages.
"MistFracsm Service," Halliburton Communications, 2005, 2 pages.
Freeman, "A Stimulation Technique Using Only Nitrogen," Society of Petroleum Engineers, SPE-10129-PA, 1983, 2 pages, abstract only.
Grundmann et al., "Cryogenic Nitrogen as a Hydraulic Fracturing Fluid in the Devonian Shale," Society of Petroleum Engineers, SPE-51067-MS, 1998, 2 pages, abstract only.
Gurule, "Nitrogen gas fracking," Frackwire, 2013, 5 pages.
Kennedy et al., "Case Study on the Effectiveness of Nitrogen Foams and Water Zone Diverting Agents in Multistage Matrix Acid Treatments," Society of Petroleum Engineers, SPE-20621-PA, 1992, 2 pages, abstract only.
Li et al., "Chemical Additives and Foam to Enhance SAGD Performance," Society of Petroleum Engineers, SPE-174489-MS, 2015, 2 pages, abstract only.
Little, "Nitrogen-heavy gas drilling method common in Tenn.," Knoxville News Sentinel, 2010, 6 pages.
Morgenthaler et al., "Model Wellbore Evaluation of Diverter Effectiveness Confirmed by Field Results," Society of Petroleum Engineers, SPE-31140-MS, 1996, 2 pages, abstract only.
Parton et al., "Long Interval Foamed Diversion Treatment: A Mid-Scale Multizone Diversion Treatment Study," Society of Petroleum Engineers, SPE-174247-MS, 2015, 2 pages, abstract only.
Presley, "Energized fracturing comes to the Bakken," EP Magazine, 2015, 1 page.
Vincent et al., "Refracs-Why Do They Work, and Why Do They Fail in 100 Published Field Studies?," Society of Petroleum Engineers, SPE 134330-MS, 2010, 2 pages, abstract only.
Vincent, "Restimulation of Unconventional Reservoirs: When are Refracs Beneficial?," Society of Petroleum Engineers, SPE-136757-MS, 2010, 2 pages, abstract only.
Watts, "Waterless fracking promises more energy, less trouble," Watts Up With That?, 2014, 2 pages.
International Search Report and Written Opinion for International (PCT) Patent Application No. PCT/US2015/027301, dated Jul. 10, 2015, 9 pages.
International Search Report and Written Opinion for International (PCT) Patent Application No. PCT/IB2015/002469, dated Mar. 30, 2016, 11 pages.
International Search Report and Written Opinion for International (PCT) Patent Application No. PCT/IB2016/063354, dated Feb. 15, 2017, 13 pages.
International Search Report and Written Opinion for International (PCT) Patent Application No. PCT/US17/26089, dated Jun. 20, 2017, 6 pages.
Official Action for Great Britain Patent Application No. 1508229.0, dated May 26, 2015, 2 pages.
Search Report for Great Britain Patent Application No. 1508229.0, dated Jun. 18, 2015, 5 pages.
Official Action for Great Britain Patent Application No. 1522493.4, dated Dec. 31, 2015, 2 pages.
Search Report for Great Britain Patent Application No. 1522493.4, dated Feb. 26, 2016, 5 pages.
Official Action for U.S. Appl. No. 14/690,208, dated Dec. 21, 2016, 15 pages.
Final Action for U.S. Appl. No. 14/690,208, dated Apr. 5, 2017, 22 pages.
Official Action for U.S. Appl. No. 14/728,719, dated Dec. 21, 2016, 20 pages.
Final Action for U.S. Appl. No. 14/728,719, dated Apr. 3, 2017, 9 pages.
Notice of Allowance for U.S. Appl. No. 14/728,719, dated May 17, 2017, 7 pages.
Official Action for U.S. Appl. No. 14/957,182, dated Dec. 23, 2016, 25 pages.
Final Action for U.S. Appl. No. 14/957,182, dated Apr. 12, 2017, 50 pages.
Official Action for U.S. Appl. No. 15/197,384, dated Nov. 14, 2016, 8 pages, Restriction Requirement.
Official Action for U.S. Appl. No. 15/197,384, dated Feb. 2, 2017, 27 pages.
Notice of Allowance for U.S. Appl. No. 15/197,384, dated Mar. 8, 2017 26 pages.
SearchReport-1_dated Dec. 28, 2017_1-200, 232 pages.
SearchReport-1_dated Dec. 28, 2017_201-400, 230 pages.
SearchReport-1_dated Dec. 28, 2017_401-600, 243 pages.
SearchReport-1_dated Dec. 28, 2017_601-800, 241 pages.
SearchReport-1_dated Dec. 28, 2017_801-1000, 216 pages.
SearchReport-1_dated Dec. 28, 2017_1001-1047, 48 pages.
2ndSearchReport_dated Dec. 28, 2017, 116 pages.
International Preliminary Report on Patentability for International (PCT) Patent Application No. PCT/IB2015/002469, dated Oct. 19, 2017, 8 pages.
International Preliminary Report on Patentability for International (PCT) Patent Application No. PCT/US2015/027301, dated Oct. 19, 2017, 7 pages.
Notice of Allowance for U.S. Appl. No. 14/690,208, dated Aug. 14, 2017, 7 pages.
Notice of Allowance for U.S. Appl. No. 14/957,182, dated Oct. 2, 2017, 8 pages.
U.S. Appl. No. 16/096,904, filed Oct. 26, 2018, Mendell et al.
U.S. Appl. No. 16/209,705, filed Dec. 4, 2018, Mendell et al.
International Preliminary Report on Patentability for International (PCT) Patent Application No. PCT/US17/26089, dated Nov. 8, 2018, 5 pages.
Official Action for U.S. Appl. No. 15/870,677, dated Nov. 9, 2018, 37 pages.

(56) References Cited

OTHER PUBLICATIONS

Official Action for U.S. Appl. No. 15/870,713, dated Nov. 9, 2018, 35 pages.
International Preliminary Report on Patentability for International (PCT) Patent Application No. PCT/uS2016/063354, dated Jun. 7, 2018, 14 pages.
Official Action for U.S. Appl. No. 15/870,713, dated Jul. 10, 2018, 17 pages.

* cited by examiner

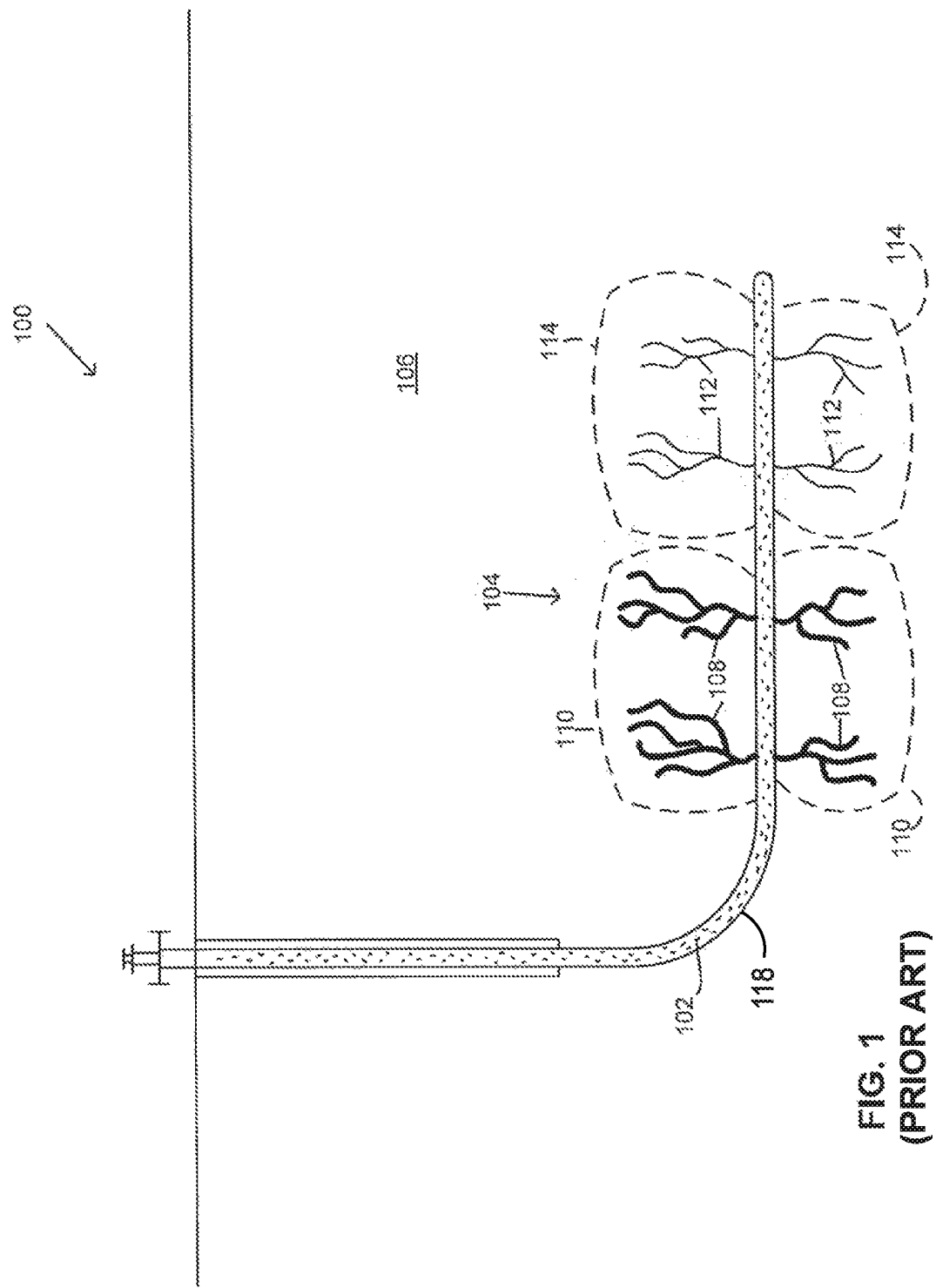

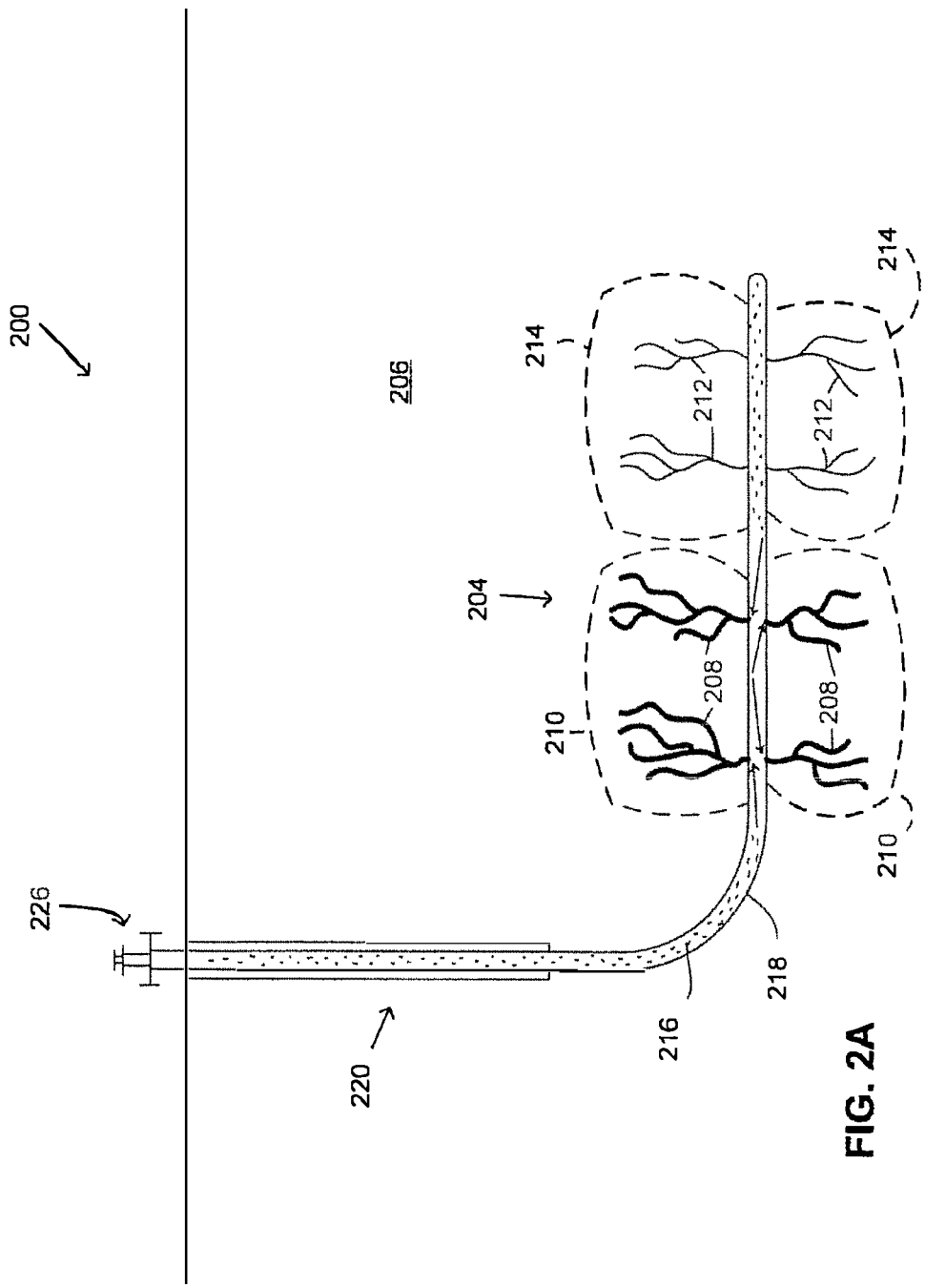

GAS DIVERTER FOR WELL AND RESERVOIR STIMULATION

CROSS REFERENCE TO RELATED APPLICATIONS

The present application claims priority under 35 U.S.C. § 119 to U.S. Provisional Patent Application Nos. 62/449,957, which was filed Jan. 24, 2017; and 62/473,888, which was filed Mar. 20, 2017.

The present application is a divisional application of and claims priority to U.S. patent application Ser. No. 15/197,384, which was filed on Jun. 29, 2016.

U.S. patent application Ser. No. 15/197,384 claims priority under 35 U.S.C. § 119 to U.S. Provisional Patent Aplication Nos. 62/340,738, which was filed May 24, 2016; and 62/328,405, which was filed Apr. 27, 2016.

U.S. patent application Ser. No. 15/197,384 is a continuation-in-part application of and claims priority to U.S. patent application Ser. No. 14/957,182, which was filed Dec. 2, 2015.

U.S. patent application Ser. No. 14/957,182 claims priority under 35 U.S.C. § 119 to U.S. Provisional Patent Application Nos. 62/196,485, which was filed Jul. 24, 2015; 62/209,201, which was filed Aug. 24, 2015; 62/248,890, which was filed on Oct. 30, 2015; 62/248,907, which was filed Oct. 30, 2015; 62/250,361, which was filed Nov. 3, 2015; 62/250,365, which was filed Nov. 3, 2015; and 62/260,090, which was filed Nov. 25, 2015.

U.S. patent application Ser. No. 14/957,182 is also a continuation-in-part of U.S. patent Application Ser. No. 14/728,719, which was filed Jun. 2, 2015.

U. S. patent application Ser. No. 14/728,719 is also a continuation-in-part of U.S. patent Application Ser. No. 14/690,208, which was filed Apr. 17, 2015.

U.S. patent application Ser. No. 14/690,208 claims priority under 35 U.S.C. § 119 to U.S. Provisional Patent Application No. 62/145,439, which was filed Apr. 9, 2015.

The present application is a continuation-in-part application of and claims priority to U.S. patent application Ser. No. 14/957,182, which was filed Dec. 2, 2015.

U.S. patent application Ser. No. 14/957,182 claims priority under 35 U.S.C. § 119 to U.S. Provisional Patent Application Nos. 62/196,485, which was filed Jul. 24, 2015; 62/209,201, which was filed Aug. 24, 2015; 62/248,890, which was filed on Oct. 30, 2015; 62/248,907, which was filed Oct. 30, 2015; 62/250,361, which was filed Nov. 3, 2015; 62/250,365, which was filed Nov. 3, 2015; and 62/260,090, which was filed Nov. 25, 2015.

U.S. patent application Ser. No. 14/957,182 is also a continuation-in-part of U.S. patent application Ser. No. 14/728,719, which was filed Jun. 2, 2015.

U.S. patent application Ser. No. 14/728,719 is also a continuation-in-part of U.S. patent application Ser. No. 14/690,208, which was filed Apr. 17, 2015.

U.S. patent application Ser. No. 14/690,208 claims priority under 35 U.S.C. § 119 to U.S. Provisional Patent Application No. 62/145,439, which was filed Apr. 9, 2015.

The present application is a continuation-in-part application of and claims priority to U.S. patent application Ser. No. 14/728,719, which was filed Jun. 2, 2015.

U.S. patent application Ser. No. 14/728,719 is also a continuation-in-part of U.S. patent application Ser. No. 14/690,208, which was filed Apr. 17, 2015.

U.S. patent application Ser. No. 14/690,208 claims priority under 35 U.S.C. § 119 to U.S. Provisional Patent Application No. 62/145,439, which was filed Apr. 9, 2015.

The present application is a continuation-in-part application of and claims priority to U.S. patent application Ser. No. 14/690,208, which was filed Apr. 17, 2015.

U.S. patent application Ser. No. 14/690,208 claims priority under 35 U.S.C. § 119 to U.S. Provisional Patent Application No. 62/145,439, which was filed Apr. 9, 2015.

Each of the above-identified applications are incorporated in their entirety herein by this reference.

BACKGROUND

Oil and gas wells are stimulated and re-stimulated in various ways to increase production of a flow of hydrocarbons from a completed well. With a newly completed well with a large reservoir and easily captured hydrocarbons, for example, the well may not require much or any stimulation techniques to produce an adequate flow of hydrocarbons from the well. Other wells, depending on composition or otherwise, may require more well stimulation to release the hydrocarbons from the subterranean formation containing the hydrocarbons.

In recent years, hydraulic fracturing has become a widely-used well stimulation technique to increase well production and access previously uncaptured hydrocarbons. Hydraulic fracturing involves hydraulically fracturing the subterranean formation with a pressurized liquid or fracturing liquid, containing water, proppant (e.g., sand or man-made alternative), and/or chemicals, that is injected into a wellbore. Upon pressurizing the wellbore with the fracturing liquid, the formation fractures or cracks and the fracturing liquid can leave behind proppant, propping open the formation which allows the hydrocarbons to flow more freely through the fractures and into the wellbore to be recovered. In some instances, an artificial lift system may pump hydrocarbons from the reservoir to overcome the hydrostatic head pressure of the hydrocarbons, or the hydrocarbons may flow freely up the wellbore without assistance.

SUMMARY

These and other needs are addressed by the present disclosure. Aspects of the present disclosure can have advantages over current practices. In contrast to current practices, the process(es) of the present disclosure can, in accordance with some embodiments, change the fracture gradient of a downhole formation. For example, the processes described herein can change one or more of the fracture gradients of low and high stress downhole formations. More particularly, the process of the present disclosure in relation to current practices can decrease the extent and/or degree of fracturing within the low stress downhole formations and increase the degree of fracturing within the high stress formations.

Furthermore, the processes of the present disclosure can be conducted in the absence or substantial absence of solid particulates. It can be appreciated that solid particles can be detrimental to well health and productivity. Processes of the present disclosure also can be conducted in the presence of solid particulates. Moreover, the process of the present disclosure can be used in any well bore orientation, whether horizontal, vertical or in between. It can be appreciated that the advantages of processes of the present disclosure can improve well economics and increase recoverable reserves.

While not wanting to be bound by any theory, it is believed the processes described within this disclosure can change the fracture pressure gradient of a downhole formation by changing the stress profile and, therefore, more easily fracture the downhole formation with a fracturing liquid. It is further believed that injecting a gas and/or a foam into the downhole formation can increase the formation pore pressures of the high and low stress formations exposed by the well bore. Moreover, it is believed that injecting of the gas and/or foam can substantially equalize the pore pressures of the high and low stress formations. It can be appreciated that one or both of the increased pore pressures of the high and low stress formations and the substantially equalized pore pressures of the high and low stress formations can change the fracture gradients of one or both of the high and low stress formations compared to current practices.

In accordance with some aspects of the present disclosure is a process and/or method of treating a subterranean formation penetrated by a wellbore. The process and/or method can include introducing a gas-containing composition comprising one or more of a gas, a foam, or a mixture of gas and foam into one or more features of the subterranean formation extending from the wellbore. The one or more features can comprise fractures, pore volumes or a combination of fractures and pore volumes. The method and/or process can further include introducing a diverting composition into the one or more features of the subterranean formation extending from the wellbore. Typically, the diverting composition is introduced into the subterranean formation after the introduction of the gas-containing composition into the subterranean formation. However, the diverting composition can be introduced into the subterranean formation before or simultaneous with the introduction of the gas-containing composition. Generally, the diverting composition contains one or more of a diverting fluid and a diverting agent. The diverting fluid can be a gas-phase fluid or a liquid-phase fluid. Commonly, the diverting fluid is a liquid-phase fluid. In accordance with some embodiments, the process and/or method can include introducing a fracturing liquid into the subterranean formation. The fracturing liquid can be introduced into the subterranean formation under sufficient a pressure. It can be appreciated that the introducing of the fracturing liquid into the subterranean formation under the sufficient pressure can fracture a portion of the subterranean formation. It can be further appreciated that the fracturing of a portion of the subterranean formation can release hydrocarbons from the subterranean formation. It is believed that the gas occupies the one or more features at a sufficient pressure to cause the fracturing liquid to be diverted to additional features of the subterranean formation defined by the portion, the additional features including additional fractures or pore volumes.

Aspects of the present disclosure involve a method of treating a subterranean formation penetrated by a wellbore. The method includes introducing a composition comprising a gas (or foam) into features of the subterranean formation extending from the wellbore, the features including fractures or pore volumes. The method further includes introducing a diverting composition including a fluid and a diverting agent into the features of the subterranean formation extending from the wellbore. The method further includes introducing a fracturing liquid into the subterranean formation under a sufficient pressure to fracture a portion of the subterranean formation and release hydrocarbons from the subterranean formation. Furthermore, the gas occupies the features at a sufficient pressure to cause the fracturing liquid to be diverted to additional features contained within of the subterranean formation defined by the portion of the subterranean formation. The additional features can include additional fractures or pore volumes.

Aspects of the present disclosure can also involve a method of treating a subterranean formation penetrated by a wellbore. The method can include introducing a first diverting composition comprising of a gas (or foam) into the wellbore and into fractures or pore volumes of the subterranean formation extending from the wellbore. The method can further include introducing a second diverting composition including a fluid and a diverting agent into the subterranean formation. The method can further include introducing a fracturing liquid into the subterranean formation, wherein the gas (or foam) is sufficiently pressurized within the fractures or pore volumes to cause the fracturing liquid to pressurize and fracture additional fractures or pore volumes within the subterranean formation.

Aspects of the present disclosure can also involve a method of treating a subterranean formation penetrated by a wellbore. The method can include introducing a first diverting composition comprising a foam mixture of gas and liquid into features of the subterranean formation extending from the wellbore, the features comprising fractures or pore volumes. The method can further include introducing a second diverting composition comprising a fluid and a diverting agent into the subterranean formation. The method can further include introducing a fracturing liquid into the subterranean formation under sufficient pressure to fracture a portion of the subterranean formation and release hydrocarbons from the subterranean formation. The foam mixture can occupy the features at a sufficient pressure to cause the fracturing liquid to be diverted to additional features of the subterranean formation defined by the portion of the subterranean formation, the additional features comprising additional fractures or pore volumes.

Aspects of the present disclosure can also involve a method of treating a subterranean formation penetrated by a wellbore. The method can include introducing a composition comprising a substantially compressible substance into features of the subterranean formation extending from the wellbore, the features comprising fractures or pore volumes. The method can further include introducing a substantially incompressible substance into the subterranean formation under a sufficient pressure to fracture a portion of the subterranean formation and release hydrocarbons from the subterranean formation. The substantially compressible substance can occupy the features at a sufficient pressure to cause the substantially incompressible substance to be diverted to additional features of the subterranean formation defined by the portion the subterranean formation, the additional features can comprise additional fractures and pore volumes.

In accordance with some embodiments of the present disclosure is a method that includes injecting a gas into a wellbore at a rate from about 30 to about 500,000 scf/min, where the injected gas occupies first and second portions of a subterranean formation and, thereafter, introducing a fracturing liquid into the wellbore at a sufficient pressure to fracture the second portion of the subterranean formation to a greater extent than the first portion of the subterranean formation.

In accordance with some embodiments of the present disclosure is a method that includes injecting a gas into a wellbore at a rate from about 30 to about 500,000 scf/min and, thereafter, introducing a fracturing liquid into the wellbore at a sufficient pressure to fracture a subterranean formation, and where: (i) the subterranean formation has a first hydrocarbon production rate prior to the injecting of the gas; (ii) the injected gas occupies some of the subterranean formation; (iii) the fractured subterranean formation has a second hydrocarbon production rate; and (iv) the second hydrocarbon production rate is greater than the first hydrocarbon production rate.

In accordance with some embodiments of the present disclosure is a method that includes injecting from about 1,000 scf to about 1,000,000,000 scf of a gas into a wellbore, where the injected gas occupies first and second portions of a subterranean formation, and, thereafter, introducing a fracturing liquid into the wellbore at a sufficient pressure to fracture the second portion of the subterranean formation to a greater extent than the first portion of the subterranean formation.

In accordance with some embodiments of the present disclosure is a method that includes injecting from about 1,000 to about 1,000,000,000 scf of a gas into a wellbore, and thereafter, introducing a fracturing liquid into the wellbore at a sufficient pressure, and where: (i) the subterranean formation has a first hydrocarbon production rate prior to the injecting of the gas; (ii) the injected gas occupies some of the subterranean formation; (iii) the injected gas is injected at a sufficient pressure to fracture the subterranean formation; (iv) the fractured subterranean formation has a second hydrocarbon production rate; and (iv) the second hydrocarbon production rate is greater than the first hydrocarbon production rate.

In accordance with some embodiments of the present disclosure is a method that includes injecting a gas into a wellbore, where the injected gas occupies first and second portions of a subterranean formation and the gas injected in the first and second portions of the subterranean formation comprising at least about 500 scf/lfcA over a lfcA from about 1 foot to about 15 miles of the wellbore, and thereafter, introducing a fracturing liquid into the wellbore at a sufficient pressure to fracture the second portion of the subterranean formation to a greater extent than the first portion of the subterranean formation.

In accordance with some embodiments of the present disclosure is a method of injecting a gas into a wellbore at a rate from about 30 to 500,000 scf/min, where the injected gas occupies a portion of a subterranean formation and, thereafter, introducing a fracturing liquid into the wellbore at a sufficient pressure to fracture the subterranean formation.

In accordance with some embodiments of the present disclosure is a method of injecting a gas into a wellbore at a rate from about 30 to 500,000 scf/min, where the injected gas occupies first and second portions of a subterranean formation and, thereafter, introducing a fracturing liquid into the wellbore at a sufficient pressure to fracture the subterranean formation.

In accordance with some embodiments of the present disclosure is a method of injecting from about 1,000 to 1,000,000,000 scf of gas into a wellbore, where the injected gas occupies a portion of the subterranean formation and, thereafter, introducing a fracturing liquid into the wellbore at a sufficient pressure to fracture the subterranean formation. In accordance with some embodiments of this disclosure is a method of injecting from about 1,000 to 1,000,000,000 scf of gas into a wellbore, where the injected gas occupies first and second portions of the subterranean formation and, thereafter, introducing a fracturing liquid into the wellbore at a sufficient pressure to fracture the subterranean formation.

In accordance with some embodiments of the present disclosure is a method that includes injecting a gas into a wellbore and thereafter, introducing a fracturing liquid into the wellbore at a sufficient pressure to fracture at least some of a subterranean formation, where: (i) the injected gas occupies a subterranean formation comprising at least about 500 scf/lfcA over a lfcA from about 1 foot to about 15 miles of the wellbore; (ii) the subterranean formation has a first hydrocarbon production rate before the injecting of the gas; (iii) the fractured subterranean formation has a second hydrocarbon production rate; and (iv) the second hydrocarbon production rate is greater than the first hydrocarbon production rate.

In some embodiments of the present disclosure, the first portion of the subterranean formation can contain first portion fractures. In some embodiments of the present disclosure, the first portion of the subterranean formation can contain first portion pore volumes. Furthermore, the first portion of the subterranean formation can contain first portion fractures and first portion pore volumes.

In some embodiments of the present disclosure, the second portion of the subterranean formation can contain second portion fractures. In some embodiments of the disclosure, the second portion of the subterranean formation can contain second portion pore volumes. Furthermore, the second portion of the subterranean formation can contain second portion fractures and second portion pore volumes.

In some embodiments of the present disclosure, the first portion of the subterranean formation can be a low pressure stress zone. In some embodiments of the present disclosure, the first portion of the subterranean formation can be a first pressure stress zone. In some embodiments of the present disclosure, the first portion of the subterranean formation can be a previously hydraulic fractured zone. In some embodiments, the first portion of the subterranean formation can be a combination of a low pressure stress zone and previously hydraulic fractured zone. Moreover, the first portion of the subterranean formation can be one of low pressure stress zone, a previously hydraulic fractured zone, or a combination thereof.

In some embodiments of the present disclosure, the second portion of the subterranean formation can be a high pressure stress zone. In some embodiments, the second portion of the subterranean formation can be a second pressure stress zone. In some embodiments of the present disclosure, the second portion of the subterranean formation can be a non-previously hydraulic fractured zone. Moreover, the second portion of the subterranean formation can be a previously unstimulated zone. In some embodiments, the second portion of the subterranean formation can be a previously under stimulated zone. In some embodiments of the disclosure, the second portion of the subterranean formation can be one or more of a high pressure stress zone, a non-previously hydraulic fractured zone, a previously unstimulated zone, and a previously under stimulated zone. Furthermore, the second portion of the subterranean formation can be one of a high pressure stress zone, a non-previously hydraulic fractured zone, a previously unstimulated zone, a previously under stimulated zone or a combination thereof.

The gas can usually be one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), and an inert gas.

In accordance with some embodiments of the present disclosure, the gas can be an inert gas. In accordance with some embodiments of the present disclosure, the gas can be nitrogen ($N_2$). In accordance with some embodiments of the present disclosure, the gas can be hydrogen ($H_2$). In accordance with some embodiments of the present disclosure, the gas can be methane ($CH_4$). In accordance with some embodiments of the present disclosure, the gas can be ethane ($CH_3$-$CH_3$).

In accordance with some embodiments of the present disclosure, the gas can be propane ($C_3H_8$). In accordance with some embodiments of the present disclosure, the gas can be butane ($C_4H_{10}$). In accordance with some embodiments of the present disclosure, the gas can be carbon dioxide ($CO_2$). In accordance with some embodiments of the present disclosure, the gas can be oxygen. In accordance with some embodiments of the present disclosure, the gas can be air. In accordance with some embodiments of the present disclosure, the gas can be steam. In accordance with some embodiments of the present disclosure, the gas can be one or more of nitrogen ($N_2$), hydrogen ($H_2$), methane ($CH_4$), ethane ($CH_3$-$CH_3$), propane ($C_3H_8$), butane ($C_4H_{10}$), carbon dioxide ($CO_2$), oxygen, air, steam and inert gas.

The gas can usually be one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), and an inert gas.

In accordance with some embodiments of the present disclosure, the method can include the gas being in the gas phase during the injecting of the gas, into the wellbore. In accordance with some embodiments of the present disclosure, the method can include the gas being in the liquid phase during the injecting of the gas into the wellbore. In accordance with some embodiments of the present disclosure, the method can include the gas being in the form of a foam during the injecting of the gas into the wellbore. Moreover, in accordance with some embodiments of the present disclosure, the method can include the gas being in the form of one or more of gas phase, liquid phase, foam, or combination thereof. In some embodiments, the foam can be more gas by volume than liquid by volume. Moreover, in some embodiments the foam can have no more than about 50 volume % liquid. Furthermore, in accordance with some embodiments, the foam can have less gas by volume than liquid by volume.

In accordance with some embodiments of the present disclosure, the method can include introducing, after the injecting of the gas but before the introducing of the fracturing liquid, a diverting agent into the wellbore. Alternatively, in some embodiments, the diverting agent may be introduced simultaneous with the gas, regardless of its phase, and before introducing the fracturing liquid. Furthermore, in some embodiments, the diverting agent can be injected at a sufficient pressure to occupy at least some of the first portion of the subterranean formation. Moreover, the first portion of the subterranean formation can contain one or more of first portion fractures and first portion pore volumes. In some embodiments, the diverting agent can occupy at least some of one or more of the first portion fractures and the first portion pore volumes. In some embodiments, the diverting agent occupies at least most of the first portion fractures and the first portion pore volumes. In accordance with some embodiments of the present disclosure, the introducing of the diverting agent can begin immediately after terminating the injection of the gas into the wellbore. The diverting agent can be in some embodiments selected from the group consisting essentially of a chemical diverting agent, a mechanical diverting agent, a degradable fiber, other degradable materials, benzoic acid, or a combination thereof. Moreover, the diverting agent can be a chemical diverting agent. The diverting agent can be a mechanical diverting agent. It can be appreciated that in some embodiments, the diverting agent can be a degradable diverting agent. Furthermore, the diverting agent can be benzoic acid or a benzoic acid derivative.

In accordance with some embodiments of the present disclosure, the method can include maintaining a dwell period between the injecting of the gas in the wellbore and the introducing of the fracturing liquid into the well bore. In some embodiments, the dwell period can be less than about one hour. In some embodiments, the dwell period can be less than about 24 hours. In some embodiments, the dwell period can be more than about 24 hours. In some embodiments, the dwell period can be one of less than one hour, less than about 24 hours, or more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In some embodiments of the present disclosure, the gas can be injected into the wellbore at a rate of about 30 to about 500,000 scf/min.

In some embodiments of the present disclosure, the gas injected into the wellbore can be from about 1,000 to about 1,000,000,000 scf. Moreover, in some embodiments, the gas injected into the wellbore can be from about 1,000 to about 100,000,000 scf. Furthermore, the gas injected into the wellbore can be, in some embodiments, more than about $1 \times 10^9$ scf.

In some embodiments of the present disclosure, the gas injected in the first and second portions of the subterranean formation can be at least about 500 scf/lfcA over a lfcA from about 1 foot to about 15 miles of the wellbore. Moreover, the gas injected in the first and second portions of the subterranean formation can be no more than about 5, scf/lfcA over a lfcA from about 1 foot to about 15 miles of the wellbore.

In accordance with some embodiments of the present disclosure, the second portion of the subterranean formation can commonly have a pressure of at least about 5% more than the first portion of the subterranean formation. More commonly, the second portion of the subterranean formation can have a pressure of at least about 10% more, even more commonly a pressure of at least about 50% more, yet even more commonly a pressure of at least about 100% more, yet even more commonly a pressure of at least about 200% more, yet even more commonly a pressure of at least about 500% more, yet even more commonly a pressure of at least about 1,000% more, yet even more commonly a pressure of at least about 2,500% more, yet even more commonly a pressure of at least about 5,000% more, yet even more commonly a pressure of at least about 7,500% more, or even yet more commonly a pressure of at least about 10,000% more than the first portion of the subterranean formation.

The fracturing methods and/or processes described herein can be applicable to primary, secondary and tertiary recovery methods. "Primary recovery" generally refers to methods and/or processes where the reservoir driving force comes from substantially natural mechanisms, such as but not limited to natural water displacement of the petroleum and/or gas, expansion of the gas initially dissolved in the petroleum, and/or gravity to drainage to name a few. "Secondary recovery" typically refers to methods and/or processes that include supplementing the natural reservoir driving forces with external energy. The external energy usually increases the reservoir pressure through gas lift, water injection, and/or natural gas reinjection. Methods and/or processes that reduce petroleum viscosity are generally referred to as "tertiary recovery".

In accordance with some embodiments is a method and/or process that includes the steps of injecting a gas into two or more wellbores at least partly contained within a subterranean formation at an injected pressure, maintaining the gas at the injected pressure, and injecting a fracturing liquid into a target wellbore different from and/or spatially dislocated from the two or more wellbores at a sufficient pressure to fracture a target portion of the subterranean formation surrounding the target wellbore. It can be appreciated that the gas injected into the two or more wellbores occupies a portion of the subterranean formation surrounding each of the two or more wellbores. Moreover, the gas occupying each portion of the subterranean formation surrounding each of the two or more wellbores can have an injected pressure. In some embodiments, the gas can be injected into each of the two or more wellbores at a rate from about 30 to about 500,000 scf/min. In some embodiments, from about 1,000 scf to about 1,000,000,000 scf of the gas can be injected into each of the two or more wellbores. The gas injected into the subterranean formation surrounding each of the two or more wellbores can be at least about 500 scf/lfcA of the gas over a lfcA from about 1 foot to about 15 miles of each of the two or more wellbores. In some embodiments, the gas injected into the subterranean formation surrounding each of the two or more wellbores can be no more than about 5 scf/lfcA of the gas over a lfcA from about 1 foot to about 15 miles of each of the two or more wellbores. It can be appreciated that in some embodiments, the maintaining of step can include maintaining, over a selected time interval, the gas at the injected pressure.

In accordance with some embodiments is a method and/or process that includes the steps of introducing a gas into two or more wellbores at least partly contained within a subterranean formation at an introduced pressure, maintaining the gas at the introduced pressure, and introducing a fracturing liquid into a target wellbore different from and/or spatially dislocated from the two or more wellbores at a sufficient pressure to fracture a target portion of the subterranean formation surrounding the target wellbore. In some embodiments, from about 1,000 scf to about 1,000,000,000 scf of the gas can be introduced into each of the two or more wellbores. In some embodiments, the gas introduced into the subterranean formation surrounding each of the two or more wellbores can be at least about 500 scf/lfcA of the gas over a lfcA from about 1 foot to about 15 miles of each of the two or more wellbores. In some embodiments, the gas introduced into the subterranean formation surrounding each of the two or more wellbores can be no more than about 5 scf/lfcA of the gas over a lfcA from about 1 foot to about 15 miles of each of the two or more wellbores. It can be appreciated that in some embodiments, the maintaining of step can include maintaining, over a selected time interval, the gas at the introduced pressure.

Typically, the target wellbore is contained within the subterranean formation. More typically, the target wellbore is positioned in the subterranean formation adjacent to the two or more wellbores.

In accordance with some embodiments of the method and/or process, the step of injecting the gas can include the injected gas occupying a portion of the subterranean formation surrounding each of the two or more wellbores at an injected pressure.

In accordance with some embodiments of the method and/or process, the step of introducing the gas can include the introduced gas occupying a portion of the subterranean formation surrounding each of the two or more wellbores at an introduced pressure.

In some embodiments, the target wellbore can be a vertical wellbore. Moreover, the two or more wellbores can be vertical wellbores. It can be appreciated that in some embodiments, the target wellbore and the two or more wellbores can be vertical wellbores.

Commonly, the target wellbore can be positioned an equidistance from the two or more wellbores. More commonly, the target wellbore can be positioned substantially about an equidistance from each of the two or more wellbores.

In some embodiments, the target wellbore can be a horizontal wellbore. Moreover, the two or more wellbores can be horizontal wellbores. It can be appreciated that in some embodiments, the target wellbore and the two or more wellbores can be horizontal wellbores.

In some embodiments, two or more wellbores can be one of two wellbores, three wellbores, four wellbores, five wellbores, six wellbores, seven wellbores, eight wellbores, nine wellbores, ten wellbores, eleven wellbores, twelve wellbores, or more. Moreover, the target wellbore is usually positioned substantially equidistance to the two or more wellbores. In some embodiments, the two or more wellbores are two wellbores, and the target wellbore is positioned a substantially equidistance between the two wellbores. In some embodiments, the two or more wellbores are three wellbores, and the target wellbore is positioned a substantially equidistance between the three wellbores. In some embodiments, the two or more wellbores are four wellbores, and the target wellbore is positioned a substantially equidistance between the four wellbores. In some embodiments, the two or more wellbores are five wellbores, and the target wellbore is positioned a substantially equidistance between the five wellbores. In some embodiments, the two or more wellbores are six wellbores, and the target wellbore is positioned a substantially equidistance between the six wellbores. In some embodiments, the two or more wellbores are seven wellbores, and the target wellbore is positioned a substantially equidistance between the seven wellbores. In some embodiments, the two or more wellbores are eight wellbores, and the target wellbore is positioned a substantially equidistance between the eight wellbores. In some embodiments, the two or more wellbores are nine wellbores, and the target wellbore is positioned a substantially equidistance between the nine wellbores. In some embodiments, the two or more wellbores are ten wellbores, and the target wellbore is positioned a substantially equidistance between the ten wellbores. In some embodiments, the two or more wellbores are eleven wellbores, and the target wellbore is positioned a substantially equidistance between the elven wellbores. In some embodiments, the two or more wellbores are twelve wellbores, and the target wellbore is positioned a substantially equidistance between the twelve wellbores.

It can be appreciated that the target wellbore usually has a heel target wellbore portion and a toe target wellbore portion. It can be further appreciated that the target portion of the subterranean formation is usually located adjacent to the toe target wellbore portion. Moreover, the target portion of the subterranean formation is commonly closer to the toe target wellbore portion than to the heel target wellbore portion.

It can also be appreciated that each of the two or more wellbores can have a heel wellbore portion and toe wellbore portion.

In accordance with some embodiments the method and/or process can further include positioning in each of two or more wellbores a packer. It can be appreciated that in some embodiments the packer can include gel pills and sand pads. Typically, the packer isolates the heel wellbore portion from the toe wellbore portion. In some embodiments, the injected gas can occupy a sector of the subterranean formation between the heel wellbore portion and the packer.

The maintaining step in some embodiments of the method and/or process can include maintaining the gas within the sector of the subterranean formation between the heel wellbore portion and the packer at the injected pressure. Moreover, the sector of the subterranean formation between the heel wellbore portion and the packer maintained at the injected pressure can typically be substantially devoid of any of the fractures formed by the injecting of the fracturing liquid into the target wellbore at sufficient pressure to fracture the target portion of the subterranean formation. It can be appreciated that the fractures formed about the toe target wellbore portion of the subterranean formation are usually formed by the injecting of the fracturing liquid into the target wellbore at a sufficient pressure to fracture the target portion of the subterranean formation.

In accordance with some embodiments the method and/or process can further include positioning in each of two or more wellbores a packer. Typically, the packer isolates the heel wellbore portion from the toe wellbore portion. In some embodiments, the introduced gas can occupy a sector of the subterranean formation between the heel wellbore portion and the packer. The maintaining step in some embodiments of the method and/or process can include maintaining the gas within the sector of the subterranean formation between the heel wellbore portion and the packer at the introduced pressure. Moreover, the sector of the subterranean formation between the heel wellbore portion and the packer maintained at the introduced pressure can typically be substantially devoid of any of the fractures formed by the introducing of the fracturing liquid into the target wellbore at sufficient pressure to fracture the target portion of the subterranean formation. It can be appreciated that in some embodiments, the fractures formed about the toe target wellbore portion of the subterranean formation are usually formed by the introducing of the fracturing liquid into the target wellbore at sufficient pressure to fracture the target portion of the subterranean formation.

In some embodiments, the portions of the subterranean formation occupied by the gas can be substantially devoid of any fractures formed by the injecting of the fracturing liquid. Furthermore, the portions of the subterranean formation occupied by gas can be substantially devoid of any fractures formed by the injecting of the fracturing liquid into the target wellbore at sufficient pressure to fracture the subterranean formation.

In some embodiments, the portions of the subterranean formation occupied by the gas can be substantially devoid of any fractures formed by the introducing of the fracturing liquid. Furthermore, the portions of the subterranean formation occupied by gas can be substantially devoid of any fractures formed by the introducing of the fracturing liquid into the target wellbore at sufficient pressure to fracture the subterranean formation.

In accordance with some embodiments, the step of injecting the gas into the two or more wellbores can include each of the two or more wellbores being injected substantially simultaneously with the gas. Furthermore, the injecting of the gas into the two or more wellbores can be conducted with each of the two or more wellbores being injected substantially simultaneously with the gas.

In accordance with some embodiments, the step of introducing the gas into the two or more wellbores can include each of the two or more wellbores having the gas introduced substantially simultaneously. Furthermore, the introducing of the gas into the two or more wellbores can be conducted with each of the two or more wellbores having the gas introduced substantially simultaneously.

In accordance with some embodiments, the step of injecting the gas into the two or more wellbores can include each of the two or more wellbores being injected sequentially, one after the other, with gas. Furthermore, the injecting of the gas into the two or more wellbores can be conducted with each of the two or more wellbores being injected sequentially, one after the other, with gas.

In accordance with some embodiments, the step of introducing the gas into the two or more wellbores can include each of the two or more wellbores having the gas introduced sequentially, one after the other. Furthermore, the introducing of the gas into the two or more wellbores can be conducted with each of the two or more wellbores having the gas introduced sequentially, one after the other.

In accordance with some embodiments, the step of injecting the gas into the two or more wellbores can include each of the two or more wellbores being injected with the gas at about the same time. Furthermore, the injecting of the gas into the two or more wellbores can be conducted with each of the two or more wellbores being injected with the gas at about the same time.

It can be appreciated that the gas can be in the form of one or more of a gas phase, a liquid phase, a foam, or a combination thereof. Moreover, during the injecting of the gas into the wellbore, the gas is in the form of one or more of a gas phase, a liquid phase, a foam, or a combination thereof.

It can be appreciated that the gas can be in the form of one or more of a gas phase, a liquid phase, a foam, or a combination thereof. Moreover, during the introducing of the gas into the wellbore, the gas is in the form of one or more of a gas phase, a liquid phase, a foam, or a combination thereof.

Typically, the foam can have more gas by volume than liquid by volume. Commonly, the gas can be nitrogen ($N_2$). More commonly, the gas can be hydrogen ($H_2$). Even more commonly, the gas can be methane ($CH_4$). Yet even more commonly, the gas can be ethane ($C_2H_6$). Still yet even more commonly, the gas can be propane ($C_3H_8$). Yet still even more commonly, the gas can be butane ($C_4H_{10}$). Yet even still more commonly, the gas can be carbon dioxide ($CO_2$). Yet even still more commonly, the gas can be oxygen. Yet even still more commonly, the gas can be air. Yet even still more commonly, the gas can be steam. Still yet even more commonly, the gas can be an inert gas. Usually, the gas can contain more than about 1 mole % nitrogen ($N_2$). More usually, the gas can contain more than about 1 mole % hydrogen ($H_2$). Even more usually, the gas can contain more than about 1 mole % methane ($CH_4$). Yet even more usually, the gas can contain more than about 1 mole % ethane ($C_2H_6$). Still yet even more usually, the gas can contain more than about 1 mole % propane ($C_3H_8$). Yet still even more usually, the gas can contain more than about 1 mole % butane ($C_4H_{10}$). Yet even still more usually, the gas can contain more than about 1 mole % carbon dioxide ($CO_2$). Still yet even more usually, the gas can contain more than about 1 mole % of an inert gas. In some embodiments, the gas can be one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), and an inert gas.

In accordance with some embodiments, the target portion of the subterranean formation can have a first hydrocarbon production rate prior to the injecting of the gas. Moreover, the fractured target portion of the subterranean can have, in some embodiments, a second hydrocarbon rate. Commonly, the first hydrocarbon production rate is greater than the second hydrocarbon production rate. More commonly, the second hydrocarbon production rate is greater than the first hydrocarbon production rate.

In accordance with some embodiments, the target portion of the subterranean formation can have a first hydrocarbon production rate prior to the introducing of the gas. Moreover, the fractured target portion of the subterranean formation can have a second hydrocarbon production rate. Commonly, the first hydrocarbon production rate is greater than the second hydrocarbon production rate. More commonly, the second hydrocarbon production rate is greater than the first hydrocarbon production rate.

Generally, the target portion of the subterranean formation can have first and second portions of the subterranean formation. More generally, the target portion of the subterranean formation can have first and second portions of the subterranean formation with the second portion of the subterranean formation being fractured to a greater extent than the first portion of the subterranean formation. In accordance with some embodiments, the first portion of the subterranean formation can have first portion fractures and pore volumes. Furthermore, in some embodiments, the first portion of the subterranean formation can have first portion fractures and pore volumes and the second portion of the subterranean formation can have second portion fractures and pore volumes.

In accordance with some embodiments, the method and/or process can include a step of introducing, before the introducing of the fracturing liquid, a diverting agent into the target wellbore. In some embodiments, the diverting agent can be injected at a sufficient pressure to occupy at least some of a first portion fractures and pore volumes.

In accordance with some embodiments, the method and/or process can include a step of introducing, before the introducing of the fracturing liquid, a diverting agent into the target wellbore. In some embodiments, the diverting agent can be introduced at a sufficient pressure to occupy at least some of a first portion fractures and pore volumes. Alternatively, in some embodiments, the diverting agent may be introduced simultaneous with the gas, regardless of its phase, and before introducing the fracturing liquid.

Commonly, the diverting agent can be a chemical diverting agent. More commonly, the diverting agent can be a mechanical diverting agent. Even more commonly, the diverting agent can be a degradable fiber. Yet even more commonly, the diverting agent can be a degradable material. Still yet even more commonly, the diverting agent can be bezonic acid. Still yet even more commonly, the diverting agent can be a combination of two or more of a chemical diverting agent, a mechanical diverting agent, a degradable fiber, a degradable material, and bezonic acid. In some embodiments, the diverting agent is selected from the group consisting essentially of a chemical diverting agent, a mechanical diverting agent, a degradable fiber, a degradable material, bezonic acid, or a combination thereof.

In some embodiments, the method and/or process can include a step of maintaining a dwell period between the injecting of the gas into the two or more wellbores and the injecting of a fracturing liquid into the target wellbore. Typically, the dwell period can less than about one hour. More typically, the dwell period can be less than about 24 hours. Even more typically, the dwell period can be more than about 24 hours. In some embodiments, the dwell period is selected from the group consisting essentially of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In some embodiments, the method and/or process can include a step of maintaining a dwell period between the introducing of the gas into the two or more wellbores and the introducing of fracturing liquid into the target wellbore. Typically, the dwell period can less than about one hour. More typically, the dwell period can be less than about 24 hours. Even more typically, the dwell period can be more than about 24 hours. In some embodiments, the dwell period is selected from the group consisting essentially of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In accordance with some embodiments is a method and/or process that includes the steps of injecting a gas into a first wellbore partly contained within and/or at least partly contained within a subterranean formation, maintaining the gas at the injected pressure, and injecting a fracturing liquid into a second wellbore at a sufficient pressure to fracture a target portion of the subterranean formation about the second wellbore. Typically, the gas occupies a portion of the subterranean formation about the first wellbore at an injected pressure. In some embodiments, the gas is injected into the first wellbore at a rate from about 30 to about 500,000 scf/min. In some embodiments, from about 1,000 scf to about 1,000,000,000 scf of the gas is injected into the first wellbore. In some embodiments, at least about 500 scf/lfcA of gas is injected over a lfcA from about 1 foot to about 15 miles of the first wellbore. In some embodiments, no more than about 5 scf/lfcA of gas over a lfcA from about 1 foot to about 15 miles of the first wellbore. It can be appreciated that in some embodiments, the maintaining of a step can include maintaining, over a selected time interval, the gas at the injected pressure.

In accordance with some embodiments is a method and/or process that includes the steps of introducing a gas into a first wellbore partly contained within and/or at least partly contained within a subterranean formation, maintaining the gas at the introduced pressure, and introducing a fracturing liquid into a second wellbore at a sufficient pressure to fracture a target portion of the subterranean formation surrounding and/or adjacent to the second wellbore. Typically, the gas occupies a portion of the surrounding and/or adjacent to the first wellbore at an introduced pressure. In some embodiments, the gas is introduced into the first wellbore at a rate from about 30 to about 500,000 scf/min. In some embodiments, from about 1,000 scf to about 1,000,000,000 scf of the gas is introduced into the first wellbore. In some embodiments, at least about 500 scf/lfcA of gas is introduced over a lfcA from about 1 foot to about 15 miles of the first wellbore, and in some embodiments, no more than about 5 scf/lfcA of gas over a lfcA from about 1 foot to about 15 miles of the first wellbore. It can be appreciated that the maintaining of step can include maintaining, over a selected time interval, the gas at the introduced pressure.

Typically, the second wellbore is contained within the subterranean formation. More typically, the second wellbore is positioned in the subterranean formation surrounding and/or adjacent to the first wellbore.

In accordance with some embodiments of the method and/or process, the step of injecting the gas can include the injected gas occupying a portion of the subterranean formation about the first wellbore at an injected pressure.

In accordance with some embodiments of the method and/or process, the step of introducing the gas can include the introduced gas occupying a portion of the subterranean formation surrounding and/or adjacent to the first wellbore at an introduced pressure.

In some embodiments, the second wellbore can be a vertical wellbore. Moreover, the first wellbore can be a vertical wellbore. It can be appreciated that in some embodiments, the first and second wellbores can be vertical wellbores.

In some embodiments, the second wellbore can be a horizontal wellbore. Moreover, the first wellbore can be a horizontal wellbore. It can be appreciated that in some embodiments, the first and second wellbores can be horizontal wellbores.

It can be appreciated that the second wellbore usually has a second wellbore heel portion and a second wellbore toe portion. It can be further appreciated that the second wellbore portion of the subterranean formation is usually located about the second wellbore toe portion. Moreover, the second wellbore portion of the subterranean formation is commonly closer to the second wellbore toe portion than to the second wellbore heel portion.

It can also be appreciated that the first wellbore can have a first wellbore heel portion and a first wellbore toe portion.

In accordance with some embodiments, the method and/or process can further include positioning in the first wellbore a packer. Typically, the packer isolates the first wellbore heel portion from the first wellbore toe portion. In some embodiments, the injected gas can occupy a sector of the subterranean formation between the first wellbore heel portion and the packer. The maintaining step in some embodiments of the method and/or process can include maintaining the gas within the sector of the subterranean formation between the first wellbore heel portion and the packer at the injected pressure. Moreover, the sector of the subterranean formation between the first wellbore heel portion and the packer maintained at the injected pressure can typically be substantially devoid of any of the fractures formed by the injecting of the fracturing liquid into the second wellbore at a sufficient pressure to fracture the second wellbore portion of the subterranean formation. It can be appreciated that in some embodiments, the fractures formed about the first wellbore toe portion of the subterranean formation are usually formed by the injecting of the fracturing liquid into the second wellbore at a sufficient pressure to fracture the second wellbore portion of the subterranean formation.

In accordance with some embodiments, the method and/or process can further include positioning in the first wellbore a packer. Typically, the packer isolates the first wellbore heel portion from the first wellbore toe portion. In some embodiments, the introduced gas can occupy a sector of the subterranean formation between the first wellbore heel portion and the packer. The maintaining step, in some embodiments of the method and/or process can include maintaining the gas within the sector of the subterranean formation between the first wellbore heel portion and the packer at the introduced pressure. Moreover, the sector of the subterranean formation between the first wellbore heel portion and the packer maintained at the introduced pressure can typically be substantially devoid of any of the fractures formed by the introducing of the fracturing liquid into the second wellbore at sufficient pressure to fracture the second wellbore portion of the subterranean formation. It can be appreciated that in some embodiments, the fractures formed about the first wellbore toe portion of the subterranean formation are usually formed by the introducing of the fracturing liquid into the second wellbore at sufficient pressure to fracture the second wellbore portion of the subterranean formation.

In some embodiments, the portion(s) of the subterranean formation occupied by the gas can be substantially devoid of any fractures formed by the injecting of the fracturing liquid. Furthermore, the portion(s) of the subterranean formation occupied by the gas can be substantially devoid of any fractures formed by the injecting of the fracturing liquid into the second wellbore at sufficient pressure to fracture the subterranean formation.

In some embodiments, the portion(s) of the subterranean formation occupied by the gas can be substantially devoid of any fractures formed by the introducing of the fracturing liquid. Furthermore, the portion of the subterranean formation occupied by the gas can be substantially devoid of any fractures formed by the introducing of the fracturing liquid into the second wellbore at sufficient pressure to fracture the subterranean formation.

It can be appreciated that the gas can be in the form of one or more of a gas phase, a liquid phase, a foam, or a combination thereof. Moreover, during the injecting of the gas into the first wellbore, the gas can be in the form of one or more of a gas phase, a liquid phase, a foam, or a combination thereof. Furthermore, during the introducing of the gas into the first wellbore, the gas can be in the form of one or more of a gas phase, a liquid phase, a foam, or a combination thereof.

Typically, the foam can have more gas by volume than liquid by volume.

Commonly, the gas can be nitrogen ($N_2$). More commonly, the gas can be hydrogen ($H_2$). Even more commonly, the gas can be methane ($CH_4$). Yet even more commonly, the gas can be ethane ($C_2H_6$). Still yet even more commonly, the gas can be propane ($C_3H_8$). Yet still even more commonly, the gas can be butane ($C_4H_{10}$). Yet even still more commonly, the gas can be carbon dioxide ($CO_2$). Yet even still more commonly, the gas can be oxygen. Yet even still more commonly, the gas can be air. Yet even still more commonly, the gas can be steam. Still yet even more commonly, the gas can be an inert gas. Usually, the gas can contain more than about 1 mole % nitrogen ($N_2$). More usually, the gas can contain more than about 1 mole % hydrogen ($H_2$). Even more usually, the gas can contain more than about 1 mole % methane ($CH_4$). Yet even more usually, the gas can contain more than about 1 mole % ethane ($C_2H_6$). Still yet even more usually, the gas can contain more than about 1 mole % propane ($C_3H_8$). Yet still even more usually, the gas can contain more than about 1 mole % butane ($C_4H_{10}$). Yet even still more usually, the gas can contain more than about 1 mole % carbon dioxide ($CO_2$). Still yet even more usually, the gas can contain more than about 1 mole % of an inert gas. In some embodiments, the gas can be one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), and an inert gas.

In accordance with some embodiments, the second wellbore portion of the subterranean formation can have a first hydrocarbon production rate prior to the injecting of the gas into the first wellbore.

In accordance with some embodiments, the second wellbore portion of the subterranean formation can have a first hydrocarbon production rate prior to the introducing of the gas into the first wellbore.

Moreover, the fractured second portion of the subterranean can have, in some embodiments, a second hydrocarbon rate. Commonly, the first hydrocarbon production rate is greater than the second hydrocarbon production rate. More commonly, the second hydrocarbon production rate is greater than the first hydrocarbon production rate.

Generally, the second wellbore portion of the subterranean formation can have first and second portions of the subterranean formation. More generally, the second wellbore portion of the subterranean formation can have first and second portions of the subterranean formation with the second portion of the subterranean formation being fractured to a greater extent than the first portion of the subterranean formation. In accordance with some embodiments, the first portion of the subterranean formation can have first portion fractures and pore volumes. Furthermore, in some embodiments, the first portion of the subterranean formation can have first portion fractures and pore volumes and the second portion of the subterranean formation can have second portion fractures and pore volumes.

In accordance with some embodiments, the method and/or process can include a step of injecting, before the injecting of the fracturing liquid, a diverting agent into the second wellbore. In some embodiments, the diverting agent can be injected at a sufficient pressure to occupy at least some of the first portion fractures and pore volumes. Alternatively, in some embodiments, the diverting agent may be introduced simultaneous with the gas, regardless of its phase, and before introducing the fracturing liquid.

In accordance with some embodiments, the method and/or process can include a step of introducing, before the introducing of the fracturing liquid, a diverting agent into the second wellbore. In some embodiments, the diverting agent can be introduced at a sufficient pressure to occupy at least some of the first portion fractures and pore volumes.

Commonly, the diverting agent can be a chemical diverting agent. More commonly, the diverting agent can be a mechanical diverting agent. Even more commonly, the diverting agent can be a degradable fiber. Yet even more commonly, the diverting agent can be a degradable material. Still yet even more commonly, the diverting agent can be bezonic acid. Still yet even more commonly, the diverting agent can be combination of two or more of a chemical diverting agent, a mechanical diverting agent, a degradable fiber, a degradable material, and bezonic acid. In some embodiments, the diverting agent is selected from the group consisting essentially of a chemical diverting agent, a mechanical diverting agent, a degradable fiber, a degradable material, bezonic acid, or a combination thereof.

In some embodiments, the method and/or process can include a step of maintaining a dwell period between the injecting of the gas into the first wellbore and the injecting of a fracturing liquid into the second wellbore.

In some embodiments, the method and/or process can include a step of maintaining a dwell period between the introducing of the gas into the first wellbore and the introducing of a fracturing liquid into the second wellbore.

Typically, the dwell period can less than about one hour. More typically, the dwell period can be less than about 24 hours. Even more typically, the dwell period can be more than about 24 hours. In some embodiments, the dwell period is selected from the group consisting essentially of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In accordance with some embodiments is a method having the steps of injecting a gas into a wellbore at least partly contained within a subterranean formation, the gas is usually injected into an annular space of the wellbore at a rate from about 30 to about 500,000 scf/min and occupying one or more portions of the subterranean formation surrounding the wellbore at an injected pressure, maintaining the gas at the injected pressure, and injecting a fracturing liquid into a tubing string space at a sufficient pressure to fracture a target portion of the subterranean formation surrounding the wellbore. The one or more portions of the subterranean formation and the target portion of the subterranean formation generally differ. Typically, the wellbore includes a tubing string having inner and outer tubing sting walls, a well casing having inner and outer well casing walls, and an annular space defined by the inner well casing wall and the outer tubing string wall. The tubing string space is commonly defined by the inner tubing string wall.

In accordance with some embodiments is a method having the steps of injecting from about 1,000 scf to about 1,000,000,000 scf gas into an annular space of a wellbore, the wellbore is generally at least partly contained within a subterranean formation, the gas typically occupies one or more portions of the subterranean formation surrounding the wellbore at an injected pressure, maintaining the gas at the injected pressure, and injecting a fracturing liquid into a tubing string space at a sufficient pressure to fracture a target portion of the subterranean formation surrounding the wellbore. The one or more portions of the subterranean formation and the target portion of the subterranean formation generally differ. Typically, the wellbore includes a tubing string having inner and outer tubing sting walls, a well casing having inner and outer well casing walls, and an annular space defined by the inner well casing wall and the outer tubing string wall. The tubing string space is commonly defined by the inner tubing string wall.

In accordance with some embodiment is a method having the steps of injecting more than about $1 \times 10^9$ scf gas into an annular space of a wellbore, the wellbore is generally at least partly contained within a subterranean formation, the gas typically occupies one or more portions of the subterranean formation surrounding the wellbore at an injected pressure, maintaining the gas at the injected pressure, and injecting a fracturing liquid into a tubing string space at a sufficient pressure to fracture a target portion of the subterranean formation surrounding the wellbore. The one or more portions of the subterranean formation and the target portion of the subterranean formation generally differ. Typically, the wellbore includes a tubing string having inner and outer tubing sting walls, a well casing having inner and outer well casing walls, and an annular space defined by the inner well casing wall and the outer tubing string wall. The tubing string space is commonly defined by the inner tubing string wall.

In accordance with some embodiment is a method having the steps of injecting gas into an annular space of a wellbore, the wellbore is generally at least partly contained within a subterranean formation, typically at least about 500 scf/lfcA of the gas occupies one or more portions of the subterranean formation surrounding the wellbore at an injected pressure over a lfcA from about 1 foot to about 15 miles of the wellbore, maintaining the gas at the injected pressure, and injecting a fracturing liquid into a tubing string space at a sufficient pressure to fracture a target portion of the subterranean formation surrounding the wellbore. The one or more portions of the subterranean formation and the target portion of the subterranean formation generally differ. Typically, the wellbore includes a tubing string having inner and outer tubing sting walls, a well casing having inner and outer well casing walls, and an annular space defined by the inner well casing wall and the outer tubing string wall. The tubing string space is commonly defined by the inner tubing string wall.

In accordance with some embodiment is a method having the steps of injecting gas into an annular space of a wellbore, the wellbore is generally at least partly contained within a subterranean formation, typically no more than about 5 scf/lfcA of the gas occupies one or more portions of the subterranean formation surrounding the wellbore at an injected pressure over a lfcA from about 1 foot to about 15 miles of the wellbore, maintaining the gas at the injected pressure, and injecting a fracturing liquid into a tubing string space at a sufficient pressure to fracture a target portion of the subterranean formation surrounding the wellbore. The one or more portions of the subterranean formation and the target portion of the subterranean formation generally differ. Typically, the wellbore includes a tubing string having inner and outer tubing sting walls, a well casing having inner and outer well casing walls, and an annular space defined by the inner well casing wall and the outer tubing string wall. The tubing string space is commonly defined by the inner tubing string wall.

In some embodiments, the wellbore can be a vertical wellbore.

In some embodiments, the wellbore can be a horizontal wellbore. Moreover, the target portion of the subterranean formation can be about a toe target wellbore portion. In some embodiments, the other of the one or more portions of the subterranean formation can be closer to the toe target wellbore portion than a heel target wellbore portion.

Some embodiments further include a step of positioning a packer within the wellbore.

Some embodiments further include a step of setting a packer within the wellbore.

Some embodiments further include a step of isolating, within the wellbore, the injected gas from the fracturing liquid. The step of isolating the injected gas from the fracturing liquid can include positioning and/or setting a packer within the wellbore.

Some embodiments can include setting a packer within the wellbore to isolate at least one of the one or more portions of the subterranean formation from the other of the one or more portions of the subterranean formation. In accordance with some embodiments, during the injecting of the gas into the wellbore and maintaining the gas at the injection pressure, the gas can occupy at least one of the one or more portions of the subterranean formation. Furthermore, in some embodiments, during the injecting of the fracturing liquid, the fracturing liquid can be injected at a sufficient pressure to fracture the other of the one or more portions of the subterranean formation.

Some embodiments can include maintaining a dwell period between the injecting of the gas into the one or more portions of the subterranean formation and the injecting of the fracturing liquid into the target portion of the subterranean formation. Typically, the dwell period can be one of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

Moreover, the gas can be in the form of a foam. In some embodiments, the foam can have more gas by volume than liquid by volume. In some embodiments, the foam can have less gas by volume than liquid by volume.

In some embodiments, the one or more portions of the subterranean formation occupied by the gas can be substantially devoid of any fractures formed by the injecting of the fracturing liquid into the target portion of the wellbore at sufficient pressure to fracture the target portion of the subterranean formation.

In some embodiments, during the injecting of the gas into the wellbore, the gas can be in the form of one or more of a gas phase, a liquid phase, a foam, or a combination thereof.

It can be appreciated that, the target portion of the subterranean formation can have in some embodiments a first hydrocarbon production rate prior to the injecting of the gas. Moreover, the fractured target portion of the subterranean can have a second hydrocarbon rate. The second hydrocarbon production rate can be typically greater than the first hydrocarbon production rate.

Commonly, the target portion of the subterranean formation can have first and second portions of the subterranean formation. More commonly, the second portion of the subterranean formation can be fractured to a greater extent than the first portion of the subterranean formation.

These and other advantages will be apparent from the disclosure of the aspects, embodiments, and configurations contained herein.

It can be appreciated that in some of the embodiments of the present invention the injecting of the gas can include injecting the gas at an injection pressure. Commonly, the injection pressure is less than the fracture pressure of the subterranean formation. More commonly, is no more than about 99%, even more commonly no more than about 95%, yet even more commonly no more than about 90%, still yet even more commonly no more than about 80%, still yet even more commonly no more than about 70%, still yet even more commonly no more than about 60%, still yet even more commonly no more than about 50%, still yet even more commonly no more than about 40%, still yet even more commonly no more than about 30%, still yet even more commonly no more than about 20%, still yet even more commonly no more than about 10%, or yet still even more commonly no more than about 5% of the fracture pressure of the subterranean formation.

It can also be appreciated that in some of the embodiments of the present invention the injecting of the gas can include injecting the gas at an injection pressure greater than the wellhead pressure. Generally, the injection pressure is at least about 105% more than the wellhead pressure. More generally, the injection pressure can be at least about 110% more, even more generally at least about 120% more, yet even more generally at least about 150% more, still yet even more generally at least about 175% more, still yet even more generally at least about 200% more, still yet even more generally at least about 250% more, still yet even more generally at least about 300% more, still yet even more generally at least about 400% more, still yet even more generally at least about 500% more, still yet even more generally at least about 750% more, or yet still even more generally at least about 1,000% more than the wellhead pressure.

It can be appreciated that in some of the embodiments of the present invention the introducing of the gas can include introducing the gas at an introduction pressure. Usually, the introduction pressure is less than the fracture pressure of the subterranean formation. More usually, is no more than about 99%, even more usually no more than about 95%, yet even more usually no more than about 90%, still yet even more usually no more than about 80%, still yet even more usually no more than about 70%, still yet even more usually no more than about 60%, still yet even more usually no more than about 50%, still yet even more usually no more than about 40%, still yet even more usually no more than about 30%, still yet even more usually no more than about 20%, still yet even more usually no more than about 10%, or yet still even more usually no more than about 5% of the fracture pressure of the subterranean formation.

It can also be appreciated that in some of the embodiments of the present invention the injecting of the gas can include injecting the gas at an injection pressure greater than the wellhead pressure. Typically, the injection pressure is at least about 105% more than the wellhead pressure. More typically, the injection pressure can be at least about 110% more, even more typically at least about 120% more, yet even more typically at least about 150% more, still yet even more typically at least about 175% more, still yet even more typically at least about 200% more, still yet even more typically at least about 250% more, still yet even more typically at least about 300% more, still yet even more typically at least about 400% more, still yet even more typically at least about 500% more, still yet even more typically at least about 750% more, or yet still even more typically at least about 1,000% more than the wellhead pressure.

In accordance with some embodiments is a method and/or process that includes injecting a gas into two or more wellbores at least partly contained within a subterranean formation, where the gas is injected, at an injected pressure, into each of the two or more wellbores, maintaining the gas at the injected pressure; and injecting a fracturing liquid into a target wellbore different from the two or more wellbores at a sufficient pressure to fracture a target portion of the subterranean formation surrounding the target wellbore. The gas can be generally injected at a rate from about 30 to 500,000 scf/min. In some embodiments, from about 1,000 scf to about 1,000,000,000 scf of the gas can be introduced into each of the two or more wellbores. Moreover, the gas injected into the subterranean formation adjacent to each of the two or more wellbores can be one of at least about 500 scf/lfcA over a lfcA from about 1 foot to about 15 miles of each of the two or more wellbores and no more than about 5 scf/lfcA over a lfcA from about 1 foot to about 15 miles of each of the two or more wellbores. It can be appreciated that the injected gas can occupy a portion of the subterranean formation surrounding each of the two or more wellbores. In some embodiments, the maintaining can include substantially maintaining the gas at the injected pressure over a selected time interval.

In accordance with some embodiments is a method and/or process that includes injecting a gas into a wellbore partly contained within a subterranean formation, where the gas is injected into the wellbore comprises one of: (i) at a rate from about 30 to 500,000 scf/min; the injected gas occupies a portion of the subterranean formation about the wellbore at an injected pressure; (ii) from about 1,000 scf to about 1,000,000,000 scf of the gas is injected into the wellbore; (iii) at least about 500 scf/lfcA over a lfcA from about 1 foot to about 15 miles of the wellbore; and (iv) no more than about 5 scf/lfcA over a lfcA from about 1 foot to about 15 miles of the wellbore, and maintaining, over a selected time interval, the gas at the injected pressure, and injecting a fracturing liquid into a target wellbore other than the wellbore at a sufficient pressure to fracture a target portion of the subterranean formation about the target wellbore.

In accordance with some embodiments is a method and/or process that includes injecting a gas into a wellbore at an injected pressure, maintaining the gas at the injected pressure, and injecting a fracturing liquid into a tubing space defined by an inner tubing string wall at a sufficient pressure to fracture a target portion of the subterranean formation surrounding the wellbore. It can be appreciated that the wellbore has a tubing string having inner and outer tubing sting walls, a well casing having inner and outer well casing walls, and an annular space defined by the inner well casing wall and the outer tubing string wall and is at least partly contained within a subterranean formation. The gas is commonly injected into the annular space of the wellbore and occupies one or more portions of the subterranean formation surrounding the wellbore at an injected pressure. The gas can be generally injected into the annular space at a rate from about 30 to 500,000 scf/min. In some embodiments, from about 1,000 scf to about 1,000,000,000 scf of the gas can be introduced into the annular space. Moreover, the gas injected into the annular space can be one of at least about 500 scf/lfcA over a lfcA from about 1 foot to about 15 miles of the wellbore and no more than about 5 scf/lfcA over a lfcA from about 1 foot to about 15 miles of the wellbore. Generally, the one or more portions of the subterranean formation and the target portion of the subterranean formation differ.

In accordance with some embodiments of the present disclosure is a method for protecting a target well from being fractured that includes injecting a gas into a target wellbore, where the injected gas occupies a target subterranean formation comprising at least about 1 scf/lfcA over a lfcA from about 1 foot to about 15 miles of the target wellbore, and where adjacent to the target wellbore is an interferer wellbore. The interferer wellbore can be one or more of wells scheduled for fracturing, undergoing a fracturing process, or both. Generally, the injected gas occupying the target subterranean formation substantially prevents the fractures generated during the fracturing process of the interferer well from propagating into the target subterranean formation or multiple formations. It can be appreciated that the injected gas occupying the target subterranean formation substantially prevents well bashing and/or well interference. Moreover, the injected gas occupying the target subterranean formation substantially shields and/or protects the target subterranean formation or multiple formations from being fractured by the fracturing system of adjacent interfering wellbores.

In some embodiments of the present disclosure, the target subterranean formation can be a low pressure stress zone. In some embodiments of the present disclosure, the target subterranean formation can be a previously hydraulic fractured zone. In some embodiments of the present disclosure, the target subterranean formation can be a previously produced of hydrocarbons or other minerals within the zone. In some embodiments of the disclosure, the target subterranean formation can be a combination of a low pressure stress zone and previously hydraulic fractured zone. Moreover, in some embodiments of the disclosure, the target subterranean formation can be one of a low pressure stress zone, a previously hydraulic fractured zone, or a combination thereof.

In some embodiments of the present disclosure, the target subterranean formation can be a high pressure stress zone. In some embodiments of the present disclosure, the target subterranean formation can be a non-previously hydraulic fractured zone. In some embodiments of the present disclosure, the target subterranean formation can be a previously unstimulated zone. In some embodiments of the disclosure, the target subterranean formation can be a previously under stimulated zone. In some embodiments of the present disclosure, the target subterranean formation can be a previously unproduced of hydrocarbons or other minerals within the zone. In some embodiments of the disclosure, the target subterranean formation can be one or more of a high pressure stress zone, a non-previously hydraulic fractured zone, a previously unstimulated zone, and a previously under stimulated zone. Furthermore, in some embodiments of the present disclosure, the target subterranean formation can be one of a high pressure stress zone, a non-previously hydraulic fractured zone, a previously unstimulated zone, a previously under stimulated zone or a combination thereof.

In accordance with some embodiments of the present disclosure, the gas can be an inert gas. In accordance with some embodiments of the present disclosure, the gas can be nitrogen ($N_2$).

In accordance with some embodiments of the present disclosure, the gas can be hydrogen ($H_2$). In accordance with some embodiments of the present disclosure, the gas can be methane ($CH_4$). In accordance with some embodiments of the present disclosure, the gas can be ethane ($CH_3$-$CH_3$). In accordance with some embodiments of the present disclosure, the gas can be propane ($C_3H_8$). In accordance with some embodiments of the present disclosure, the gas can be butane ($C_4H_{10}$). In accordance with some embodiments of the present disclosure, the gas can be carbon dioxide ($CO_2$). In accordance with some embodiments of the present disclosure, the gas can be oxygen. In accordance with some embodiments of the present disclosure, the gas can be air. In accordance with some embodiments of the present disclosure, the gas can be steam. In accordance with some embodiments of the present disclosure, the gas can be one or more of nitrogen ($N_2$), hydrogen ($H_2$), methane ($CH_4$), ethane ($CH_3$-$CH_3$), propane ($C_3H_8$), butane ($C_4H_{10}$), carbon dioxide ($CO_2$), oxygen, air, steam and inert gas.

In accordance with some embodiments of the present disclosure, the method can include the gas being in the gas phase during the injecting of the gas into the target wellbore. In accordance with some embodiments of the present disclosure, the method can include the gas being in the liquid phase during the injecting of the gas into the target wellbore. In accordance with some embodiments of the present disclosure, the method can include the gas being in the form of a foam during the injecting of the gas into the target wellbore. Moreover, the method can include the gas being in the form of one or more of gas phase, liquid phase, foam, or combination thereof. In some embodiments, the foam can be more gas by volume than liquid by volume. Moreover, the foam can have no more than about 50 volume % liquid. Furthermore, the foam can have less gas by volume than liquid by volume.

In accordance with some embodiments of the present disclosure, the method can include maintaining a dwell period between the injecting of the gas in the target wellbore and the fracturing of the interferer well bore. In some embodiments, the dwell period can be less than about one hour. In some embodiments, the dwell period can be less than about 24 hours. In some embodiments, the dwell period can be more than about 24 hours. In some embodiments, the dwell period can be one of less than one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In some embodiments of the present disclosure, the gas can be injected into the target wellbore at a rate of about 1 to about 500,000 scf/min.

In some embodiments of the present disclosure, the gas injected into the target wellbore can be from about 1,000 to about 1,000,000,000 scf. Moreover, the gas injected into the target wellbore can be from about 1,000 to about 100,000,000 scf. Furthermore, the gas injected into the target wellbore can be, in some embodiments, more than about $1 \times 10^9$ scf.

In some embodiments of the present disclosure, the gas injected in the target subterranean formation can be at least about 1 scf/lfcA over a lfcA from about 1 foot to about 15 miles of the wellbore. Moreover, the gas injected in the first and second portions of the target subterranean formation can be no more than about 5 scf/lfcA from about 1 foot to about 15 miles of the wellbore.

In accordance with some embodiments of the present disclosure, the target subterranean formation can commonly have a pressure of at least about 5% more than the target subterranean formation. More commonly, the target subterranean formation can have a pressure of at least about 10% more, even more commonly a pressure of at least about 50% more, yet even more commonly a pressure of at least about 100% more, yet even more commonly a pressure of at least about 200% more, yet even more commonly a pressure of at least about 500% more, yet even more commonly a pressure of at least about 1,000% more, yet even more commonly a pressure of at least about 2,500% more, yet even more commonly a pressure of at least about 5,000% more, yet even more commonly a pressure of at least about 7,500% more, or even yet more commonly a pressure of at least about 10,000% more than the target subterranean formation.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B or C", and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

As used herein, the words "injecting", "injected", "introducing", and "introduced" can be used interchangeability. Moreover, in addition to their typically and usually meanings they can also refer to an in situ generation process, an in situ release process, or a process occurring at a location other than the wellhead and/or wellbore.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of the disclosure.

FIG. 1 depicts a well undergoing a stimulation treatment according to the prior art;

FIGS. 2A and 2B depict a well undergoing a stimulation treatment according to some to embodiments of present disclosure;

DETAILED DESCRIPTION

Figure 2B:
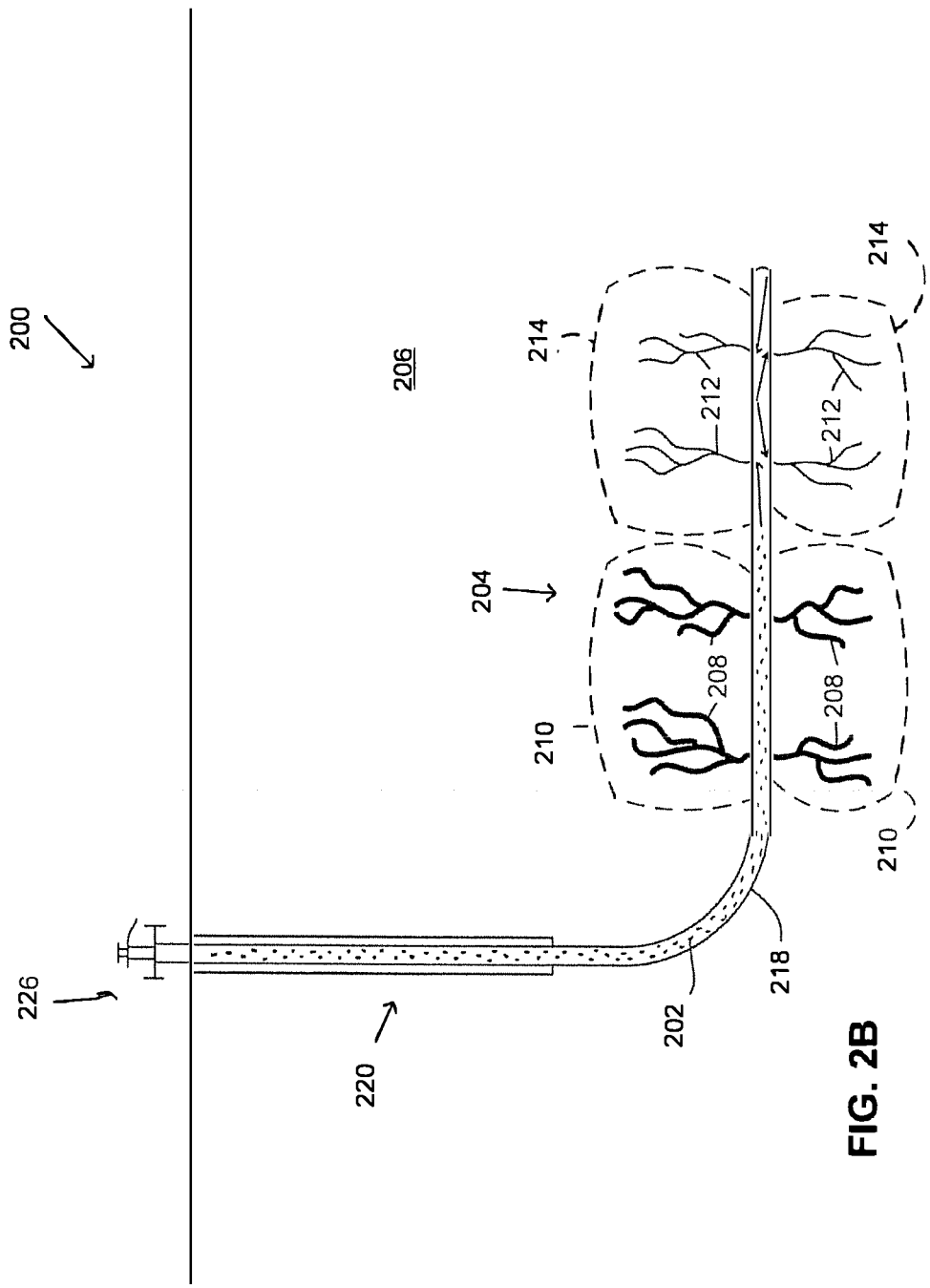

FIG. 1 depicts a side view of a horizontal drilled well 100 treated according to a method of the prior art utilizing a fracturing liquid 102 to produce multiple fractures 104 within a subterranean formation 106. The multiple fractures 104 produced by the pressurized liquid 102 can vary in size. Typically, low stress zones 110 contain larger fractures and/or pore volumes 108 than high stress zones 114. During stimulation, re-stimulation or re-fracturing the fracturing liquid 102 typically tends to concentrate in the larger fractures and/or larger pore volumes 108 of low stress zones 110. These low stress zones 110 tend to be zones of hydrocarbon depletion, lower pore pressure, higher pei ineability, or a combination thereof Permeability of the reservoir can, in part, depend on the extensiveness and interconnectivity of the fractures and/or pores. Moreover, hydrocarbon flow typically depends on the extensiveness and/or interconnectivity of the fractures and/or pores that create pathways for the hydrocarbon. The hydrocarbons are more likely to flow through these larger and/or more interconnected fractures and/or pore volumes 108. The high stress zones 114 tend to be zones having finer and/or less interconnected fractures and/or pore volumes 112 such that the fracturing liquid 102 is less likely to hydraulically fracture these high stress zones 114. These finer and/or less interconnected fractures and/or pore volumes 112 can influence the flow of hydrocarbons in these regions upon stimulation or re-stimulation. This is in part, because the pressure of the fracturing liquid 102 is generally distributed along the wellbore 118 in the treated area such that the pressurized fracturing liquid 102 can achieve the fracture gradient in the low stress zones 110 but not the high stress zones 114. The high stress zones 114, in contrast to the low stress zones 110, can have one or more of higher pore pressure, ineffective hydraulically fractured regions, lower permeability, or generally less depleted portions of the subterranean formation 106. As such, the fracturing liquid 102 is one or more of less likely to permeate these lower permeability and/or generally less depleted portions of the subterranean formation 106 and less likely to achieve the fracture gradient threshold in these higher pore pressure, high stress zones 114. Accordingly, unless additional systems and methods are employed the hydrocarbons in these high stress zones 114 are difficult to produce due to high pore pressures and/or low permeability of these zones.

In subsequent or initial well treatments diverter systems can be used to divert the fracturing liquid 102 from the low stress zones 110, which can be depleted from previous treatments, to the previously un-accessed, high stress zones 114. Diverting the fracturing liquid 102 into these high stress zones 114 can be difficult over large areas of the wellbore 118 and reservoir for a number of reasons. In new wells, the difficulty can be due to differences in stresses from different lithologies or from different reservoir characteristics along the wellbore 118. Differences in stress can be due to natural in-situ stress conditions or man-made activities such as well stimulation or depletion of fluids, as for example hydrocarbons. In previously stimulated wells, the difficulty can be due to adequately blocking the fractures and/or pore volume108 in the low stress zones 110 such that the fracturing liquid 102 pressurizes the high stress zones 114. Diverter systems can include the use of particulates (e.g., inorganic and/or organic polymeric particulates) and chemical diverters within the fracturing liquid 102, among other methods, to block either the wellbore 118 or the subterranean formation 106 near the wellbore 118 so that a portion of the fracturing liquid 102 can be diverted to the high stress zones 114 and create new fractures 112 in the high stress zones 114.

Aspects of the presently disclosed technology involve a diversion technique for use in vertical, deviated, or horizontal wells undergoing a stimulation process (e.g., initial stimulation or re-stimulation). The presently disclosed technology can divert a fracturing liquid from treating one or more previously stimulated areas (i.e., low stress zones of the formation) to one or more previously unstimulated zones (i.e., high stress zones of the formation). As used herein a previously unstimulated area can refer to one or more of a previously unstimulated high stress zone, a previously unstimulated low stress zone, a previously partially stimulated high stress zone, a previously partially stimulate low stress zone, or a combination thereof.

The methods disclosed herein can provide cost-effective means for improving hydrocarbon production from a well. After a wellbore is drilled and completed, stimulation operations are usually performed to enhance hydrocarbon (e.g. gas, oil, etc.) production into the wellbore and to enhance extraction of hydrocarbons from the subterranean formation 160. It can be appreciated that the above-described initial well treatments and/or subsequent well treatments can direct a fracturing liquid 102 to one or more previously unstimulated zones. The previously unstimulated zones can be high stress zones 114. Aspects of the present disclosure can involve a technique for use in vertical, deviated, or horizontal wells undergoing a stimulation process (e.g., initial stimulation or re-stimulation) to direct a fracturing liquid 102 to treat a previously unstimulated zone.

Current diversion techniques use liquid or solid forms, such as chemical solutions (e.g., a borate solution) or, particulates (e.g., polymers spheres). The methods of the present disclosure are cost effective, operationally feasible based on current equipment available to the industry, and can enhance the rate of extraction of the hydrocarbons. In particular, the use of a gas (or foam) as the diversion medium allows for greater filling of the reservoir in low stress zones such that a fracturing liquid can be more efficiently diverted to the higher stress zones of the reservoir. The use of a gas (or foam) as the diversion medium also has advantages in that the gas (or gas component of the foam) can be recovered during flowback. In certain instances, the gas (or gas component of the foam) can be recovered during flowback can be reused, recycled, or marketed.

Moreover, the methods of the present disclosure can use one of a gas as the medium for treating the previously unstimulated zones. As used herein the gas can generally refer to any chemical composition in the gaseous phase including but not limited to a single phase gaseous system, a foam (that is, a gas entrapped within a liquid), and a combination thereof (that is, a system having some gas entrapped within a liquid and some gas not entrapped within a liquid). It is believed that the gas can more effectively penetrate one or both of the fractures and pore volumes of the previously unstimulated zones than the fracturing liquid 102. That is, the gas can more easily fill and pressurize the one or both of the fractures and pore volumes of the previously unstimulated zones more easily than the fracturing liquid 102. Furthermore, it is believed that one or both of the fractures and pore volumes of the previously unstimulated zones filled and/or pressurized with a gas can be efficiently stressed and fractured.

In accordance with some embodiments of the disclosure, the method can include stimulating a well and reservoir by alternating or simultaneously introducing a gas diverter and a conventional diverter (e.g., chemical, biological, or mechanical diverter systems known and unknown). In certain instances, using a conventional diverter along with the gas diverter, described herein, could produce better economic results than either one could produce on their own. In some embodiments, the method includes introducing a gas and a conventional diverter system into a reservoir. The gas and conventional diverter system can be introduced simultaneously or one after the other in any order and/or combination. While not wanting to be bound by example: the gas can be introduced prior to the conventional diverter system; or a first portion of the gas can be introduced prior to the conventional diverter system and a second portion of gas can be introduced after the conventional diverter system; or the convention diverter system can be introduced prior to gas being introduced.

Figure 3:
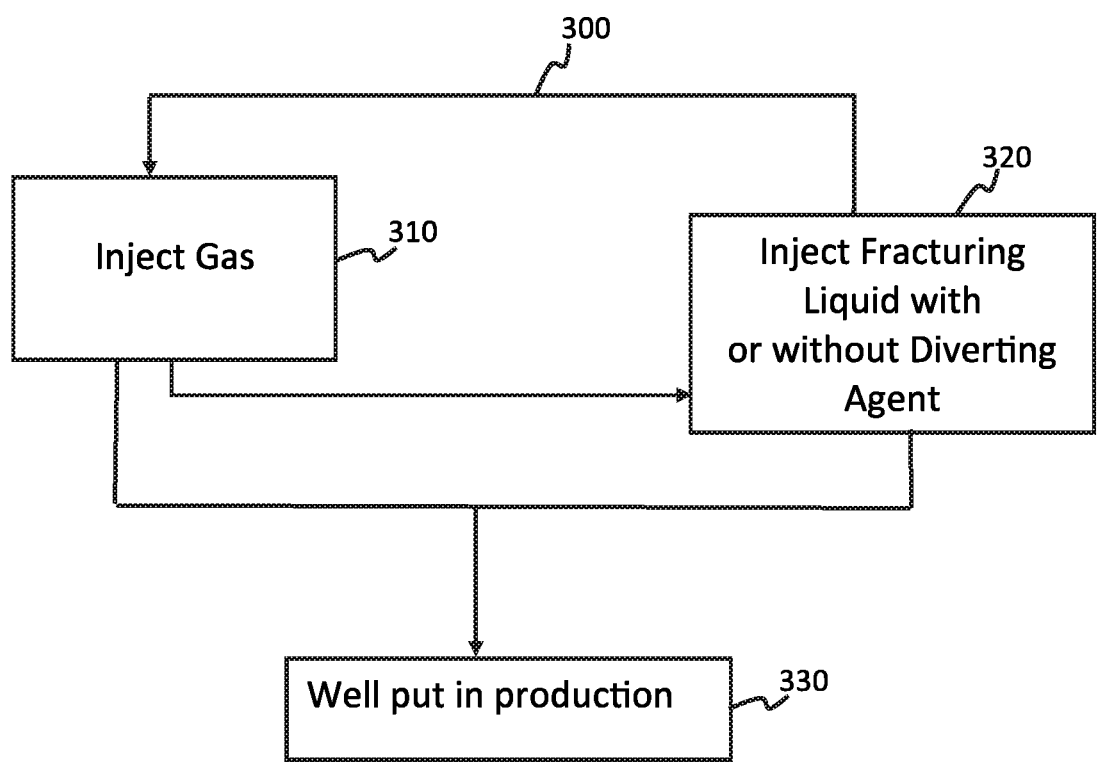
FIG. 3 depicts a process according to some embodiments of the present disclosure.

FIGS. 2A and 2B depict a side view of a well configuration 200 in accordance some embodiments of the present disclosure treated according to process 300 depicted in FIG. 3. In step 310, a gas (in any of the forms as described herein) 216 is introduced and/or injected into a well and reservoir 220 comprising subterranean formation 206. The subterranean formation 206 may include any type of rock and/or mineral or combination and/or mixture of any known rocks and minerals. The subterranean formation 206 can comprise one or more of sedimentary rocks, igneous rocks, and metamorphic rocks. Non-limiting examples of sedimentary rocks can include sandstone, limestone, and shale. Igneous rocks can include without limitation granite and andesite. Metamorphic rocks can include without limitation gneiss, slate, marble, schist, and quartzite. In some embodiments, the subterranean formation 206 can comprise a shale formation, a clay formation, a sandstone formation, a limestone formation, a carbonate formation, a granite formation, a marble formation, a coal bed, or a combination thereof.

The gas 216 is introduced and/or injected into the subterranean formation 206 at sufficient pressure to pressurize first portion fractures and pore volumes 208. In accordance with some embodiments, the gas 216 can also infiltrate second portion fractures and pore volumes 212. Generally, the first portion fractures and pore volumes 208 are contained in first stress zone 210 and the second portion fractures and pore volumes 212 are contained in second stress zone. The first stress zone 210 is typically of lower stress than the second stress zone 214. Stated another way, the second stress zone 214 is usually of higher stress than the first stress zone 210.

The injection pressure of the gas 216 depends on the fracture gradient of the low stress zone 210. As will be appreciated, the fracture gradient is the pressure required to induce a fracture in the rock, such as the subterranean formation 206, at a given depth, as such the fracture gradient units are typically expressed in psi/ft or kPa/m. The fracture gradient can be a function of many factors including but not limited to overburden stress, Poisson's ratio of the formation (rock), pore pressure gradient, formation (rock) matrix stress coefficient, and matrix stress. There are many techniques for determining the fracture gradient of a subterranean formation 206. The pseudo-overburden stress method, effective stress method, leak-off tests, Hubbert & Willis technique, Matthews & Kelly technique, and Ben Eaton technique. Typically, the gas 216 is injected into the wellbore 218 at a pressure that is less than the fracture gradient(s) of the first 210 and/or second 214 stress zones (and/or other subsurface formations along the wellbore 218) to inhibit (further) fracturing of one or more of these zones. In accordance with some embodiments, the injection pressure of the gas 216 is generally maintained below the fracture gradient the subterranean formation 206. More generally, the injection pressure of the gas 216 is maintained below the fraction gradient of one or more the first 210 and second 214 stress zones. Even more generally the injection pressure of the gas 216 is maintained below the fracture gradient of subterranean formation 206 including the first 210 and second 214 stress zones during substantially the entire duration of injecting the gas 216. Typically, the injection pressure of the gas 216 is maintained below the fracture gradient of subterranean formation 206 including the first 210 and second 214 stress zones during substantially at least about 50% of the entire duration of injecting of the gas 216. More typically, at least about 75%, even more typically at least about 90%, and yet even more typically at least about 95% of the entire duration of the injecting the gas 216.

In some embodiments of step 310, the injecting of gas 216 is continued until a desired pressure is reached within the well and/or reservoir 220. Typically, the injecting of the gas 216 is continued to a pressure of no more than the fracture gradient. More typically, the gas 216 is continued to a pressure of one of no more than about 99% of the fracture gradient, even more typically to a pressure of no more than about 98% of the fracture gradient, yet even more typically to a pressure of no more than about 97% of the fracture gradient, still yet even more typically to a pressure of no more than about 96% of the fracture gradient, still yet even more typically to a pressure of no more than about 95% of the fracture gradient, still yet even more typically to a pressure of no more than about 90% of the fracture gradient, still yet even more typically to a pressure of no more than about 85% of the fracture gradient, still yet even more typically to a pressure of no more than about 80% of the fracture gradient, still yet even more typically to a pressure of no more than about 75% of the fracture gradient, still yet even more typically to a pressure of no more than about 70% of the fracture gradient, still yet even more typically to a pressure of no more than about 65% of the fracture gradient, still yet even more typically to a pressure of no more than about 60% of the fracture gradient, still yet even more typically to a pressure of no more than about 55% of the fracture gradient, still yet even more typically to a pressure of no more than about 50% of the fracture gradient, still yet even more typically to a pressure of no more than about 45% of the fracture gradient, still yet even more typically to a pressure of no more than about 40% of the fracture gradient, still yet even more typically to a pressure of no more than about 35% of the fracture gradient, still yet even more typically to a pressure of no more than about 30% of the fracture gradient, still yet even more typically to a pressure of no more than about 25% of the fracture gradient, still yet even more typically to a pressure of no more than about 20% of the fracture gradient, still yet even more typically to a pressure of no more than about 15% of the fracture gradient, still yet even more typically to a pressure of no more than about 10% of the fracture gradient, still yet even more typically to a pressure of no more than about 9% of the fracture gradient, still yet even more typically to a pressure of no more than about 8% of the fracture gradient, still yet even more typically to a pressure of no more than about 7% of the fracture gradient, still yet even more typically to a pressure of no more than about 6% of the fracture gradient, still yet even more typically to a pressure of no more than about 5% of the fracture gradient, still yet even more typically to a pressure of no more than about 4% of the fracture gradient, still yet even more typically to a pressure of no more than about 3% of the fracture gradient, still yet even more typically to a pressure of no more than about 2% of the fracture gradient, or yet still even more typically to a pressure of no more than about 1% of the fracture gradient.

Factors that can affect the volume of gas 216 to be introduced in the wellbore 218 include the size (that is volume ) of the subterranean formation 206 in fluid communication with wellbore 218, the size (volume) of the depleted regions of the subterranean formation 206, the size (volume) the pore volumes and fractures, leak off rate of the gas 216, and the reservoir pressure of the subterranean formation 206 prior to the injection of gas 216.

For instance, the volume of the gas 216 injected into the subterranean formation 206 can range from about 1,000 standard cubic feet (scf) to about 100,000,000 scf. In some embodiments, the volume of gas 216 injected into the subterranean formation 206 can be greater than about $1 \times 10^9$ scf. Typically, the volume of gas injected into the subterranean formation 206 is at least about 50,000 scf, more typically at least about 100,000 scf, even more typically at least about 150,000 scf, yet even more typically at least about 200,000 scf, still yet even more typically at least about 250,000 scf, still yet even more typically at least about 300,000 scf, still yet even more typically at least about 350,000 scf, still yet even more typically at least about 400,000 scf, still yet even more typically at least about 450,000 scf, still yet even more typically at least about 550,000 scf, still yet even more typically at least about 600,000 scf, still yet even more typically at least about 650,000 scf, still yet even more typically at least about 700,000 scf, still yet even more typically at least about 750,000 scf, still yet even more typically at least about 800,000 scf, still yet even more typically at least about 850,000 scf, still yet even more typically at least about 900,000 scf, still yet even more typically at least about 950,000 scf, still yet even more typically at least about 1,000,000 scf, still yet even more typically at least about 2,000,000 scf, still yet even more typically at least about 3,000,000 scf, still yet even more typically at least about 4,000,000 scf, still yet even more typically at least about 5,000,000 scf, still yet even more typically at least about 6,000,000 scf, still yet even more typically at least about 7,000,000 scf, still yet even more typically at least about 8,000,000 scf, still yet even more typically at least about 9,000,000 scf, or yet still yet even more typically at least about 10,000,000 scf. Commonly, the volume of gas 216 is no more than about 200,000,000 scf, more commonly no more than about 300,000,000 scf, even more commonly no more than about 400,000,000 scf, or even more commonly no more than about 500,000,000 scf, and still yet it is within the scope of some embodiments of this invention to inject up to about 1,000,000,000 scf.

Stated another way, the volume of gas 216 injected into the subterranean formation 206 can be expressed in terms of standard cubic feet of gas (scf) per net linear feet of the wellbore 218 in contact with and in fluid communication with the subterranean formation 206 (lfcA). Typically, the volume of gas 216 injected into the subterranean formation 206 is at least about 500 scf/lfcA, more typically at least about 525 scf/lfcA, even more typically at least about 550 scf/lfcA, yet even more typically at least about 575 scf/lfcA, still yet even more typically at least about 600 scf/lfcA, still yet even more typically at least about 625 scf/lfcA, still yet even more typically at least about 650 scf/lfcA, still yet even more typically at least about 675 scf/lfcA, still yet even more typically at least about 700 scf/lfcA, still yet even more typically at least about 725 scf/lfcA, and yet still even more typically at least about 750 scf/lfcA. Commonly, in some embodiments, the volume of gas 216 injected into the subterranean formation 206 is no more than about 5,000 scf/lfcA, even more commonly no more than about 4,750 scf/lfcA, yet even more commonly no more than about 4,500 scf/lfcA, or yet even more commonly no more than about 4,250 scf/lfcA, still yet even more commonly no more than about 4,000 scf/lfcA, still yet even more commonly no more than about 3,750 scf/lfcA, still yet even more commonly no more than about 3,500 scf/lfcA, still yet even more commonly no more than about 3,250 scf/lfcA, still yet even more commonly no more than about 3,000 scf/lfcA, still yet even more commonly no more than about 2,900 scf/lfcA, still yet even more commonly no more than about 2,800 scf/lfcA, still yet even more commonly no more than about 2,700 scf/lfcA, still yet even more commonly no more than about 2,600 scf/lfcA, or yet still even more commonly no more than about 2,500 scf/lfcA.

In accordance with some embodiments, the gas 216 can be injected at a rate of about 30 to about 500,000 scf/min. Generally, the gas 216 can be injected at a rate of about 10,000 to about 20,000 scf/min. Typically, the injection rate of the gas 216 is about 30 scf/min or more, more typically about 50 scf/min or more, even more typically about 100 scf/min or more, yet even more typically about 200 scf/min or more, still yet even more typically about 300 scf/min or more, still yet even more typically about 400 scf/min or greater, still yet even more typically about 500 scf/min or more, still yet even more typically about 600 scf/min or more, still yet even more typically about 700 scf/min or more, still yet even more typically about 800 scf/min or more, still yet even more typically about 900 scf/min or more, or yet still even more typically about 1,000 scf/min or more. Commonly, the gas 216 can be injected at a rate of no more than about 500,000 scf/min, more commonly at rate of no more than about 450,000 scf/min, even more commonly at rate of no more than about 400,000 scf/min, yet even more commonly at rate of no more than about 350,000 scf/min, still yet even more commonly at rate of no more than about 300,000 scf/min, still yet even more commonly at rate of no more than about 250,000 scf/min, still yet even more commonly at rate of no more than about 200,000 scf/min, still yet even more commonly at rate of no more than about 150,000 scf/min, or yet still even more commonly at rate of no more than about 100,000 scf/min.

The gas 216 can include any number of gasses. For example, the gas 216 can comprise nitrogen, hydrogen, methane, ethane, propane, butane, carbon dioxide, any inert gas, oxygen, air, steam or any combination thereof. The gas 216 can be injected into the well and reservoir 220 in a number of ways. In some embodiments, the gas 216 can be delivered to wellhead 226 by one or more of a storage truck, a pipeline, a storage tank, a gas producing well, or other suitable gas supply sources. It can be appreciated that the one or more of the storage truck, pipeline, storage tank, gas producing well, or other suitable gas supply source are interconnected to and in fluid communication with the wellhead 226 and the wellbore 218. Moreover, it can be further appreciated that the wellbore 218 is in fluid communication with subterranean formation 206.

The gas 216 can be a gas in the gas phase, a gas in the liquid phase, or a combination thereof. In some embodiments, the gas 216 can be in the gas phase. In such embodiments, the gas 216 can be pumped directly into the wellbore 218 from wellhead 226. In some embodiments, the gas 216 can be in the liquid phase when introduced at the wellhead 226. In such embodiments, the liquid phase gas 216 can be directly injected into the wellbore 218 or it can be heated one or more during or after being injected into the wellbore 218. It can be appreciated that the liquid phase gas 216 is generally sufficiently heated during or after being injected into the wellbore 218 that it is substantially in gas phase when it infiltrates the pore volumes and/or fractures of subterranean formation 206. In some embodiments, when the gas 216 is in a liquid phase when introduced to the well and reservoir 220, the gas 216 can be allowed to remain in the well and reservoir 220 for a sufficient amount of time such that the reservoir temperature causes the liquid phase gas 216 to undergo a phase change from a liquid phase to a gas phase before and/or substantially simultaneously with infiltration of the fractures and pore volumes of the subterranean formation 206. For example, the well and reservoir 220 can have a reservoir temperature from about 120 degrees Fahrenheit to about 600 degrees Fahrenheit, or even greater than about 600 degrees Fahrenheit. A gas 216 in a liquid phase can have a temperature less than the reservoir temperature. Generally, a gas 216 in the liquid phase can have a temperature from about −69 degrees Fahrenheit to about 80degrees Fahrenheit. It can be appreciated that the higher reservoir temperature of the well and reservoir 220 can provide sufficient heat to the liquid phase gas 216 to induce a phase transition from the liquid phase to the gas phase.

Typically, the gas 216 can infiltrate the subterranean formation 206 from about 1 to about 7,000 feet from one or more of the wellbore 218 or perforation tunnel. More typically, the gas 216 can infiltrate the subterranean formation 206 from about 10 to about 5,000 feet from one or more of the wellbore 218 or perforation tunnel. More typically, the gas 216 can infiltrate the subterranean formation 206 from about 100 to about 3,000 feet from one or more of the wellbore 218 or perforation tunnel. Commonly, the gas 216 can infiltrate the subterranean formation 206 no more than about 7,000 feet, more commonly no more than about 5,000 feet, or even more commonly no more than about 3,000 feet from one or more of the wellbore 218 or perforation tunnel. Usually, the gas 216 can infiltrate the subterranean formation 206 more than about 1 foot, more usually more than about 10 feet, or even more usually more than about 100 feet from one or more of the wellbore 218 or perforation tunnel.

The gas 216 is generally introduced into the well and/or reservoir 220 through wellhead 226. In some embodiments of step 200, the flow of the gas 216 can be one or more of monitored and controlled by a control system. The control system can include one or more of (a) pressure sensor(s), gauge(s) and switch(es) arrangement any manner or combination thereof.

Typically, the injecting of the gas 216 can be in a substantially uninterrupted continuous flow until the desired volume of the gas 216 has been injected. In some embodiments, the injecting the gas 216 can be intermittently, where the flow of the gas 216 can be started and stopped in succession any number of times until the desired volume of gas 216 has been injected.

The gas 216 can be maintained in the well and/or reservoir 220 for a dwell period of time. The dwell period of time can comprise little, if any, time. However, in some embodiments, a dwell period of time exists between the halting and the starting of the injection of gas 216. In some embodiments, the dwell period of time can be long (such as hours or days) or short (such as minutes or hours). While not wanting to be limited by example, the gas 216 can be injected in the liquid phase where a dwell period of time can be needed for the liquid phase to undergo a phase transition to the gas phase. In some embodiments, the dwell period of time can be as short as about 5 minutes or as long as about 24 hours. In some embodiments, the dwell time can be less than about one hour. In some embodiments, the dwell time can be less than about thirty minutes. In other embodiments, the dwell time can be no more than about twenty-four hours. In other embodiments, the dwell time can be more than about twenty-four hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

As can be appreciated in some embodiments, the gas 216 can be in the form of a foam. The foam can be injected into the well and reservoir 220. Foam quality is conventionally defined as the volume percent gas within the foam at a specified pressure and temperature. The volume % value generally refers to the volume % of gas in the foam. The balance of the volume % of the foam is usually liquid. Typically, the quality of the foam injected into the well and reservoir 220 is about 30 volume % or more. More typically, the quality of foam is about 40 volume % or more, even more typically 50 volume % or more, yet even more typically about 60 volume % or more, still yet even more typically about 70 volume % or more, still yet even more typically about 80volume % or more, or yet still even more typically about 90 volume % or more. That is, in some embodiments, the quality of the foam can be greater than about 30 volume % gas in the foam with the balance being liquid. That is, the quality of the foam can be greater than about 40 volume % gas in the foam with the balance being liquid. In some embodiments, the quality of the foam can be greater than about 50 volume % gas with the balance being liquid. In some embodiments, the quality of the foam can be greater than about 60 volume % gas in the foam with the balance being liquid. In some embodiments, the quality of the foam can be greater than about 70 volume % gas in the foam with the balance being liquid. In some embodiments, the quality of the foam can be greater than about 80volume % gas in the foam with the balance being liquid. In some embodiments, the quality of the foam can be greater than about 80volume % gas in the foam with the balance being liquid. In some embodiments, the quality of the foam can be greater than about 90 volume % gas in the foam with the balance being liquid.

In accordance with some aspects of the present disclosure, the gas can be in the foi n of a foam. In accordance with some embodiments of the present disclosure, the foam can contain more gas by volume than liquid by volume. It can be appreciated that in some embodiments the foam can contain less gas by volume than liquid by volume. Typically, the foam can have no more than about 50 volume % liquid, more typically no more than about 45 volume % liquid, even more typically no more than about 40 volume % liquid, yet even more typically no more than about 35 volume % liquid, no more than about 30 volume % liquid, still yet even more typically no more than about 25 volume % liquid, still yet even more typically no more than about 20 volume % liquid, still yet even more typically no more than about 15 volume % liquid, still yet even more typically no more than about 10 volume % liquid, still yet even more typically no more than about 5 volume % liquid, still yet even more typically no more than about 2 volume % liquid, still yet even more typically no more than 1 volume % liquid, or yet still even more typically no more than about 0.1 volume % liquid. Commonly, the foam can have at least about 1 volume % liquid, more commonly at least about 5 volume % liquid, more typically at least about 10 volutne % liquid, or yet even more commonly at least about 15 volume % liquid.

The percent by volume of the liquid and/or gas is typically measured at the wellhead 226 prior to the injection of the foam into the wellbore 218. Moreover, it can be appreciated that volume % of liquid in foam can vary according to temperature and pressure. Hence, the volume % of liquid in the foam generally corresponds without limitation to those measured at the temperature and pressure of the foam immediately prior to the injection of the foam at the wellhead 226.

The gas 216 may or may not be substantially free of particulates. The particles can comprise, a solid, a semi-solid, a liquid diverting agent, or any combination thereof. Typically, the gas (as measured at the surface) has no more than about 5 volume % particulates, more typically no more than about 2.5 volume % particulates, even more typically no more than about 1 volume % particulates, yet even more typically no more than about 0.75 volume % particulates, still yet even more typically no more than about 0.5 volume % particulates, still yet even more typically no more than about 0.25 volume % particulates, or yet still even more typically no more than about 0.1 volume % particulates. Although particulates are beneficial in some applications, particulate diverting agents, in particular, can cause production problems downhole. They can one or more of restrain, impair, and damage porosity and permeability. It can be appreciated that the one or more of restrained, impaired, and damaged porosity and permeability can impede hydrocarbon flow from the fractured and exposed surfaces in the wellbore 218 contacted by any other diverting agent(s). The gas 216 is generally substantially free of particles.

It can be further appreciated that the gas 216 can be substantially compressible. Typically, the gas 216 is compressed within the wellbore 218 and the reservoir. It can be further appreciated that a fracturing liquid 202, which is injected in step 320 following the injection of the gas 216 in step 310. It can be appreciated that the fracturing liquid 202 is generally substantially incompressible. Compared with the fracturing liquid 202, the gas 216 more easily fills the fractures and/or pore volumes of the subterranean formation 206. Ability of the gas 216 to more easily fill the fractures and/or pore volumes of subterranean formation 206 than the fracturing liquid 202 can be due one or more of the following: (a) the higher surface tension of the fracturing liquid 202, compared to the gas 216; (b) the lower density of the gas 216 compared to the fracturing liquid 202; (c) the inability of the fracturing liquid 202 to wet the subterranean formation 206; and (d) the ability of the gas 216 to diffuse into the subterranean formation 206 compared to the impermeability of fracturing liquid 202 to subterranean formation 206. While not wishing to be bound by any theory, it is believed that the gas 216 (in any of the forms as described herein) will fill or occupy fractures in the formations along the wellbore 218 (e.g., the first portion fractures and pore volumes 208 which is often already fractured and/or has a low pore pressure) and, when contacted with the fracturing liquid 202, will compress until a fracture gradient is reached, thereby causing fracture initiation and propagation in a previously unstimulated zone.

Typically, the one or more of fractures and pore volumes 208 are in first stress zone 210 of subterranean formation 206. The injected gas can infiltrate and pressurize the subterranean formation 206 and the reservoir holding the hydrocarbons. The gas can travel through a network of the first portion fractures and pore volumes 208. The first portion fractures and pore volumes 208 can be man-made, naturally occurring, or a combination of naturally occurring and man-made. That is, the first portion fractures and/or pore volumes 208 can be preexisting within the natural formation and/or regions of hydrocarbon depletion. Upon infiltration, the gas 216 will occupy the first portion fractures and pore volumes 208 in the subterranean formation 206. This gas infiltration into the first portion fractures and pore volumes 208 can create a sufficient pressure in the first stress zone 210 and the first fractures and pore volumes 208 to allow a fracturing liquid 202 to fracture previously unstimulated zones. These previously unstimulated zones fractured by the fracturing liquid 202 can be portions of the subterranean formation 206 that are a significant distance from wellbore 218 (i.e., far-field) compared any previous stimulated areas. Moreover, these previously unstimulated areas fractured by the fracturing liquid 202 can be portions of the subterranean formation 206 previously having little, if any, of one or both of hydrocarbon permeability and production prior to being fractured by the fracturing liquid 202. While not wanting to be limited by theory, it is believed that the infiltration of the gas 216 into the first portion fractures and pore volumes 208 can create a barrier for the fracturing liquid 202 that is subsequently delivered into the wellbore 218 and diverted to the second stress zone 214. The gas 216 in the stimulation network can build a sufficient pressure in the network allowing subsequently delivered fracturing liquid 202 to be diverted into previously untreated areas of the subterranean formation 206. In some instances, this method will allow for the diversion of the fracturing liquid 202 to a portion of the subterranean formation 206 that is a significant distance from the wellbore 218 (i.e. far-field). While not wanting to be limited by theory, it is believed that the fractures generated in the previously unstimulated zones can be in some embodiments the second portion fractures and pore volumes 212. It is also believed that that the fractures generated in the previously unstimulated zones can be in some embodiments new fractures and pore volumes in the first stress zone 210 that are not part of the first portion fractures and pore volumes 208. Moreover, it is believed that in some embodiments the fractures generated in the previously unstimulated zones can be a combination of the second portion fractures and pore volumes 212 and the new fractures and pore volumes in the first stress zone 210 that are not part of the first portion fractures and pore volumes 208.

The fracturing liquid 202 can be without limitation one or more of slick-water, a gel, and a fracturing foam. Commonly, the slick water comprises a low viscosity water-based fluid. More commonly, the slick water comprises a low viscosity water-based fluid with a proppant. The gel can comprise one or more of a borate, hydroxypropyl guar (HPG), carboxymethyl hydroxypropyl guar (CMHPG), and carboxymethyl cellulose (CMC). The fracturing foam can comprise one or more of nitrogen and water with gel, carbon dioxide, propane, and combinations thereof. In some embodiments, the fracturing liquid 202 or an amount of water used in the fracturing liquid 202 can be supplied by storage tanks, naturally formed features (e.g., spring), a pipeline, etc.

The fracturing liquid 202 can be continuously injected or it can be intermittently injected into the wellbore 218 and reservoir. In the case of intermittent injection, the injecting of the fracturing liquid 202 can be halted for a period of time before continuing with injecting process. The period of time between injections can be a period of minutes, hours, or days. For example, the period of time between injections can be at least about 1 minute, at least about 5 minutes, at least about 10 minutes, at least about 20 minutes, at least about 30 minutes, at least about 45 minutes, at least about 1 hour, at least about 2 hours, or at least about 3 hours, among other time periods.

The initial gas 216 injection typically goes into the low stressed pore areas and increases the stress of the pore areas. It is believed that the leak-off rate of the injected fracturing liquid 202 into the pores is slowed by the gas 216. Fractures are generally larger than pores. With respect to fractures, the fracturing liquid 202 is not believed to force the gas 216 out of the fractures in the low stress zones due to the effects of frictional resistance to multi-phase flow (including both liquid and gas). When the injection pressure is more than the frictional resistance, the fracturing liquid 202 is believed to displace the gas 216 from the fractures. However, as the fracture decreases in size (e.g., width and/or height) it is believed that the resistance to flow will increase above the injection pressure, thereby preventing the fracturing liquid 202 from displacing the gas 216 from the fracture. When the fracture gradient is reached, fracture initiation and propagation commences, such as in the high stress zones. The gas 216 is thus believed to block the fracturing liquid 202 from propagating the fracture in the low stress zone. When injections of gas 216 and fracturing liquid 202 are alternated, it is believed that the gas 216 will enter the subterranean formation 206 having the next lowest fracture gradient.

It is further believed that the gas 216 (in any of the forms as described herein) can fill and/or occupy the fractures and pore volumes in the subterranean formation 206 along the wellbore 218. Typically, the gas 216 can fill and/or occupy the fractures and pore volumes in one or more of the first 210 and second 214 stress zones. Moreover, when the gas 216 in the one or more of the first 210 and second 214 stress zones is contacted with the pressurized fracturing liquid 202, the gas 216 can be compressed. That is, the gas 216 can be pressurized within the one or more of the first 210 and second 214 stress zones. While not wanting to be limited by theory, it is believed that the gas 216 compressed in the one or more of the first stress zones 210 and second stress zones 214 can be pressurized until the fracture gradient of one or both of first 210 and second 214 stress zones is reached, thereby causing one or more fractures to initiate and propagation within the one or both of the first 210 and second 214 stress zones. It is further believed that at least some, if not most, of the one or more fractures initiated and propagated by the compressed gas can be in previously unstimulated zones. Moreover, it is further believed that at least some, if not most, of the one or more fractures initiated and propagated by the compressed gas can occur in portions of the first 210 and/or second 214 stress zones previously unstimulated by a pressured fracturing fluid. In other words, the gas 216 can fill, occupy and pressurize the portions of the first 210 stress zone, and second 214 stress zone, or a combination of the first 210 and the second 214 stress zones that the previous pressurized fracturing fluid could not and thereby fracture the previously unstimulated portions of one or both of the first 210 and second 214 stress zones.

It can be further appreciated that the fracturing liquid 202 can or cannot include a diverting agent. The diverting agent can be a chemical, a mechanical device, or a biological material. For example, the diverting agent can be a particulate material. The diverting agent can be any diverting agent commonly used in diverting systems and any of the others not commonly used. The particulate materials can be blended with the fracturing liquid 202 to form the diverting composition and then injected into the wellbore 218. Examples of diverting agents that can be mixed with the fracturing liquid 202 include, but are not limited to, sand, ceramic proppant, resin coated proppant (ceramic, sand or other), salts, water soluble balls of polyesters/polylactide copolymer compounded with plasticizers, degradable fibers, starches (e.g., corn starch), gels, guar, ceramic beads, bauxite, glass microspheres, synthetic organic beads, sintered materials and combinations thereof, polymer materials, fluoro-polymer particulates (such as, but not limited to TEFLON™ fluoro-polymer particulates), nut shell pieces, seed shell pieces, cured resinous particulates comprising nut shell pieces, cured resinous particulates including seed shell pieces, fruit pit pieces, cured resinous particulates including fruit pit pieces, wood, composite particulates and any combinations thereof. The diverting agent can be degradable and can include but not be limited to degradable polymers, dehydrated compounds, and mixtures thereof. Examples of degradable polymers that can be used as a diverting agent can include, but not be limited to homopolymers, and random, block, graft, and star- or hyper-branched polymers. Examples of suitable polymers include polysaccharides such as dextran or cellulose, chitin, chitosan, proteins, aliphatic polyesters, poly(lactide), poly(glycolide), poly(c-caprolactone), poly(hydroxyhutyrate), poly(anhydrides), aliphatic polycarbonates, poly(ortho esters), poly(amino acids), poly-ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). These and other diverting agents can be used in the embodiments described herein.

In some embodiments, the fracturing liquid 202 can contain a diverting agent. In such instances, those of skill in the art generally refer to such a composition (that is, a composition containing fracturing liquid and a diverting agent), a diverting composition. It can be appreciated that step 320 can include injecting the fracturing liquid 202 with or without a diverting agent mixed with the fracturing liquid 202 into the wellbore 218 such that the fracturing liquid 202, with or without the diverting agent, pressurizes the subterranean formation 206 and initiates and propagates one or more fractures in previously unstimulated zones of the subterranean formation 206. Without injecting the gas 216 into the wellbore 218, the fracturing liquid 202, with or without the diverting agent, would not be diverted to the previously unstimulated zones and would otherwise infiltrate the previously stimulated fractures. In other words, sufficiently pressurizing the previously stimulated fractures can cause the subsequently injected fracturing liquid 202, with or without diverting agent, to bypass the pressurized, gas-filled previously stimulated fractures and infiltrate the previously unstimulated zones of the subterranean formation 206. It can be appreciated that the infiltration of the previously unstimulated zones by the fracturing liquid 202 can fracture at least some of the previously unstimulated zones of the subterranean foi illation 206.

It can be further appreciated that injecting the fracturing liquid 202 with or without a diverting agent mixed with the fracturing liquid 202 into the wellbore 218 such that the fracturing liquid 202, with or without the diverting agent, pressurizes the first portion of the subterranean formation 206 and initiates and propagates one or more fractures in the second portion of the subterranean formation 206. In other words, without the injection of the gas 216 into the wellbore 218, the fracturing liquid 202, with or without the diverting agent, would not be diverted to the second portion of the subterranean formation 206 and would otherwise infiltrate the first portion of the subterranean formation 206. Moreover, sufficiently pressurizing the first portion of the subterranean formation can cause the subsequently injected fracturing liquid 202, with or without diverting agent, to bypass the pressurized, gas-filled first portion of the subterranean formation 206 and infiltrate the second portion of the subterranean formation 206. It can be appreciated that the infiltration of the second portion of the subterranean formation 206 by the fracturing liquid 202 can fracture at least some of the second portion of the subterranean formation 206.

Generally, it is believed that injecting the fracturing liquid 202 with or without a diverting agent mixed with the fracturing liquid 202 into the wellbore 218 such that the fracturing liquid 202, with or without the diverting agent, pressurizes the first stress zone 210 of the subterranean formation 206 and initiates and propagates one or more fractures in the second stress zone 214 of the subterranean formation 206. More generally, the first stress zone 210 has a lower stress than the second stress zone 214. Even more generally, the first stress zone 210 contains previously stimulated, first portion fractures and pores volumes 208. In other words, without the injection of the gas 216 into the wellbore 218, the fracturing liquid 202, with or without the diverting agent, would not be diverted to the second stress zone 214 of the subterranean formation 206 and would otherwise infiltrate the first portion fractures and pore volumes 208. Moreover, sufficiently pressurizing the first portion fractures and pore volumes 208 can cause the subsequently injected fracturing liquid 202, with or without diverting agent, to bypass the pressurized, gas-filled first portion of the fractures and pore volumes 208 and infiltrate the second stress zone of the subterranean formation 206. It can be appreciated that the infiltration of the second stress zone of the subterranean formation 206 by the fracturing liquid 202 can fracture at least some of the second stress zone of the subterranean formation 206.

Moreover, in accordance with some embodiments, it believed that the gas 216 can infiltrate and pressurize the fractures and/or pore volumes in one or both of the first and second portions of the subterranean formation 206 prior to the introduction of the fracturing liquid 202 to one or both of the first and second portions of the subterranean formation 206. Furthermore, it is believed that the gas 216 can infiltrate and pressure fractures and/or pore volumes that the fracturing liquid 202 is substantially unable to infiltrate and pressurize. More specifically, it is believed that the gas 216 can infiltrate and pressure fractures and/or pore volumes that the fracturing liquid 202 is substantially unable to infiltrate and pressurize under the pressure that the fracturing liquid 202 is introduced into the subterranean formation 206. In other words, the gas 216 within the fractures and/or pore volumes of subterranean formation 206 is further pressurized by the fracturing liquid 202. This further pressurization of the gas 216 within the fractures and/or pore volumes one or both of: (a) forms barrier between fracturing liquid 202 and the gas filled fractures and pore volumes and (b) achieves a sufficient pressure within the gas filled fractures and pore volumes to fracture one or more of the gas filled fractures and/or pore volumes. It can be appreciated that the fractures that develop in the one or more of the gas filled fractures and/or pore volumes can be in one or more of the first 210 and second 214 stress zones are new fractures and were not previous manmade and/or naturally occurring fractures. Typically, the second stress zone 214 has a greater stress than the first stress zone 210. In some embodiments, the first stress zone 210 has a greater stress than the second stress zone 214.

In accordance with some embodiments, the injecting of the gas 216 is maintained for a period of time. It can be appreciated that period of injecting the gas 216 generally refers to the period starting with the injection of the gas 216 and ending with the starting of the injecting of the fracturing liquid 202. Typically, the period of injecting the gas 216 is about 0.1 hours or more. More typically, the period of injecting the gas is about 0.2 hours or more, even more typically about 0.3 hours or more, yet even more typically about 0.4 hours or more, still yet even more typically about 0.5 hours or more, still yet even more typically about 0.6 hours or more, still yet even more typically about 0.7 hours or more, still yet even more typically about 0.8 hours or more, still yet even more typically about 0.9 hours or more, still yet even more typically about 1.0 hour or more, still yet even more typically about 1.5 hours or more, or yet still even more typically at least about 2.0 hours or more. In accordance with some embodiments, the period of injecting the gas 216 can commonly be no more than about 30 days, even more commonly no more than about 25 days, even more commonly no more than about 20 days, yet even more commonly no more than about 19 days, still yet even more commonly no more than about 18 days, still yet even more commonly no more than about 17 days, still yet even more commonly no more than about 16 days, still yet even more commonly no more than about 15 days, still yet even more commonly no more than about 14 days, still yet even more commonly no more than about 13 days, still yet even more commonly no more than about 12 days, still yet even more commonly no more than about 11 days, or yet sill even more commonly no more than about 10 days.

In some embodiments, the gas 216 can be injected into the wellbore 218 over an extended period of time. For example, the gas 216 can be injected over a period of time that can be minutes, hours, days, or months, depending on a number of factors. In some embodiments, the gas 216 can be injected over a period of time of more than about 2 hrs. In other embodiments, the gas 216 can be injected over a period of time of more than a day. For example, in some embodiments, the gas 216 can be injected into the wellbore 218 from a neighboring natural gas well. The pressure at wellbore 218 can be checked during and/or any time period after the injection of the gas 216 to determine if the pressure is sufficient for the introduction of the fracturing liquid 202. If the pressure is not sufficient, additional gas 216 can be injected into the wellbore 218 directly or through the neighboring natural gas well. It can be appreciated that it is possible for weeks to go by with intermittent addition of gas 216 into the wellbore 218 before a sufficient pressure is reached to begin introduction of the fracturing liquid 202.

Furthermore, it is believed that sufficiently pressurizing the first 210 and second 214 portions of the subterranean formation 206 with the gas 216 prior to the injecting of the fracturing liquid 202, with or without the diverting agent, causes the injected fracturing liquid 202 to one or more of permeate, fill, occupy, and pressurize one or more of the fractures and pore volumes of previously unstimulated and/or under stimulated zones. In particular, sufficiently pressurizing the first 210 and second 214 portions of the subterranean formation 206 with gas 216 prior to the injecting and the fracturing liquid 202, with or without a diverting agent, causes the injected fracturing liquid 202 to one or more of permeate, fill, occupy, and pressurize one or more of the fractures and pore volumes of previously unstimulated and/or under stimulated zones of one or more of the first 210 and second 214 portions of the subterranean formation 206.

In some embodiments, step 320 can include introducing the fracturing liquid 202, with or without a diverting agent, into the wellbore 218 and reservoir 220 after step 310 to pressurize the subterranean formation 206. The pressurization of the subterranean formation 206 by the fracturing liquid 202 is sufficient to fracture a portion of the subterranean formation 206. It can be appreciated the introduction of the fracturing liquid 202 into the subterranean formation 206 can pressurize one or more of the first and second portions of the subterranean formation 206. It can be further appreciated that introduction of the fracturing liquid 202 into the subterranean formation can pressurize one or both of the first stress zone 210 and the second stress zone 214. Generally, the second stress zone 214 has a higher stress than the first stress zone 210. Typically, one of first 210 and second 214 stress zones is pressurized more than the other. In some embodiments, the first stress zone 210 is pressurized more than the second stress zone 214. In some embodiments, the second stress zone 214 is pressurized more than the first stress zone 210. Typically, the fracturing liquid 202 pressurizes the second stress zone 214 more than the first stress zone 210, thereby fracturing the second stress zone 214 to a greater extent than the first stress zone 210. While not wanting to be limited by theory, it is believed that one or both of the gas 216 and diverting agent (when the fracturing liquid 202 contains a diverting agent) substantially impedes and/or diverts pressurization of the first stress zone 210 by the fracturing liquid 202 to substantially fracture the first stress zone 210. However, the fracturing liquid 202 can typically sufficiently pressurize the second stress zone 214 to substantially fracture the second stress zone 214. Moreover, the second fractures and pore volumes 212 are usually formed in the second stress zone 214 by the pressurized fracturing liquid 202.

The fracturing liquid 202 can be injected into the well and/or reservoir 220. Step 320 can include injecting the fracturing liquid 202 into the well and/or reservoir 220 through wellhead 226. In some embodiments, step 320 can include the sub-steps of starting and halting of the injecting of the fracturing liquid 202 into the well and/or reservoir 220. Step 320 can also include the sub-step of providing the fracturing liquid 202. Typically, the fracturing liquid 202 can be provided by one or more of a storage truck, a storage tank or other supply source. In some embodiments, step 320 can include injecting the fracturing liquid 202 at an injection rate. Commonly, the injection rate of the fracturing liquid 202 can be from about 2 barrels/minute (bbl/min.) (about 84 gallons/min.) to about 200 bbl/min. (about 8,400 gallons/min). More commonly, the injection rate of the fracturing liquid 202 can be more than about 200 bbl/min (more than about 8,400 gallons/min).

It can be appreciated that in some embodiments, a first portion of the fracturing liquid 202 can contain a diverting agent and a second portion of the fracturing liquid 202 can be substantially devoid of any diverting agent. While not wanting to be limited by example, a first portion of the fracturing liquid 202 containing a diverting agent can be injected into the wellbore and reservoir 220 before a second portion of the fracturing liquid 202 substantially devoid of any diverting agent. It can be appreciated that the introduction of the first portion of the fracturing liquid 202 containing a diverting agent into the subterranean formation 206 can occupy one or more of the first and second portions of the subterranean formation 206. While not wanting to be limited by theory, it is believed that the first portion of the fracturing liquid 202 containing the diverting agent occupies the first portion of the subterranean formation 206. It is further believed that the first portion of the fracturing liquid 202 containing the diverting agent occupying the fractures and pore volumes of the first portion of the subterranean formation 206 substantially impedes and/or diverts the second portion of the fracturing liquid 202 devoid of a diverting agent from first portion of subterranean formation 206 to the second portion of subterranean formation 206. Hence, it is believed that the second portion of the fracturing liquid 202 devoid of the diverting agent can therefore pressurize the second portion of subterranean formation 206 to a sufficient pressure to fracture some of the second portion of the subterranean formation 206. It can be further appreciated that, in some embodiments, the introduction of the first portion of the fracturing liquid 202 containing a diverting agent into the subterranean formation 206 can occupy one or more of the first stress zone 210 and second stress zone 214. While not wanting to be limited by theory, it is believed that the first portion of the fracturing liquid 202 containing the diverting agent occupies the first stress zone 210. It is further believed that the first portion of the fracturing liquid 202 containing the diverting agent occupying the fractures and pore volumes of the first stress zone 210 substantially impedes and/or diverts the second portion of the fracturing liquid 202 devoid of a diverting agent from the first stress zone 210 to the second stress zone 214. Hence, it is believed that the second portion of the fracturing liquid 202 devoid of the diverting agent can therefore pressurize the second stress zone 214 to a sufficient pressure to fracture some of the second stress zone 214.

In some embodiments, the diverting agent can one or more of block and pressurize the first portion of subterranean formation 206 such that the fracturing liquid 202 can bypass the gas-filled and/or diverting agent filled first portion of the subterranean formation 206. Thus, the fracturing liquid 202 can infiltrate and fracture the second portion of the subterranean formation 206. Consequently, when the diverting agent is combined with the fracturing liquid 202, two different diverting techniques (e.g., gas and the diverting agent) are utilized to divert the fracturing liquid 202 to the second portion of the subterranean formation 206 and fracture the second portion of the subterranean formation 206. It can be appreciated that in some embodiments the first portion of the subterranean formation 206 can comprise a first stress zone 210. Furthermore, the second portion of the subterranean formation 206 can comprise a second stress zone 214. Generally, the first stress zone 210 has a lower stress than the second stress zone 214. Moreover, the first stress zone 210 contains first fractures and pore volumes 208. Furthermore, the fractures formed in the second stress zone 214 can comprise the fractures and pore volumes 212.

In accordance with some embodiments, the gas 216 can infiltrate the subterranean formation 206 beyond the wellbore 218 to a distance that is substantially far-field from the wellbore 218. More specifically, the gas 216 can infiltrate the fractures and/or pore volumes of the subterranean formation 206 beyond the wellbore 218 to a distance that is substantial or far-field from the wellbore 218. Furthermore, the gas 216 can infiltrate the subterranean formation 206 outside of a perforation tunnel, or outside of a formation face in the open hole. Typically, the gas 216 can infiltrate the fractures and/or pore volumes extending throughout the reservoir 220, including far-field areas along less than half of the entire length of the wellbore 218. More typically, the gas 216 can infiltrate the fractures and/or pore volumes extending throughout the reservoir 220, including far-field areas along more than half of the entire length of the wellbore 218. Even more typically, the gas 216 can infiltrate the fractures and/or pore volumes extending throughout the reservoir 220, including far-field areas along the entire length of the wellbore 218.

This is at least one advantage of infiltrating the gas 216 with the subterranean formation 206 compared to typical chemical and particulate diverter systems.

It accordance with some embodiments, steps 310 and 320 can repeated any number of times. Moreover, in some embodiments, one or more of the sub-steps of step 320 can be repeated in any order and any number of times within step 320. While not wanting to be limited by example, steps 310 and 320 can be repeated one of 2, 3, 4, 5, 6, 7, 8, 9, 10, 11, or 12 times. Moreover, steps 310 and 320 can be repeated sequentially one after the other in any order. In accordance with some embodiments, when step 310 is repeated the gas 216 can be: in some, or all, of steps 310 in the gaseous phase; in some, or all, of steps 310 in the liquid phase; in some, or all, of steps 310 in the form of foam; or a combination or mixture thereof. In some embodiments, step 310 is conducted sequentially any number of times before step 320. While not wanting to be limited by example, step 310 can be conducted one of 1, 2, 3, 4, 5, 6, 7, 8, 9 10, 11, or 12 times before conducting step 320. In some embodiments, step 320 is conducted sequentially any number of time after step 310. While not wanting to be limited by example, step 320 can be conducted one of 1, 2, 3, 4, 5, 6, 7, 8, 9, 10, 11, or 12 times after conducting step 310. It can be appreciated that step 320 can include the recitation of any of the sub-steps of 320. Any of the sub-steps of 320 can be repeated one of 1, 2, 3, 4, 5, 6, 7, 8, 9, 10, 11, or 12 times when conducting an iteration of step 320.

In some embodiments, steps 310 and 320 can be conducted concurrently and/or at about the same time. Step 320 may be conducted with a diverting agent, without a diverting agent, or with combination of fracturing liquids with and without diverting agents. In some embodiments, steps 310 and 320 are conducted simultaneously without any previous injection of gas 216 into the well 220.

In accordance with some embodiments, one of step 320 with a composition containing a diverting agent or step 310 is conducted prior to injecting of a fracturing liquid devoid of a diverting agent. It can be appreciated that any one of the steps 320 with a composition containing a diverting agent and 310 can be repeated any number of times before the injecting of the fracturing liquid devoid of any diverting agent.

In accordance with some embodiments, one of step 320 with a composition containing a diverting agent or step 310 follows the injecting a fracturing liquid devoid of a diverting agent. It can be appreciated that any one of the steps 320 with a composition containing a diverting agent and 310 can be repeated any number of times following the injecting of the fracturing liquid devoid of any diverting agent.

While not wanting to be limited by example, the methods disclosed herein can include: injecting a first diverting composition; injecting a second diverting composition; and the injecting fracturing liquid. Another example order of injections into the well and reservoir can be as follows:

injecting a first diverting composition; injecting the fracturing liquid; and injecting a second diverting composition. In each of these examples, the first and second diverting compositions can be the gas or foam 216 or the diverting composition including a diverting agent mixed with the fracturing liquid 202. Consequently and more specifically, the methods above can be as follows: injecting a gas or foam; injecting a diverting composition including the diverting agent mixed with a fracturing liquid; and injecting the fracturing liquid. Moreover, the methods above may, more specifically, be as follows: injecting a gas or foam; injecting the fracturing liquid; and injecting a diverting composition including the diverting agent mixed with a fracturing liquid. The methods and sequences above are only some of the possible and contemplated methods and sequences anticipated by this disclosure.

The entire cycle of steps 310 and 320 are repeated if the well and/or reservoir 220 require additional treatment, for example, to divert the flow of fracturing liquid 202 from one of the first and second portions of the subterranean formation 206 to the other of the first and second portions of the subterranean formation 206. Moreover, the flow of fracturing liquid 202 from one of the first and second portions of the subterranean formation 206 to the other of the first and second portions of the subterranean formation 206 for additional fracturing of the one of the first and second potions of the subterranean formation 206 that were formed from the previous operations to fracturing of previously unstimulated and/or under stimulated zones of the other of the first and second portions of subterranean formation 206.

Typically, the entire cycle of steps 310 and 320 are repeated if the well and/or reservoir 220 require additional treatment, for example, to divert the flow of fracturing liquid 202 from the first portion of the subterranean formation 206 to the second portion of the subterranean formation 206 for fracturing. Furthermore, the flow of fracturing liquid 202 from the first portion of the subterranean formation 206 to the second portion of the subterranean formation 206 for additional fracturing of the first potion of the subterranean formation 206 that were formed from the previous operations to fracturing of previously unstimulated and/or under stimulated zones of the second portion of subterranean formation 206.

More typically, the entire cycle of steps 310 and 320 are repeated if the well and/or reservoir 220 require additional treatment, for example, to divert the flow of fracturing liquid 202 from the first stress zone 210 of the subterranean formation 206 to the second stress zone 214 of the subterranean formation 206 for fracturing. Furthermore, the flow of fracturing liquid 202 from the first stress zone 210 of the subterranean formation 206 to the second stress zone 214 of the subterranean formation 206 for additional fracturing of the first stress zone 210 of the subterranean formation 206 that were formed from the previous operations to fracturing of previously unstimulated and/or under stimulated zones of the second stress zone 214 of subterranean formation 206.

Typically, the criteria indicating the need for cycling of steps 310 and 320 can be if the fracturing liquid 202 experiences a high pressure, which may indicate the presence of a zone that can potentially fracture. On the other hand, lower pressure in the well and/or reservoir 220 can indicate the fracturing liquid 202 is infiltrating previously fractured and/or hydrocarbon depleted zones.

In step 330, the well is put in production. Step 330 can include the sub-step of back-flushing the fracturing liquid 202 and gas 216. It can be appreciated that the fracturing liquid 202 and the gas can be back-flushed from the well and/or reservoir 220.

In accordance with some embodiments of this disclosure, the methods and/or processes can energize the reservoir allowing more effective flowback. Moreover, the methods and/or process can allow for higher fluid recovery. Furthermore, the methods and/or process can produce less clay swelling with the subterranean formation.

In accordance with some embodiments of this disclosure, the methods and/or processes can allow for fracturing and/or re-fracturing along the entire of the wellbore. Furthermore, the methods and/or processes can allow for fracturing and/or re-fracturing of the toe region of the wellbore. Moreover, the methods as described herein can be used to stimulate or treat vertical, deviated, or horizontal wells. Furthermore, the methods and/or process of this disclosure can be applied to wells completed with older techniques. In accordance with some embodiments, the methods and/or processes can create a more complex fracture network than methods and/or process of the prior art. In some embodiments of this disclosure, the methods and/or process can have the gas injected in the wellbore that does not leave behind any residue within the wellbore and/or subterranean formation.

Figure 4:
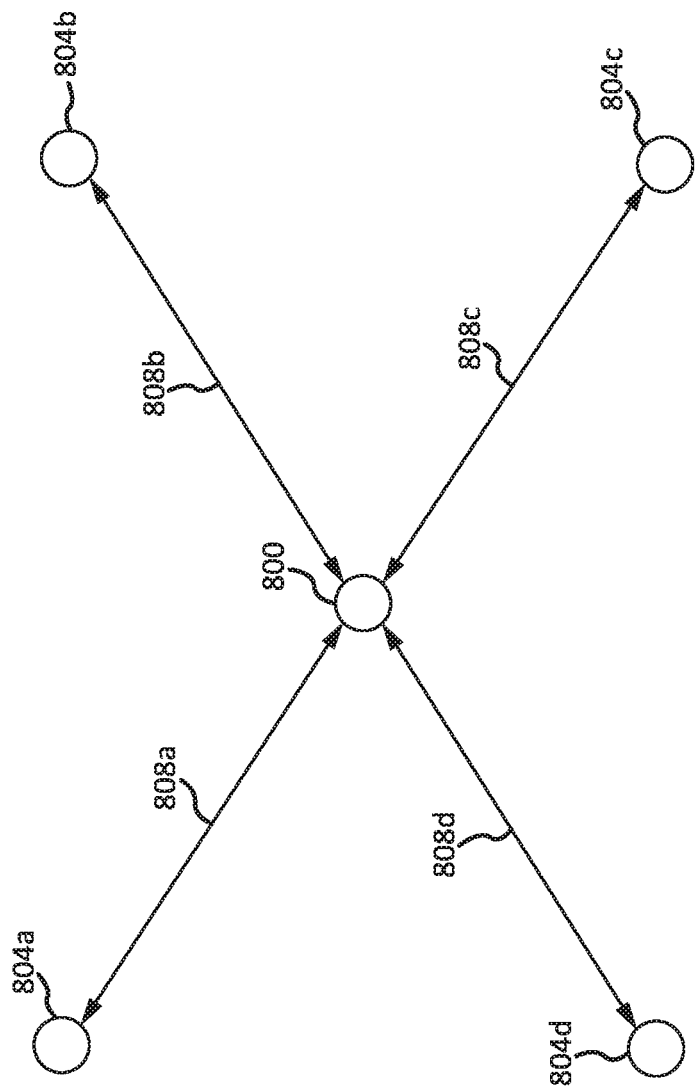
FIG. 4 depicts a multi-well configuration according to an embodiment.
Figure 5:
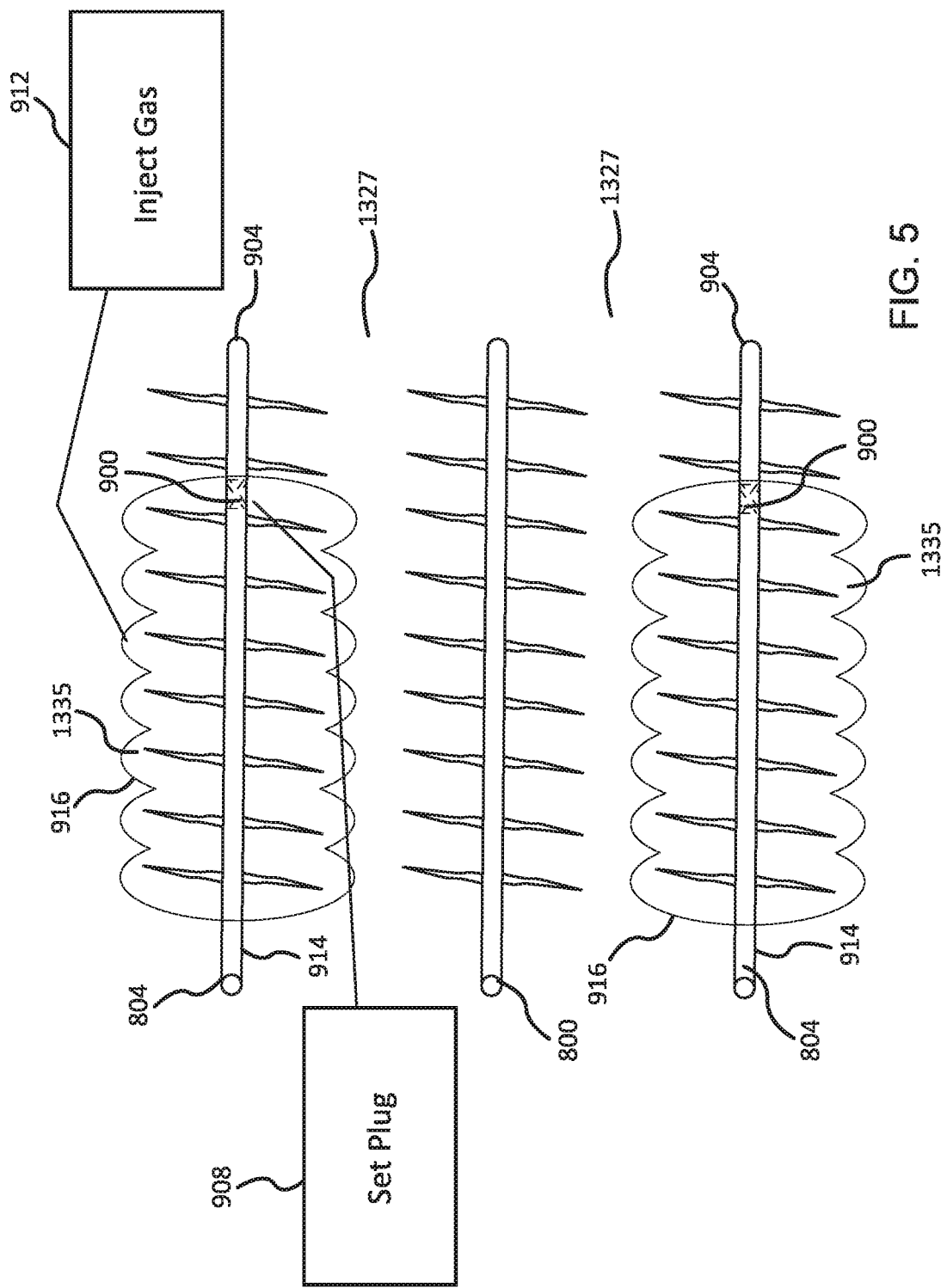
FIG. 5 depicts a multi-well configuration according to an embodiment.
Figure 6:
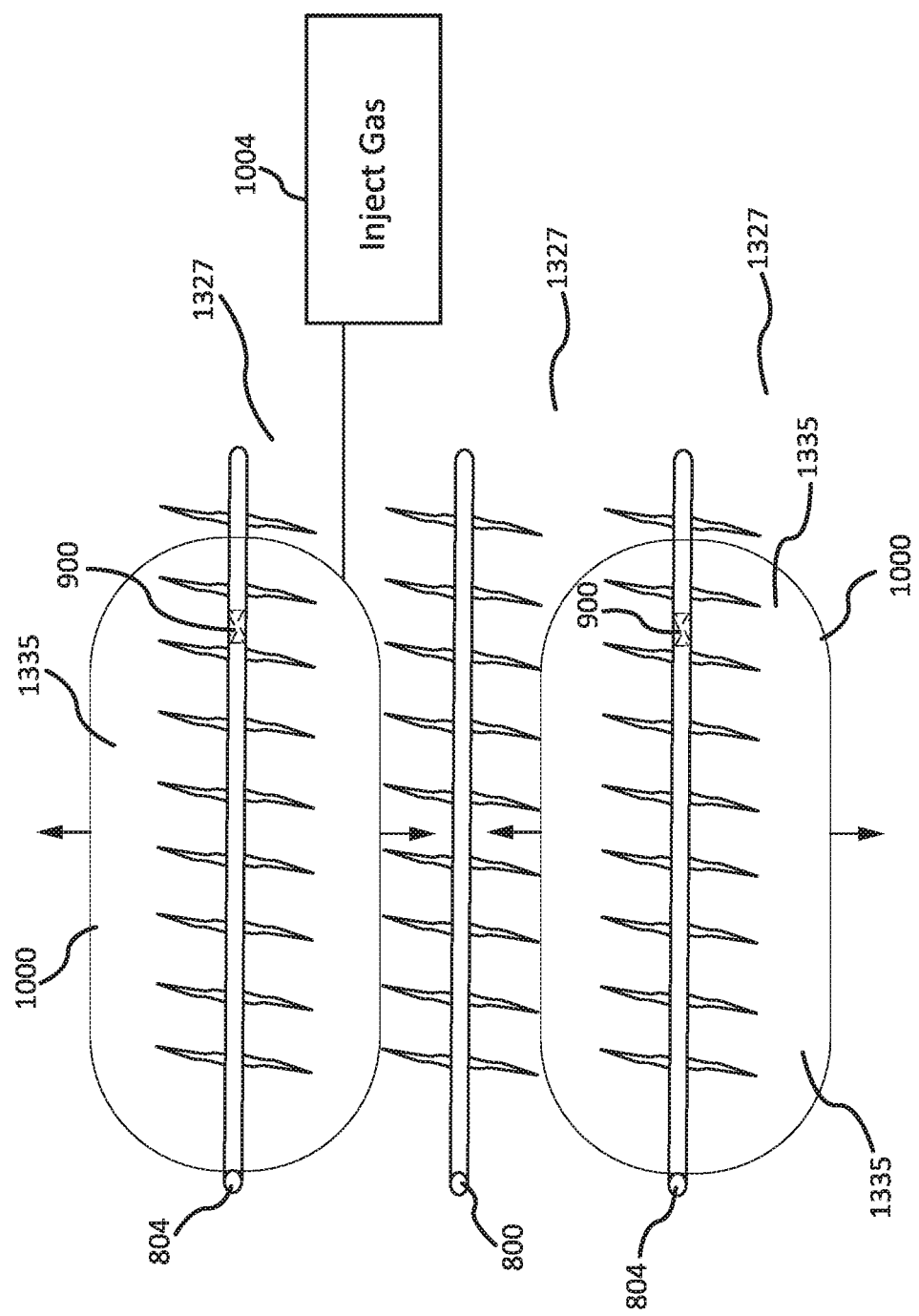
FIG. 6 depicts a multi-well configuration according to an embodiment.
Figure 13:
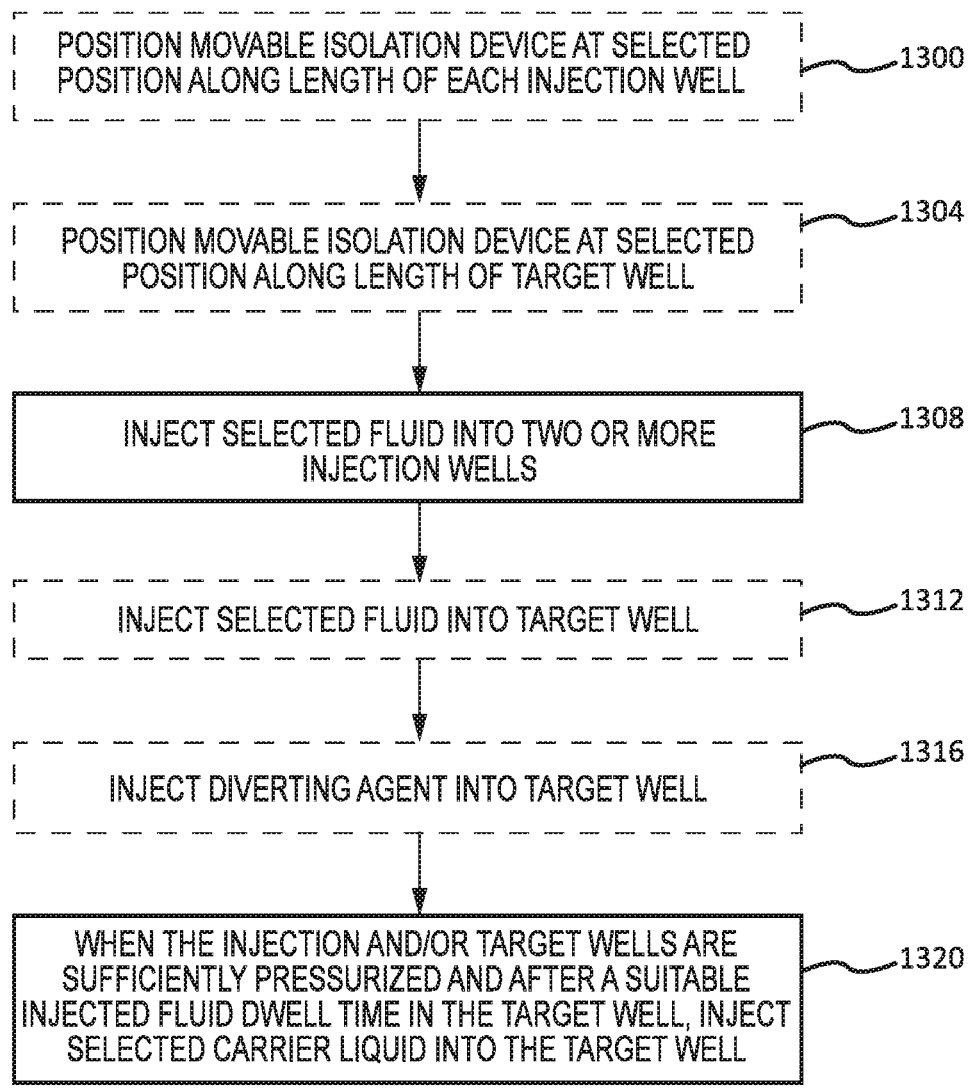
FIG. 13 depicts process configuration according to an embodiment.

Referring to FIGS. 4 and 13, a target well 800 is surrounded by two or more injection wells $804_{a,b,c,d}$. Each injection well can be positioned at a respective distance $808_{a,b,c,d}$ from the target well 800. The distance is a function of the type of fluid injected and the permeability and porosity of the underground formations in the underground zones of interest. Each injection well $804_{a-d}$ can be injected simultaneously or sequentially, in accordance with the parameters set forth above, with a pressurized fluid diversion medium, such as a gas, liquid, or mixture thereof (e.g., foam) (which may or may not be in the form of a diverting composition including a diverting agent), at injection pressure $P_{SI}$ at the surface and pressure $P_{DHI}$ down hole (step 1308, FIG. 13). The target well 800 can also be injected simultaneously or sequentially with the pressurized fluid at injection pressure $P_{ST}$ at the surface and pressure $P_{DHT}$ down hole (optional step 1312, FIG. 13). The injection and down hole pressures are selected according to this disclosure to induce fracturing in the high stress areas rather than low stress areas of the target well 800. The injected fluid in each of the injection wells 804 will, after a selected period of time, migrate towards and pressurize the target well 800. The migration time required for inter-well fluid communication depends on a number of factors including the type of fluid injected and the permeabilities and porosities of the underground formations in the zones of interest. In one configuration, a fluid is injected into the target well while in other configurations no fluid is typically injected into the target well due to fluidization and pressurization of the target well by the fluids injected into the zones of interest by the injector wells.

The fluid pressures $P_{SI}$ at the surface and $P_{DHI}$ down hole in one injection well generally are substantially the same as the respective fluid pressure in another injection well. Typically, the fluid pressure $P_{SI}$ at a first injection well is within about 25%, more typically within about 20%, more typically within about 15%, more typically within about 10%, or more typically within about 5% of the fluid pressure $P_{SI}$ at a second injection well. Likewise, the fluid pressure $P_{DHI}$ at a first injection well is within about 25%, more typically within about 20%, even more typically within about 15%, yet even more typically within about 10%, or still yet even more typically within about 5% of the fluid pressure $P_{DHI}$ at a second injection well. Commonly, the fluid pressure $P_{SI}$ at any injection well is within about 25%, more commonly within about 20%, even more commonly within about 15%, yet even more commonly within about 10%, or still yet even more typically within about 5% of the fluid pressure PsT at the target well, and the fluid pressure $P_{DHI}$ at any injection well is within about 25%, even more typically within about 20%, more typically within about 15%, yet even more typically within about 10%, or still yet even more typically within about 5% of the fluid pressure $P_{SDHT}$ at the target well.

When the injection and target wells are sufficiently pressurized and after a suitable injected fluid dwell time in the target well, the carrier liquid is introduced into the target well 800 to induce fracturing of high stress zones (step 1320, FIG. 13). The pressurization of the injection wells can force the fracture to propagate through the high stress zones as the fractures propagate outwardly rather than towards low stress zones.

Another multi-well configuration having a target well and multiple injection wells can be employed using movable isolation device 900, such as a packer. The multi-well configuration can fracture a selected formation radially outwardly from a toe of the target well, with the fractures propagating forwardly and distally from the toe.

As shown in FIGS. 4-9 two or more injector wells 804 are positioned on either side of a target well 800. The first and second injection wells which are substantially horizontal inclined. While a horizontal inclination is shown, any inclination of the wells, whether vertical or horizontal or a combination thereof is possible. Movable isolation device 900 can be positioned along a length of each of the injection wells 804 at a selected distance from a toe 904 of each well 804 (optional step 1300, FIG. 13). Once the movable isolation devices 900 are in position (step 908), a fluid, typically a gas (through a liquid or combination of gas and liquid can be used), is commonly injected into each injection well 804 (step 912) as discussed above, so that the injected fluid moves radially outwardly from the injection well as shown by fluid penetration profile 916.

Referring to FIGS. 5-8, the fluid continuously injected into the injection wells 804 to continue to move the fluid penetration profile radially outwardly from each injection well as shown by fluid penetration profile 1000 (step 1004).

Figure 7:
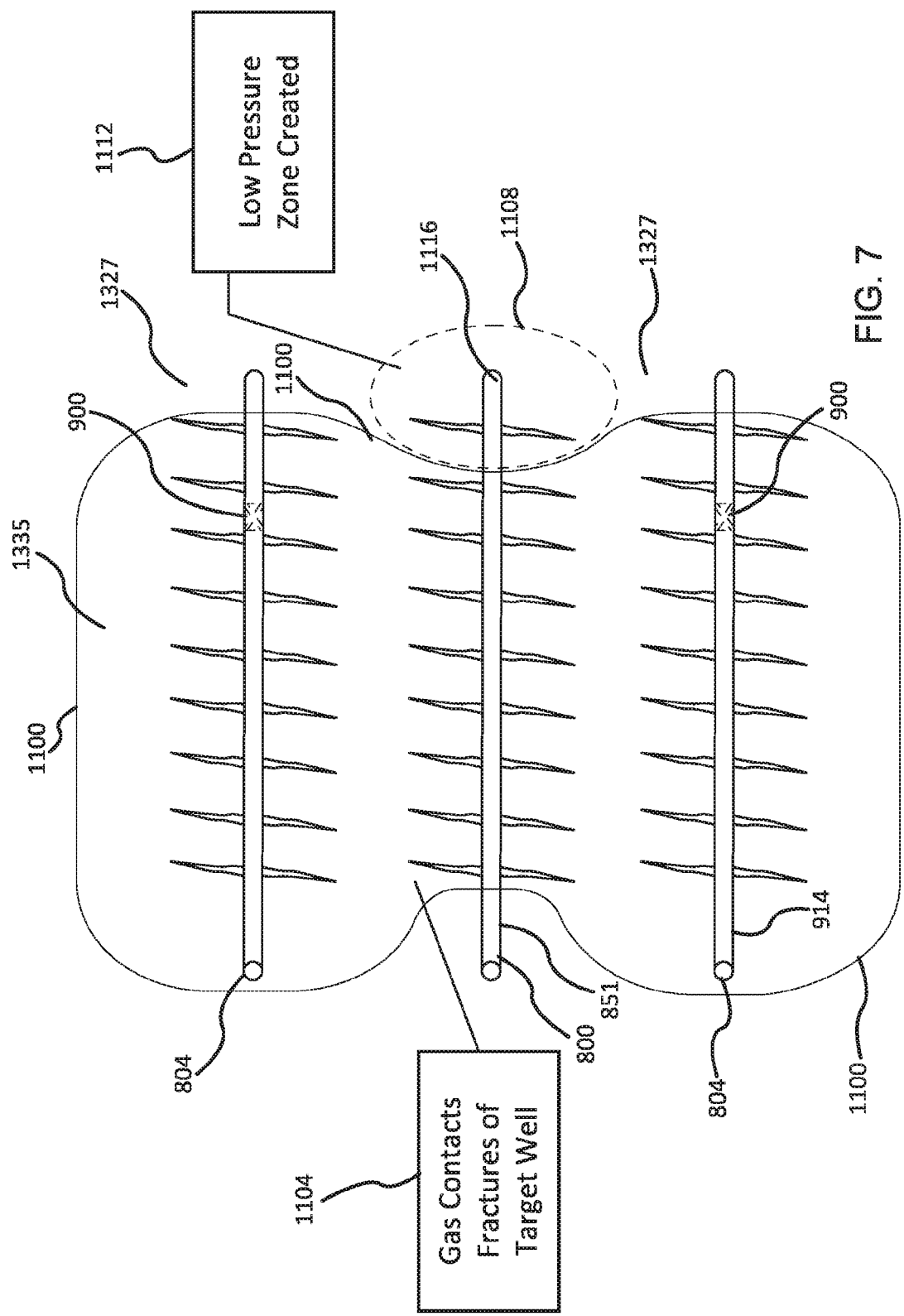
FIG. 7 depicts a multi-well configuration according to an embodiment.

Referring to FIG. 7, the fluid, while still being injected continuously, has moves radially outwardly, whereby the fluid injected from each injection well 804 intersect fluidly, forming a fluid penetration profile 1100 encompassing both inject wells 804 and the target well 800. As shown by box 1104, the injected fluid contacts the pre-existing radial fractures of the target well 800. Fluid may or may not be injected into the injection well 800 during the foregoing steps. As shown by box 1112, a low pressure zone is created at a toe 1116 of the target well 800. The low pressure zone 1108 may be in a high stress zone while the other fractures along the length of the target well 800 are in a low stress zone. The low pressure zone 110 8, however, is defined by the lower penetration of the pressurized and injected fluid into the low pressure zone 1108 when compared to the penetration and injected fluid into the fractures along the length of the target well 800. The differential penetration along the length of the target well 800 is caused largely by, and is a function of, the position of the isolation devices 900 along the lengths of the injection wells.

Typically, the fluid pressure in the low pressure zone 1108 is less than the fluid pressure along the length of the target well 800 where the fluid has penetrated.

Figure 8:
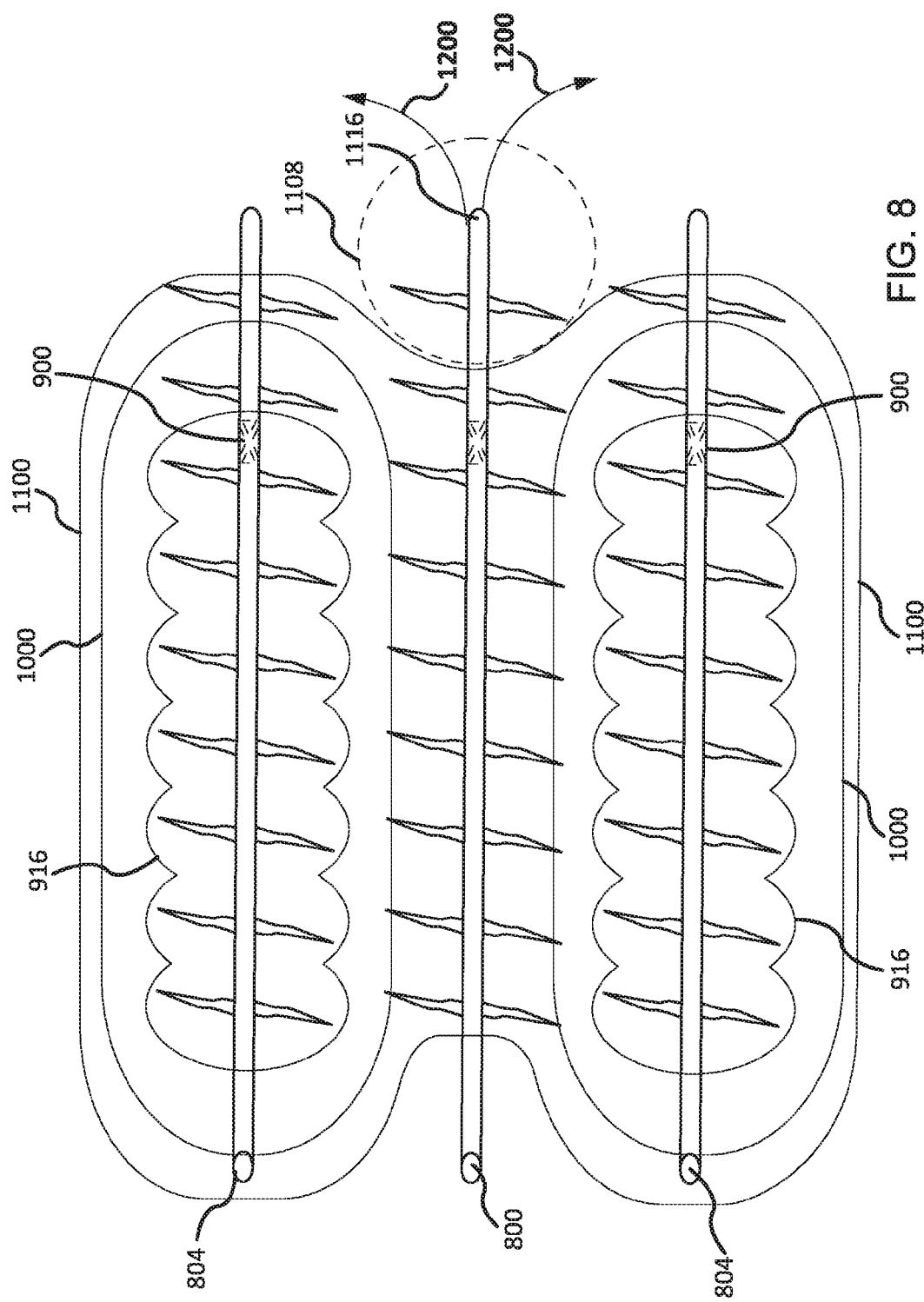
FIG. 8 depicts a multi-well configuration according to an embodiment.
Figure 9:
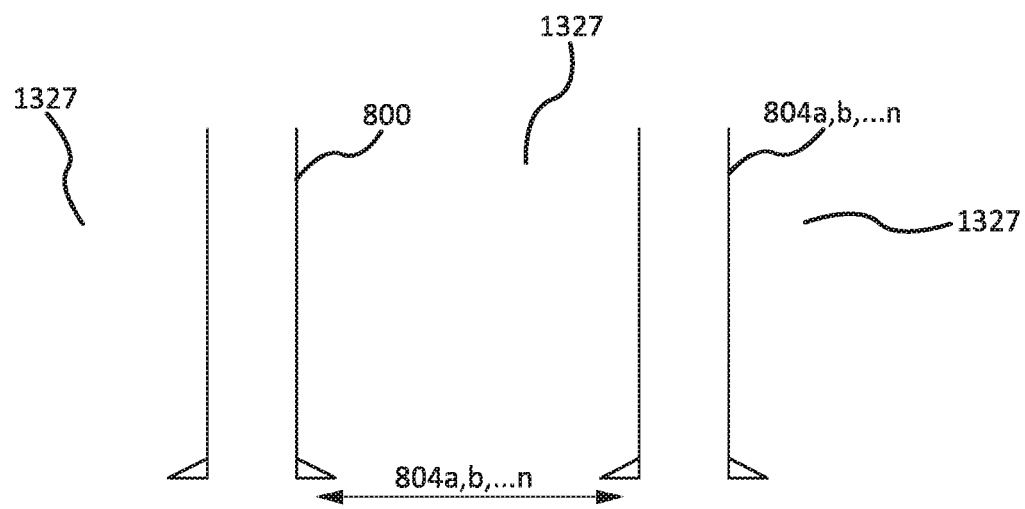
FIG. 9 depicts a multi-well configuration according to an embodiment.
Figure 10:
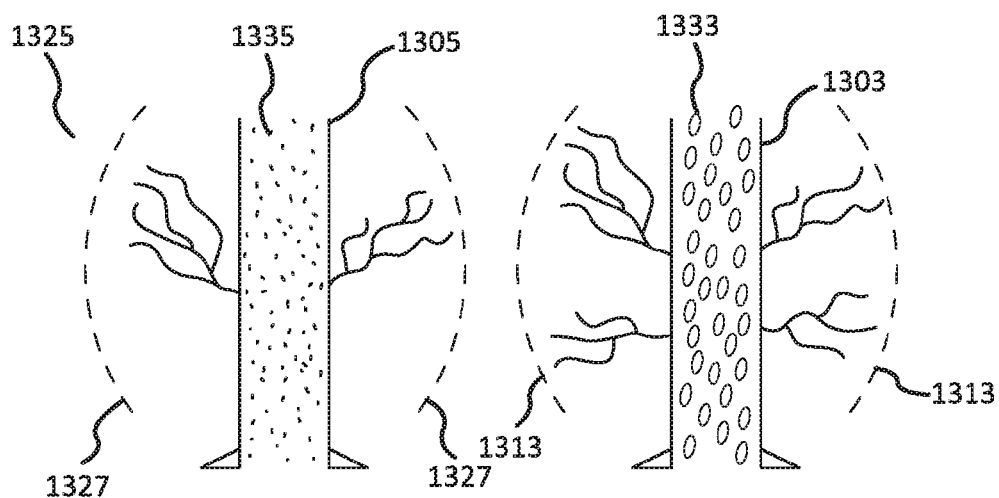
FIG. 10 depicts a multi-well configuration according to an embodiment.
Figure 11:
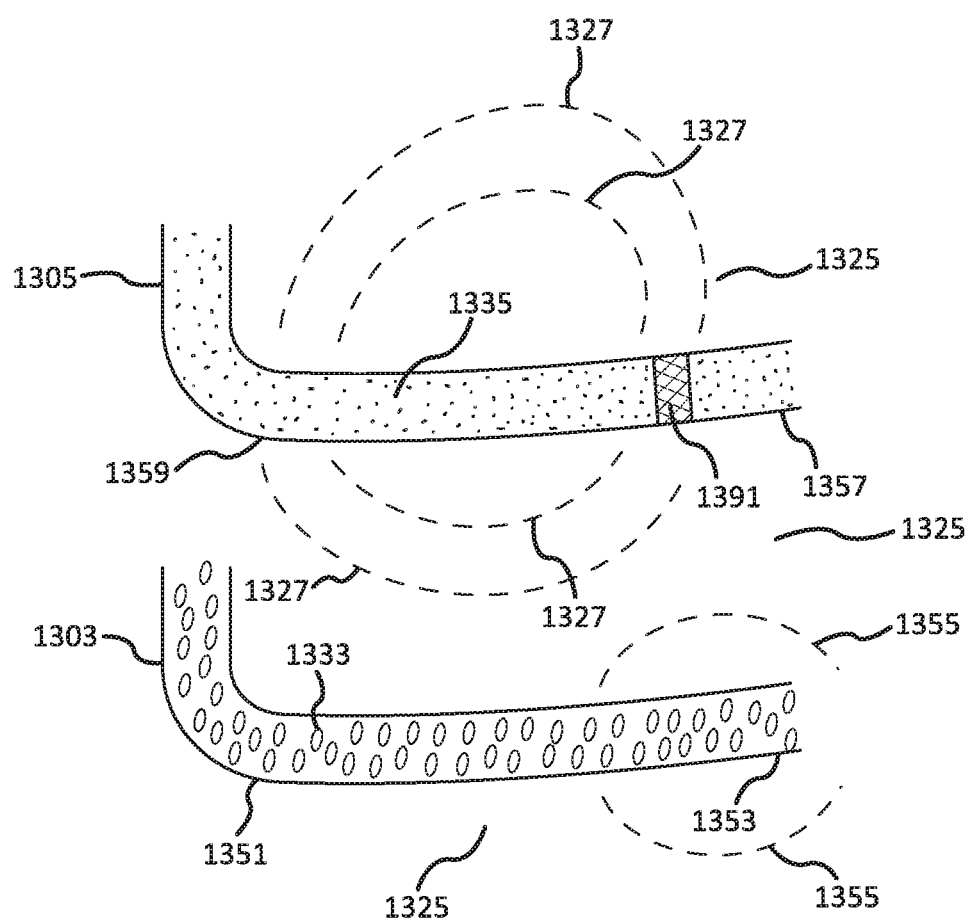
FIG. 11 depicts a multi-well configuration according to an embodiment.
Figure 12:
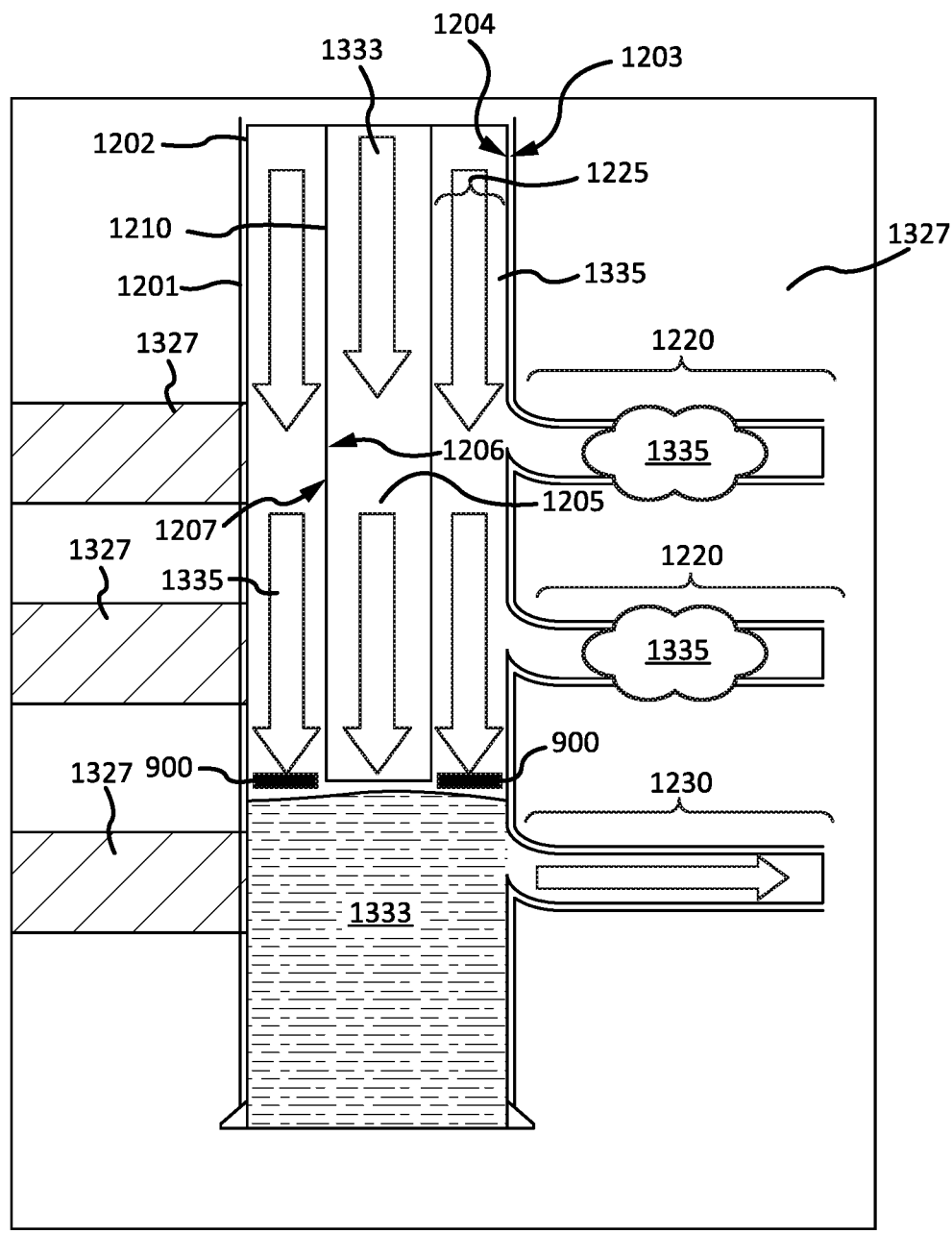
FIG. 12 depicts a configuration according to an embodiment.

Referring to FIG. 8, the progressive fluid penetration profiles 916, 1000, and 1100 of FIGS. 9-11 are depicted along with the low pressure zone 1108 at the toe 1116 of the target well 800. After a suitable fluid dwell time, a carrier fluid can be injected into the target well to cause fractures to propagate largely in the low pressure zone 1108 outwardly from the toe 1116 as shown by the arrows 1200 rather than in the weaker or low stress zones along the length of the target well 800. This is due to the penetration of the injected fluid into the pre-existing fractures, which diverts the carrier fluid away from the pre-existing fracture and towards the toe 1116 of the target well 800. The target well 800 can be deepened followed by repositioning of the isolation devices 900 farther down the length and/or depth of the injection wells 804 and the steps repeated to cause further fracturing from the target well 800.

In another configuration, an isolation device 900 is positioned farther down the length and/or depth of the target well 800 (not depicted) than along the length and/or depth of the injection wells 804 (optional step 1304, FIG. 13). In the example shown, the target well could extend further than depicted (or be deeper) with an isolation device 900 positioned at the current position of the toe 1116, which position would be a distance from the toe of the deeper well. The isolation devices 900 in the injection wells 804 would be in the same position, causing a spatial offset (along the lengths of the wells) of the isolation devices 900 in the injection wells from the isolation device in the target well. The steps of FIGS. 4-8 would be performed to produce fractures propagating forwardly from the position of the isolation device in the target well. The isolation devices would then be moved deeper into the injection and target wells to produce a similar spatial offset, and the steps repeated again to produce fractures propagating forwardly from the position of the isolation device in the target well. These steps can be repeated as frequently as possible to produce the desired fracture profile along the length of the target well. The technique of FIG. 13 work more effectively when the injected fluid pressurizes only a portion of the injection wells 804 and no fluid is introduced into the target well 800.

Some method and/or process embodiments can include one or more of injecting and introducing a gas 1335 into two or more wellbores 804 partly contained within and/or at least partly contained within a subterranean formation 1327 at an injected pressure, maintaining the gas 1335 at the injected pressure, and injecting a fracturing liquid into a target wellbore 800 different from and/or spatially dislocated from the two or more wellbores 804 at a sufficient pressure to fracture a target portion 1108 of the subterranean formation 1327 surrounding the target wellbore 800. The gas 1335 injected into the two or more wellbores 804 occupies a portion 1100 of the subterranean formation 1327 surrounding each of the two or more wellbores 804. The gas 1335 occupying each portion 1100 of the subterranean formation surrounding 1327 each of the two or more wellbores 804 can have an injected pressure. Moreover, the gas 1335 can be injected into each of the two or more wellbores 804 at a rate from about 30 to about 500,000 scf/min. Furthermore, from about 1,000 scf to about 1,000,000,000 scf of the gas 1335 can be injected into each of the two or more wellbores 804. The gas 1335 injected into the subterranean formation 1327 surrounding each of the two or more wellbores 804 can be commonly at least about 500 scf/lfcA of the gas 1335 over a lfcA from about 1 foot to about 15 miles of each of the two or more wellbores 804. In some embodiments, the gas 1335 injected into the subterranean formation 1327 surrounding each of the two or more wellbores 804 can be no more than about 5 scf/lfcA of the gas 1335 over a lfcA from about 1 foot to about 15 miles of each of the two or more wellbores 804. The step of injecting and/or introducing the gas 1335 can include the injected gas occupying a portion 1100 of the subterranean formation 1327 surrounding each of the two or more wellbores 804 at an injected pressure. Moreover, the method and/or process can include, in some embodiments, a step of maintaining, over a selected time interval, the gas 1335 at one or more of the injecting and introducing pressure. The target wellbore 800 is usually contained within the subterranean formation 1327. The target wellbore 800 can be positioned in the subterranean formation 1327 adjacent to the two or more wellbores $804_{a,b,\ldots,n}$ (FIG. 9). Moreover, the wellbore 800 can be positioned in the subterranean formation 1327 adjacent to the two or more wellbores $804_{a,b,\ldots,n}$ at a distance of $808_{a,b,\ldots,n}$ some embodiments, each of distances $808_{a,b,\ldots,n}$ can be substantially equal. However, in some embodiments, each of distances $808_{a,b,\ldots,n}$ can be different from one another. Moreover, in some embodiments, some of the distances $808_{a,b,\ldots,n}$ can be substantially equal to one another and other distances can be different from one another. Commonly, the target wellbore 804 can be positioned an equidistance from the two or more wellbores 804. More commonly, the target wellbore 800 can be positioned substantially about equidistance from each of the two or more wellbores 804.

The two or more wellbores $804_{a,b,\ldots,n}$ can be one of two wellbores, three wellbores, four wellbores, five wellbores, six wellbores, seven wellbores, eight wellbores, nine wellbores, ten wellbores, eleven wellbores, twelve wellbores, or more. Moreover, the target wellbore 800 is usually positioned substantially equidistance to each of the two or more wellbores $804_{a,b,\ldots,n}$. In some embodiments, the two or more wellbores $804_{a,b,\ldots,n}$ are two wellbores, and the target wellbore 800 is positioned a substantially equidistance between the two wellbores. In some embodiments, the two or more wellbores $804_{a,b,\ldots,n}$ are three wellbores, and the target wellbore 800 is positioned a substantially equidistance between the three wellbores. In some embodiments, the two or more wellbores $804_{a,b,\ldots,n}$ are four wellbores, and the target wellbore 800 is positioned a substantially equidistance between the four wellbores. In some embodiments, the two or more wellbores $804_{a,b,\ldots,n}$ are five wellbores, and the target wellbore 800 is positioned a substantially equidistance between the five wellbores. In some embodiments, the two or more wellbores $804_{a,b,\ldots,n}$ are six wellbores, and the target wellbore 800 is positioned a substantially equidistance between the six wellbores. In some embodiments, the two or more wellbores $804_{a,b,\ldots,n}$ are seven wellbores, and the target wellbore 800 is positioned a substantially equidistance between the seven wellbores. In some embodiments, the two or more wellbores $804_{a,b,\ldots,n}$ are eight wellbores, and the target wellbore 800 is positioned a substantially equidistance between the eight wellbores. In some embodiments, the two or more wellbores $804_{a,b,\ldots,n}$ are nine wellbores, and the target wellbore 800 is positioned a substantially equidistance between the nine wellbores. In some embodiments, the two or more wellbores $804_{a,b,\ldots,n}$ are ten wellbores, and the target wellbore 800 is positioned a substantially equidistance between the ten wellbores. In some embodiments, the two or more wellbores $804_{a,b,\ldots,n}$ are eleven wellbores, and the target wellbore 800 is positioned a substantially equidistance between the eleven wellbores. In some embodiments, the two or more wellbores $804_{a,b,\ldots,n}$ are twelve wellbores, and the target wellbore 800 is positioned a substantially equidistance between the twelve wellbores.

It can be appreciated that the target wellbore 800 can be in some embodiments a vertical wellbore. Moreover, the two or more wellbores $804_{a,b,\ldots,n}$ can also be vertical wellbores in some embodiments. The target wellbore 800 and the two or more wellbores $804_{a,b,\ldots,n}$ can be according to some embodiments vertical wellbores.

The target wellbore 800 can be a horizontal wellbore. Moreover, the two or more wellbores $804_{a,b,\ldots,n}$ can be horizontal wellbores. It can be appreciated that in some embodiments, the target wellbore 800 and the two or more wellbores $804_{a,b,\ldots,n}$ can be horizontal wellbores.

It can be appreciated that the target wellbore 800 usually has a heel target wellbore portion 851 and a toe target wellbore portion 116. It can be further appreciated that the target portion of the subterranean 1008 formation is usually located adjacent the toe target wellbore portion 1116. Moreover, the target portion of the subterranean formation 1008 is commonly closer to the toe target wellbore portion 1116 than to the heel target wellbore portion 851.

It can also be appreciated that the two or more wellbores 804 can have a heel wellbore portion 914 and toe wellbore portion 904.

Some embodiments of the method and/or process can further include positioning in each of two or more wellbores $804_{a,b,\ldots,n}$ a movable isolation device 900, such as a packer 900. The packer 900 can isolate the heel wellbore portion 914 from the toe wellbore portion 904. When the packer 900 isolates the heel wellbore portion 914 from the toe wellbore portion 904, the one or more of the injected and introduced gas 1335 typically occupies a sector of the subterranean formation 1000 between the heel wellbore portion 914 and the packer 900. The maintaining step can include maintaining the gas 1335 within the sector of the subterranean formation 1000 between the heel wellbore portion 914 and the packer 900 at one or more of the injected and introduced pressure. Moreover, the sector of the subterranean formation 1000 between the heel wellbore portion 914 and the packer 900 maintained at the one or more of the injected and introduced pressure can typically be substantially devoid of any of the fractures formed by the injecting of the fracturing liquid into the target wellbore 800 at sufficient pressure to fracture the target portion of the subterranean formation. In some embodiments, the fractures formed about the toe target wellbore portion 1008 of the subterranean formation are usually formed by the injecting of the fracturing liquid into the target wellbore 800 at sufficient pressure to fracture the target portion of the subterranean formation.

The portions of the subterranean formation 1000 occupied by the gas can be substantially devoid of any fractures formed by the injecting of the fracturing liquid. Furthermore, the portions of the subterranean formation occupied by gas can be substantially devoid of any fractures formed by the injecting of the fracturing liquid into the target wellbore at sufficient pressure to fracture the subterranean formation.

FIGS. 10 and 11 depict first 1305 and second 1303 wellbores positioned within subterranean formation 1325. The first 1305 and second 1303 wellbores can be vertical wellbores (FIG. 10) or horizontal wellbores (FIG. 11). According to some of the methods and/or processes of the present description, a gas 1335 can be injected and/or introduced into the first wellbore 1305. The gas 1335 injected and/or introduced into wellbore 1305. The second wellbore 1303 can be usually contained within the subterranean formation 1325. The second wellbore 1303 is more usually positioned in the subterranean formation 1325 surrounding and/or adjacent to the first wellbore 1305. The second wellbore 1303 can be partly contained within and/or at least partly contained within a first wellbore portion of the subterranean formation 1327 surrounding and/or adjacent to the first wellbore 1305. The second wellbore portion of the subterranean formation 1313 can have a first hydrocarbon production rate prior to the injecting of the gas 1335 into the first wellbore 1305.

The injected and/or introduced gas 1335 is generally maintained at the injected and/or introduced pressure. It can be appreciated that the injected and/or introduced pressure can be substantially at about same pressure at the wellhead and within the first wellbore portion of the subterranean formation 1327. Moreover, the step of introducing the gas 1335 can include introduced gas 1335 occupying a portion of the subterranean formation surrounding and/or adjacent to the first wellbore 1305 at an introduced pressure.

The injection and/or introduction pressure is usually less than the fracture pressure of the subterranean formation 1325. Moreover, the injection and/or introduction pressure can be less than the fracture pressure of the portion of the subterranean formation 1327 surrounding and/or adjacent to the wellbore 1305. The step of injecting the gas 1335 can include the injected gas occupying a portion of the subterranean formation 1327 about the first wellbore 1305 at an injected pressure. Furthermore, the maintaining of step can include maintaining, over a selected time interval, the gas 1335 at the introduced and/or injected pressure.

The method and/or process can also include injecting and/or introducing a fracturing liquid 1333 into the second wellbore 1303 at a sufficient pressure to fracture a target portion of the subterranean formation 1313 surrounding and/or adjacent to the second wellbore 1303.

Typically, the gas 1335 is injected and/or introduced into the first wellbore 1305 at one or more of the following injection and/or introduction conditions: (a) a rate from about 30 to about 500,000 scf/min; (b) from about 1,000 scf to about 1,000,000,000 scf of the gas 1335; (c) at least about 500 scf/lfcA of the gas 1335 over a lfcA from about 1 foot to about 15 miles of the first wellbore 1305; and no more than about 5 scf/lfcA of the gas 1335 over a lfcA from about 1 foot to about 15 miles of the first wellbore.

Referring to FIG. 11, the second wellbore 1303 is usually within the subterranean formation 1325 containing the first wellbore 1305. The second wellbore 1303 is typically positioned adjacent to the first wellbore 1305. The second wellbore 1303 can have a second wellbore heel portion 1351 and a second wellbore toe portion 1353. In a horizontal well, a second wellbore portion of the subterranean formation 1335 is usually located adjacent the second wellbore toe portion 1353. Moreover, the second wellbore toe portion of the subterranean formation 1355 is commonly closer to the second wellbore toe portion 1353 than to the second wellbore heel portion 1351. Furthermore, the first wellbore 1305 can have a first wellbore heel portion 1359 and a first wellbore toe portion 1357.

The method and/or process can further include the step of positioning in the first wellbore 1305 a packer 1391. The packer 1391 is generally positioned to isolate the first wellbore heel portion 1359 from the first wellbore toe portion 1357. Gas 1335 injected into the first wellbore 1305 having the packer 1391 positioned between the first wellbore heel portion 1359 and the first wellbore toe portion 1357 commonly occupies a sector of the subterranean formation 1327 between the first wellbore heel portion 1359 and the packer 1391. It can be appreciated that, the maintaining step can include maintaining the gas 1335 within the sector of the subterranean formation 1327 between the first wellbore heel portion 1359 and the packer 1391 at the injected pressure. Moreover, the sector of the subterranean formation 1327 between the first wellbore heel portion 1359 and the packer 1391 maintained at the injected pressure can be substantially devoid of any of the fractures formed by the injecting of the fracturing liquid 1333 into the second wellbore 1303 at sufficient pressure to fracture the second wellbore portion of the subterranean formation 1355. In some embodiments, the fractures formed about the second wellbore toe portion of the subterranean formation 1355 are usually formed by the injecting of the fracturing liquid 1333 into the second wellbore 1303 at sufficient pressure to fracture the second wellbore portion of the subterranean formation 1355.

Portions of the subterranean formation occupied by the gas 1335 can be substantially devoid of any fractures formed by the injecting of the fracturing liquid 1333. Furthermore, the portion of the subterranean formation occupied by the gas can be substantially devoid of any fractures formed by the injecting of the fracturing liquid into the second wellbore 1303 at sufficient pressure to fracture the subterranean formation 1327. Moreover, portions of the subterranean formation occupied by the gas 1335 can be substantially devoid of any fractures formed by the introducing of the fracturing liquid 1333. Furthermore, the portion of the subterranean formation occupied by the gas 1335 can be substantially devoid of any fractures formed by the introducing of the fracturing liquid 1333 into the second wellbore 1303 at sufficient pressure to fracture the subterranean formation 1327.

The second wellbore portion of the subterranean formation 1355 can generally have first and second portions of the subterranean formation (not depicted). More generally, the second wellbore portion of the subterranean formation 1355 can have first and second portions of the subterranean formation with the second portion of the subterranean formation being fractured to a greater extent than the first portion of the subterranean formation. The first portion of the subterranean formation can have first portion fractures and pore volumes. Furthermore, the first portion of the subterranean formation can have first portion fractures and pore volumes and the second portion of the subterranean formation can have second portion fractures and pore volumes.

The method and/or process can include a step of injecting and/or introducing, before the injecting of the fracturing liquid 1333, a diverting agent into the second wellbore 1303 (optional step 1316, FIG. 13). The diverting agent can be injected and/or introduced at a sufficient pressure to occupy at least some of a first portion fractures and pore volumes. The diverting agent can be a chemical diverting agent. In some embodiments, the diverting agent can be a mechanical diverting agent. The diverting agent can commonly be a degradable fiber. More commonly, the diverting agent can be a degradable material. In some embodiments, the diverting agent can be bezonic acid. In accordance with some embodiments, the diverting agent can be combination of two or more of a chemical diverting agent, a mechanical diverting agent, a degradable fiber, a degradable material, and bezonic acid. In some embodiments, the diverting agent is selected from the group consisting essentially of a chemical diverting agent, a mechanical diverting agent, a degradable fiber, a degradable material, bezonic acid, or a combination thereof.

The method and/or process can include a step of maintaining a dwell period between the injecting and/or introducing of the gas 1335 into the first wellbore 1305 and the injecting and/or introducing of a fracturing liquid 1333 into the second wellbore 1303. The dwell period can less than about one hour. In some embodiments, the dwell period can be less than about 24 hours. Typically, the dwell period can be more than about 24 hours. In some embodiments, the dwell period is selected from the group consisting essentially of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In accordance with some embodiments is a method having the steps of injecting a gas 1335 into a wellbore 1201 at least partly contained within a subterranean formation 1327, the gas 1335 is usually injected into an annular space 1204 of the wellbore 1201 at a rate from about 30 to about 500,000 scf/min and occupying one or more portions of the subterranean formation 1220 surrounding the wellbore 1201at an injected pressure, maintaining the gas 1335 at the injected pressure, and injecting a fracturing liquid 1333 into a tubing string 1205 space at a sufficient pressure to fracture a target portion of the subterranean formation 1230 surrounding the wellbore 1201. The one or more portions of the subterranean formation 1220 and the target portion of the subterranean formation 1230 generally differ. Typically, the wellbore 1201 includes a tubing string 1210 having inner 1206 and outer 1207 tubing sting walls, a well casing 1202 having inner 1024 and outer 1203 well casing walls, and an annular space 1225 defined by the inner well casing wall 1204 and the outer tubing string wall 1207. The tubing string space 1205 is commonly defined by the inner tubing string wall 1206.

In accordance with some embodiments is a method having the steps of injecting from about 1,000 scf to about 1,000,000,000 scf of the gas 1335 into an annular space 1225 of a wellbore 1201, the wellbore 1201 is generally at least partly contained within a subterranean formation 1327, the gas 1335 typically occupies one or more portions of the subterranean formation 1220 surrounding the wellbore 1201 at an injected pressure, maintaining the gas 1335 at the injected pressure, and injecting a fracturing liquid 1333 into a tubing string space 1205 at a sufficient pressure to fracture a target portion of the subterranean formation 1230 surrounding the wellbore 1201. The one or more portions of the subterranean formation 1220 and the target portion of the subterranean formation 1230 generally differ. Typically, the wellbore 1201 includes a tubing string 1210 having inner 1206 and outer 1207 tubing sting walls, a well casing 1202 having inner 1204 and outer 1203 well casing walls, and an annular space 1225 defined by the inner well casing wall 1204 and the outer tubing string wall 1207. The tubing string space 1205 is commonly defined by the inner tubing string wall 1206.

In accordance with some embodiments is a method having the steps of injecting more than about $1 \times 10^9$ scf of the gas 1335 into an annular space 1225 of a wellbore 1201, the wellbore 1201 is generally at least partly contained within a subterranean formation 1327, the gas 1335 typically occupies one or more portions of the subterranean formation surrounding the wellbore 1201 at an injected pressure, maintaining the gas 1335 at the injected pressure, and injecting a fracturing liquid 1333 into a tubing string space 1205 at a sufficient pressure to fracture a target portion of the subterranean formation 1230 surrounding the wellbore 1201. The one or more portions of the subterranean formation 1220 and the target portion of the subterranean formation 1230 generally differ. Typically, the wellbore 1201 includes a tubing string 1210 having inner and outer tubing sting walls, a well casing 1202 having inner 1204 and outer 1203 well casing walls, and an annular space 1225 defined by the inner well casing wall 1204 and the outer tubing string wall 1207. The tubing string space 1205 is commonly defined by the inner tubing string wall 1206.

In accordance with some embodiments is a method having the steps of injecting the gas 1335 into an annular space 1225 of a wellbore 1201, the wellbore 1201 is generally at least partly contained within a subterranean formation 1327, typically at least about 500 scf/lfcA of the gas 1335 occupies one or more portions of the subterranean formation 1220 surrounding the wellbore 1201 at an injected pressure over a lfcA from about 1 foot to about 15 miles of the wellbore 1201, maintaining the gas1335 at the injected pressure, and injecting a fracturing liquid 1333 into a tubing string space 1205 at a sufficient pressure to fracture a target portion of the subterranean formation 1230 surrounding the wellbore 1201. The one or more portions of the subterranean formation 1220 and the target portion of the subterranean formation 1230 generally differ. Typically, the wellbore 1201 includes a tubing string 1210 having inner1206 and outer 1207 tubing sting walls, a well casing 1202 having inner 1204 and outer 1203 well casing walls, and an annular space 1225 defined by the inner well casing wall 1204 and the outer tubing string wall 1207. The tubing string space 1205 is commonly defined by the inner tubing string wall 1206.

In accordance with some embodiments is a method having the steps of injecting the gas 1335 into an annular space 1225 of a wellbore 1201, the wellbore 11201 is generally at least partly contained within a subterranean formation 1327, typically no more than about 5 scf/lfcA of the gas 1335 occupies one or more portions of the subterranean formation 1220 surrounding the wellbore 1201 at an injected pressure over a lfcA from about 1 foot to about 15 miles of the wellbore 1201, maintaining the gas 1335 at the injected pressure, and injecting a fracturing liquid 1333 into a tubing string space 1205 at a sufficient pressure to fracture a target portion of the subterranean formation 1230 surrounding the wellbore 1201. The one or more portions of the subterranean formation 1220 and the target portion of the subterranean formation 1230 generally differ. Typically, the wellbore 1201 includes a tubing string 1210 having inner 1206 and outer 1207 tubing sting walls, a well casing 1202 having inner 1204 and outer 1203 well casing walls, and an annular space 1225 defined by the inner well casing wall 1204 and the outer tubing string wall 1207. The tubing string space 1205 is commonly defined by the inner tubing string wall 1206.

In some embodiments, the wellbore 1201 can be a vertical wellbore.

In some embodiments, the wellbore 1201 can be a horizontal wellbore. Moreover, the target portion of the subterranean formation 1230 can be about a toe target wellbore portion. In some embodiments, the other of the one or more portions of the subterranean formation 1220 can be closer to the toe target wellbore portion (not depicted) than a heel target wellbore portion (not depicted).

Some embodiments further include a step of positioning a packer 900 within the wellbore 1201.

Some embodiments further include a step of setting a packer 900 within the wellbore 1201.

Some embodiments further include a step of isolating, within the wellbore 1201, the injected gas 1335 from the fracturing liquid 1333. The step of isolating the injected gas 1335 from the fracturing liquid 1333 can include positioning and/or setting a packer 90 within the wellbore 1201.

Some embodiments can include setting a packer 900 within the wellbore 1201 to isolate at least one of the one or more portions of the subterranean formation 1220 from the other of the one or more portions of the subterranean formation 1220. In accordance with some embodiments, during the injecting of the gas 1335 into the wellbore 1201 and maintaining the gas 1335 at the injection pressure, the gas 1335 can occupy at least one of the one or more portions of the subterranean formation 1220. Furthermore, during the injecting the fracturing liquid 1333, the fracturing liquid 1333 can be injected at a sufficient pressure to fracture the other of the one or more portions of the subterranean formation 1220.

Some embodiments can include maintaining a dwell period between the injecting of the gas 1335 into the one or more portions of the subterranean formation 1220 and the injecting of fracturing liquid 1333 into the target portion of the subterranean formation 1230. Typically, the dwell period can be one of less than about one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

Moreover, the gas 1335 can be in the form of a foam. In some embodiments, the foam can have more gas by volume than liquid by volume. In some embodiments, the foam can have less gas by volume than liquid by volume.

In some embodiments, the one or more portions of the subterranean formation 1220 occupied by the gas 1335 can be substantially devoid of any fractures formed by the injecting of the fracturing liquid 1333 into the target portion of the wellbore 1201 at sufficient pressure to fracture the target portion of the subterranean formation 1230.

In some embodiments, during the injecting of the gas 1335 into the wellbore 1201, the gas 1335 can be in the form of one or more of a gas phase, a liquid phase, a foam, or a combination thereof.

It can be appreciated that, the target portion of the subterranean formation 1230 can have in some embodiments a first hydrocarbon production rate prior to the injecting of the gas. Moreover, the fractured target portion of the subterranean can have a second hydrocarbon rate. The second hydrocarbon production rate can be typically greater than the first hydrocarbon production rate.

Commonly, the target portion of the subterranean formation 1230 can have first and second portions of the subterranean formation (not depicted). More commonly, the second portion of the subterranean formation (not depicted) can be fractured to a greater extent than the first portion of the subterranean formation (not depicted).

The gas 1335 can usually be one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), oxygen, air, steam and an inert gas.

Some embodiments include a method of protecting a target well from being fractured. The method generally includes injecting a gas into a target wellbore. The injected gas can occupy a target subterranean formation comprising at least about 1 scf/lfcA over a lfcA from about 1 foot to about 15 miles of the target wellbore. Typically, adjacent to the target wellbore is an interferer wellbore. The interferer wellbore can be one or more of scheduled for fracturing, undergoing a fracturing process, or both. Generally, the injected gas occupying the target subterranean formation substantially prevents the fractures generated during the fracturing process of the interferer well from propagating into the target subterranean formation. Moreover, the injected gas occupying the target subterranean formation substantially prevents well bashing and/or well interference. It can be appreciated that the injected gas occupying the target subterranean formation can substantially one or more of shield and protect the target subterranean formation from being fractured by the fracturing system of adjacent interfering wellbores.

The target subterranean formation typically can be a low pressure stress zone. In some embodiments, the target subterranean formation can be a previously hydraulic fractured zone. Generally, the target subterranean formation can be a combination of a low pressure stress zone and previously hydraulic fractured zone. Moreover, the target subterranean formation can be one of low pressure stress zone, a previously hydraulic fractured zone, or a combination thereof.

The target subterranean formation can be a high pressure stress zone. Generally, the target subterranean formation can be a non-previously hydraulic fractured zone. More generally, the target subterranean formation can be a previously unstimulated zone. In some embodiments, the target subterranean formation can be a previously under stimulated zone. In some embodiments of the present disclosure, the target subterranean formation can be a previously produced of hydrocarbons or other minerals within the zone. Moreover, the target subterranean formation can be one or more of a high pressure stress zone, a non-previously hydraulic fractured zone, a previously unstimulated zone, and a previously under stimulated zone. Furthermore, the target subterranean formation can be one of a high pressure stress zone, a non-previously hydraulic fractured zone, a previously unstimulated zone, a previously under stimulated zone or a combination thereof.

Typically, the gas can be an inert gas. More typically, the gas can be nitrogen ($N_2$). Even more typically, the gas can be hydrogen ($H_2$). Yet even more typically, the gas can be methane ($CH_4$). In accordance with some embodiments of the present disclosure, the gas can be ethane ($CH_3$-$CH_3$). Commonly, the gas can be propane ($C_3H_8$). More commonly, the gas can be butane ($C_4H_{10}$). Even more commonly, the gas can be carbon dioxide ($CO_2$). Yet even more commonly, the gas can be oxygen. Still yet even more commonly, the gas can be air. In some embodiments, the gas can be steam. Furthermore, the gas can be one or more of nitrogen ($N_2$), hydrogen ($H_2$), methane ($CH_4$), ethane ($CH_3$-$CH_3$), propane ($C_3H_8$), butane ($C_4H_{10}$), carbon dioxide ($CO_2$), oxygen, air, steam and inert gas.

In some embodiments, the method can include the gas being in the gas phase during the injecting of the gas into the target wellbore. Moreover, the method can include the gas being in the liquid phase during the injecting of the gas into the target wellbore. Generally, the method can include the gas being in the form of a foam during the injecting of the gas into the target wellbore. Moreover, the method can include the gas being in the form of one or more of gas phase, liquid phase, foam, or combination thereof. In some embodiments, the foam can be more gas by volume than liquid by volume. Commonly, the foam can have no more than about 50 volume % liquid. Furthermore, the foam can have less gas by volume than liquid by volume.

The method can include maintaining a dwell period between the injecting of the gas in the target wellbore and the fracturing of the interferer well bore. In some embodiments, the dwell period can be less than about one hour. Moreover, the dwell period can be less than about 24 hours. The dwell period can usually be more than about 24 hours. In some embodiments, the dwell period can be one of less than one hour, less than about 24 hours, and more than about 24 hours. Generally, the dwell period can be no more than about 60 days. More generally, the dwell period can be no more than about 59 days, yet even more generally no more than about 58 days, still yet even more generally no more than about 57 days, still yet even more generally no more than about 56 days, still yet even more generally no more than about 55 days, still yet even more generally no more than about 54 days, still yet even more generally no more than about 53 days, still yet even more generally no more than about 52 days, still yet even more generally no more than about 51 days, still yet even more generally no more than about 50 days, still yet even more generally no more than about 49 days, still yet even more generally no more than about 48 days, still yet even more generally no more than about 47 days, still yet even more generally no more than about 46 days, still yet even more generally no more than about 45 days, still yet even more generally no more than about 44 days, still yet even more generally no more than about 43 days, still yet even more generally no more than about 42 days, still yet even more generally no more than about 41 days, still yet even more generally no more than about 40 days, still yet even more generally no more than about 39 days, still yet even more generally no more than about 38 days, still yet even more generally no more than about 37 days, still yet even more generally no more than about 36 days, still yet even more generally no more than about 35 days, still yet even more generally no more than about 34 days, still yet even more generally no more than about 33 days, still yet even more generally no more than about 32 days, still yet even more generally no more than about 31 days, still yet even more generally no more than about 30 days, still yet even more generally no more than about 29 days, still yet even more generally no more than about 28 days, still yet even more generally no more than about 27 days, still yet even more generally no more than about 26 days, still yet even more generally no more than about 25 days, still yet even more generally no more than about 24 days, still yet even more generally no more than about 23 days, still yet even more generally no more than about 22 days, still yet even more generally no more than about 21 days, still yet even more generally no more than about 20 days, still yet even more generally no more than about 19 days, still yet even more generally no more than about 18 days, still yet even more generally no more than about 17 days, still yet even more generally no more than about 16 days, still yet even more generally no more than about 15 days, still yet even more generally no more than about 14 days, still yet even more generally no more than about 13 days, still yet even more generally no more than about 12 days, still yet even more generally no more than about 11 days, still yet even more generally no more than about 10 days, still yet even more generally no more than about 9 days, still yet even more generally no more than about 8 days, still yet even more generally no more than about 7 days, still yet even more generally no more than about 6 days, still yet even more generally no more than about 5 days, still yet even more generally no more than about 4 days, still yet even more generally no more than about 3 days, still yet even more generally no more than about 2 days, or yet still even more generally no more than about 1 day.

In some embodiments, the gas can be injected into the target wellbore at a rate of about 1 to about 500,000 scf/min.

In some embodiments, the gas injected into the target wellbore can be from about 1,000 to about 1,000,000,000 scf. Moreover, in some embodiments, the gas injected into the target wellbore can be from about 1,000 to about 100,000,000 scf. Furthermore, the gas injected into the target wellbore can be, in some embodiments, more than about $1 \times 10^9$ scf. In some embodiments, the gas injected in the target subterranean formation can be at least about 1 scf/lfcA over a lfcA from about 1 foot to about 15 miles of the wellbore. Moreover, the gas injected in the first and second portions of the target subterranean formation can be no more than about 5, scf/lfcA over a lfcA from about 1 foot to about 15 miles of the wellbore.

The target subterranean formation can commonly have a pressure of at least about 5% more than the target subterranean formation. More commonly, the target subterranean formation can have a pressure of at least about 10% more, even more commonly a pressure of at least about 50% more, yet even more commonly a pressure of at least about 100% more, yet even more commonly a pressure of at least about 200% more, yet even more commonly a pressure of at least about 500% more, yet even more commonly a pressure of at least about 1,000% more, yet even more commonly a pressure of at least about 2,500% more, yet even more commonly a pressure of at least about 5,000% more, yet even more commonly a pressure of at least about 7,500% more, or even yet more commonly a pressure of at least about 10,000% more than the target subterranean formation.

A number of variations and modifications of the disclosure can be used. It would be possible to provide for some features of the disclosure without providing others. As for example, the injecting of the gas can include injecting the gas at an injection pressure of one of less than the fracture pressure of the subterranean formation, at an injection pressure greater than the wellhead pressure, or a combination thereof. Moreover, in some of the embodiments, the introducing of the gas can include introducing the gas at an introduction pressure of one of less than the fracture pressure of the subterranean formation, greater than the wellhead pressure, or a combination thereof. In other examples, alternatives to packers can include gel pills and san pads.

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or to reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A method, comprising:
   injecting a gas into a wellbore comprising a tubing string having inner and outer tubing string walls, a well casing having inner and outer well casing walls, and an annular space defined by the inner well casing wall and the outer tubing string wall, wherein the wellbore is at least partly contained within a subterranean formation, wherein the gas is injected into the annular space of the wellbore is at a rate from about 1 to about 500,000 scf/min and occupies one or more portions of the subterranean formation surrounding the wellbore at an injected pressure, wherein the gas comprises no more than about 1% by volume solid particulates:

maintaining the gas at the injected pressure, wherein the injected pressure is below a fracture gradient of the subterranean formation during substantially the duration of the injecting step: and injecting a fracturing liquid into a tubing space defined by the inner tubing string wall at a sufficient pressure to fracture a target portion of the subterranean formation surrounding the wellbore, wherein the one or more portions of the subterranean formation and the target portion of the subterranean formation differ.

2. The method of claim 1, further comprising:

positioning a packer within the wellbore, wherein the packer substantially isolates the injected gas from the injected fracturing liquid.

3. The method of claim 1, further comprising:

setting a packer within the wellbore to isolate at least one of the one or more portions of the subterranean formation from the other of the one or more portions of the subterranean formation, wherein the gas, during the injecting of the gas into the wellbore and maintaining the gas at the injection pressure, occupies the least one of the one or more portions of the subterranean formation, and wherein the fracturing liquid, during the injecting the fracturing liquid, is injected at a sufficient pressure to fracturing the other of the one or more portions of the subterranean formation.

4. The method of claim 1, wherein the wellbore comprises a vertical wellbore.

5. The method of claim 1, wherein the wellbore comprises a horizontal wellbore, wherein the target portion of the subterranean formation comprises a heel target wellbore portion and a toe target wellbore portion, and wherein the other of the one or more portions of the subterranean formation is closer to the toe target wellbore portion than to the heel target wellbore portion.

6. The method of claim 1, wherein the one or more portions of the subterranean formation occupied by the gas are substantially devoid of any fractures formed by the injecting of the fracturing liquid into the target portion of the wellbore at sufficient pressure to fracture the target portion of the subterranean formation.

7. The method of claim 1, wherein the target portion of the subterranean formation has a first hydrocarbon production rate prior to the injecting of the gas, wherein the fractured target portion of the subterranean has a second hydrocarbon rate, wherein the second hydrocarbon production rate is greater than the first hydrocarbon production rate, wherein the target portion of the subterranean formation comprises first and second portions of the subterranean formation, and wherein the second portion of the subterranean formation is fractured to a greater extent than the first portion of the subterranean formation.

8. The method of claim 1, wherein during the injecting of the gas into the wellbore, the gas is in the form of a foam, and further comprising:

maintaining a dwell period between the injecting of the gas into the one or more portions of the subterranean formation and the injecting of fracturing liquid into the target portion of the subterranean formation, and wherein one of the following is true:

(i) the foam comprises more gas by volume than liquid by volume; and (ii) the foam comprises less gas by volume than liquid by volume.

9. The method of claim 1, wherein the gas comprises one or more of nitrogen ($N_2$), hydrogen ($H_2$), methane ($CH_4$), ethane ($C_2H_6$), propane ($C_3H_8$), butane ($C_4H_{10}$), carbon dioxide ($CO_2$), steam, oxygen, air, and an inert gas and wherein one or more of the following are true:

(a) the gas injected into the wellbore comprises from about 1,000 scf to about 1,000,000,000 scf;

(b) the gas injected into the wellbores comprises more than about $1 \times 10^9$ scf;

(c) the gas injected into the one or more portions of the subterranean formation comprises at least about 1 scf/lfcA over a lfcA from about 1 foot to about 15 miles of the wellbore; and (d) the gas injected into the one or more portions of the subterranean formation comprises no more than about 5 scf/lfcA over a lfcA from about 1 foot to about 15 miles of each of the two or more wellbores.

* * * * *